(12) United States Patent
Maeda et al.

(10) Patent No.: US 9,635,656 B2
(45) Date of Patent: Apr. 25, 2017

(54) DATA COMMUNICATION METHOD, COMMUNICATION SYSTEM AND MOBILE TERMINAL

(71) Applicant: MITSUBISHI ELECTRIC CORPORATION, Chiyoda-ku (JP)

(72) Inventors: Miho Maeda, Tokyo (JP); Mitsuru Mochizuki, Tokyo (JP); Keiko Tada, Tokyo (JP); Yasushi Iwane, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/587,726

(22) Filed: Dec. 31, 2014

(65) Prior Publication Data

US 2015/0189645 A1 Jul. 2, 2015

Related U.S. Application Data

(63) Continuation of application No. 12/375,574, filed as application No. PCT/JP2006/326117 on Dec. 27, 2006, now Pat. No. 9,019,983.

(30) Foreign Application Priority Data

Oct. 27, 2006 (JP) ................... 2006-292641

(51) Int. Cl.
*H04J 3/16* (2006.01)
*H04W 72/04* (2009.01)
(Continued)

(52) U.S. Cl.
CPC ....... *H04W 72/0413* (2013.01); *H04J 11/003* (2013.01); *H04L 1/1671* (2013.01);
(Continued)

(58) Field of Classification Search
CPC ..... H04L 47/72; H04L 47/722; H04L 47/724; H04L 47/822; H04L 47/824;
(Continued)

(56) References Cited

U.S. PATENT DOCUMENTS 5,640,395 A 6/1997 Hamalainen et al.
6,807,146 B1 10/2004 McFarland
(Continued)

FOREIGN PATENT DOCUMENTS

CN 1691820 A 11/2005
JP 2004 274432 9/2004
(Continued)

OTHER PUBLICATIONS

"Random Access and UL Scheduling", 3GPP TSG-RAN WG2 LTE#53, R2-061464, May 8-12, 2006, Motorola.*
(Continued)

*Primary Examiner* — Peter Cheng
(74) *Attorney, Agent, or Firm* — Oblon, McClelland, Maier & Neustadt, L.L.P.

(57) ABSTRACT

In a communications system which complies with LTE including a base station 2 which transmits data by using an OFDM (Orthogonal Frequency Division Multiplexing) method as a downlink access method, and a mobile terminal 3, in a case in which an uplink scheduling request signal SR is transmitted by using an S-RACH when an Ack/Nack signal is being transmitted by using an Ack/Nack exclusive channel, the transmission of the Ack/Nack signal is stopped while the uplink scheduling request signal SR is transmitted.

3 Claims, 60 Drawing Sheets

(51) Int. Cl.

| | | |
|---|---|---|
| *H04L 12/911* | (2013.01) | |
| *H04W 74/00* | (2009.01) | |
| *H04W 72/12* | (2009.01) | |
| *H04W 74/08* | (2009.01) | |
| *H04W 76/02* | (2009.01) | |
| *H04W 28/18* | (2009.01) | |
| *H04W 28/26* | (2009.01) | |
| *H04W 28/16* | (2009.01) | |
| *H04L 1/16* | (2006.01) | |
| *H04L 1/18* | (2006.01) | |
| *H04J 11/00* | (2006.01) | |
| *H04L 5/00* | (2006.01) | |
| *H04L 1/00* | (2006.01) | |

(52) U.S. Cl.
CPC .......... *H04L 1/1854* (2013.01); *H04L 1/1858* (2013.01); *H04L 5/0007* (2013.01); *H04L 5/0057* (2013.01); *H04L 47/827* (2013.01); *H04W 28/16* (2013.01); *H04W 28/18* (2013.01); *H04W 28/26* (2013.01); *H04W 72/1278* (2013.01); *H04W 72/1284* (2013.01); *H04W 72/1289* (2013.01); *H04W 74/002* (2013.01); *H04W 74/004* (2013.01); *H04W 74/006* (2013.01); *H04W 74/0883* (2013.01); *H04W 74/0891* (2013.01); *H04W 76/021* (2013.01); *H04L 1/0026* (2013.01); *H04W 74/0866* (2013.01)

(58) Field of Classification Search
CPC ... H04L 47/827; H04L 1/1671; H04L 1/1854; H04L 1/1858; H04L 1/0026; H04L 5/0007; H04L 5/0057; H04W 28/16; H04W 28/18; H04W 28/20; H04W 28/22; H04W 28/24; H04W 28/26; H04W 72/0406; H04W 72/0413; H04W 72/042; H04W 72/1278; H04W 72/1284; H04W 72/1289; H04W 74/002; H04W 74/004; H04W 74/006; H04W 74/0866; H04W 74/0883; H04W 74/0891; H04W 76/021; H04J 11/003
USPC ........ 370/436–9, 441–3, 458, 478–480, 498, 370/509, 522, 524, 527, 529, 537
See application file for complete search history.

(56) References Cited

U.S. PATENT DOCUMENTS

| | | | |
|---|---|---|---|
| 6,980,540 B1 | 12/2005 | Larola et al. | |
| 7,873,023 B2* | 1/2011 | Ihm ...................... | H04L 5/0044 370/329 |
| 2004/0208145 A1 | 10/2004 | Sim et al. | |
| 2004/0213214 A1 | 10/2004 | Jung et al. | |
| 2007/0054689 A1* | 3/2007 | Baker .................. | H04L 1/0026 455/522 |
| 2007/0082620 A1 | 4/2007 | Zhang et al. | |
| 2007/0133458 A1 | 6/2007 | Chandra et al. | |
| 2008/0095223 A1 | 4/2008 | Tong et al. | |
| 2008/0279305 A1 | 11/2008 | Matsumoto et al. | |
| 2009/0196164 A1 | 8/2009 | Vook et al. | |
| 2009/0291717 A1 | 11/2009 | Lee et al. | |
| 2012/0307622 A1 | 12/2012 | Terry et al. | |
| 2014/0177444 A1* | 6/2014 | Varma ............... | H04W 72/0446 370/236 |

FOREIGN PATENT DOCUMENTS

| | | |
|---|---|---|
| JP | 2004 328498 | 11/2004 |
| JP | 2006 33778 | 2/2006 |

OTHER PUBLICATIONS

"Uplink Control Signaling for E-UTRA", TSG-RAN WG1 LTE ADHoc, R1-060111, Jan. 23-25, 2006, Ericsson.*
Ericsson, "Uplink Control Signaling for E-UTRA", 3GPP Draft; R1-060111, 3rd Generation Partnership Project (3GPP), Mobile Competence Centre, vol. RAN WG1, Jan. 19, 2006.
Motorola, "Synchronized Random Access Channel and Scheduling Request", 3GPP Draft; R1-062664 SYNCHRACH SR, 3rd Generation Partnership Project (3GPP), Mobile Competence Centre, vol. RAN WG1, Oct. 6, 2006.
Nortel Networks, "Consideration on UL RACH scheme for LTE", 3GPP Draft; R1-060653 RACH, 3rd Generation Partnership Project (3GPP), Mobile Competence Centre, vol. RAN WG1, Feb. 9, 2006.
Lucent Technologies, "Reference signals when no data is transmitted in uplink", 3GPP Draft; R1-061878, 3rd Generation Partnership Project (3GPP), Mobile Competence Centre, vol. RAN WG1, Jun. 20, 2006.
Motorola, "Random Access and UL Scheduling", 3GPP Draft; R2-061464_Random_Access_and_UL_Scheduling_V2, 3rd Generation Partnership Project (3GPP), Mobile Competence Centre, vol. RAN WG2, May 4, 2006.
Extended European Search Report issued on Mar. 22, 2013 to European Patent Application No. 06843499.2-1851.
Chinese Office Action issued Apr. 3, 2013 to Chinese Patent Application No. 200680049892.8, with English translation.
"Data-non-associated L1/L2 Control Channel Structure for E-UTRA", 3GPP TSG RAN WG1 Meeting #46bis, R1 062741, NTT DOCOMO, Ericsson, Mitsubishi Electric, NEC, Panasonic, Sharp, Toshiba Corporation, pp. 1-6, (2006).
"CDM-based Multiplexing Method of Multiplex ACK/NACK and CQI for E-UTRA Uplink", 3GPP TSG RAN WG1 Meeting #46bis, R1-062742, NTT DOCOMO, Ericsson, Mitsubishi Electric, NEC, Panasonic, Sharp, Toshiba Corporation, Original R1-062742, pp. 1-6, (2006).
3GPP TR 25,814 V7.0.0, Release 7, pp. 71-74 and 78-84, (2006).
"Scheduling Request Transmission Method for E-UTRA Uplink", 3GPP TSG RAN WG1 Meeting #46bis, R1-062719, NTT DOCOMO, Ericsson, Mitsubishi Electric, NEC, Panasonic, Sharp, Toshiba Corporation, pp. 1-6, (2006).
"Uplink resource request for uplink scheduling", 3GPP TSG RAN WG1 #46bis, LG Electronics, R1-062571, Resubmission of R1-062318, pp. 1-3, (2006).

* cited by examiner

FIG.19
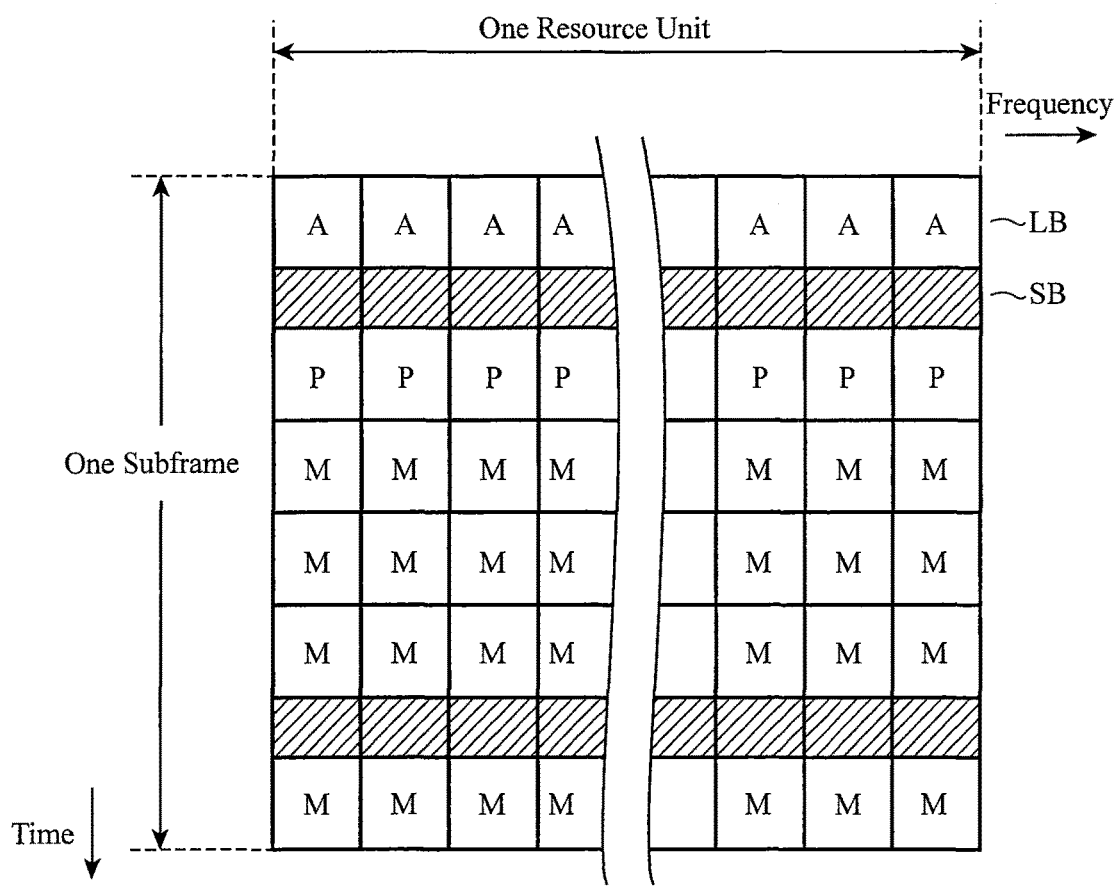
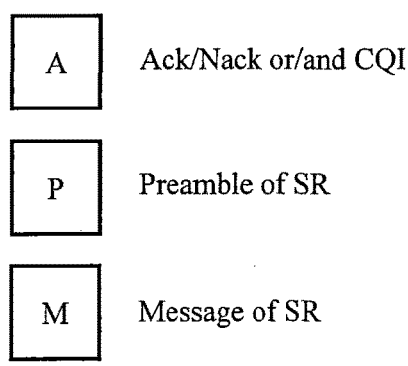
A — Ack/Nack or/and CQI
P — Preamble of SR
M — Message of SR

FIG. 28
(i) In the Case of Non-Occurrence of Receiving Error
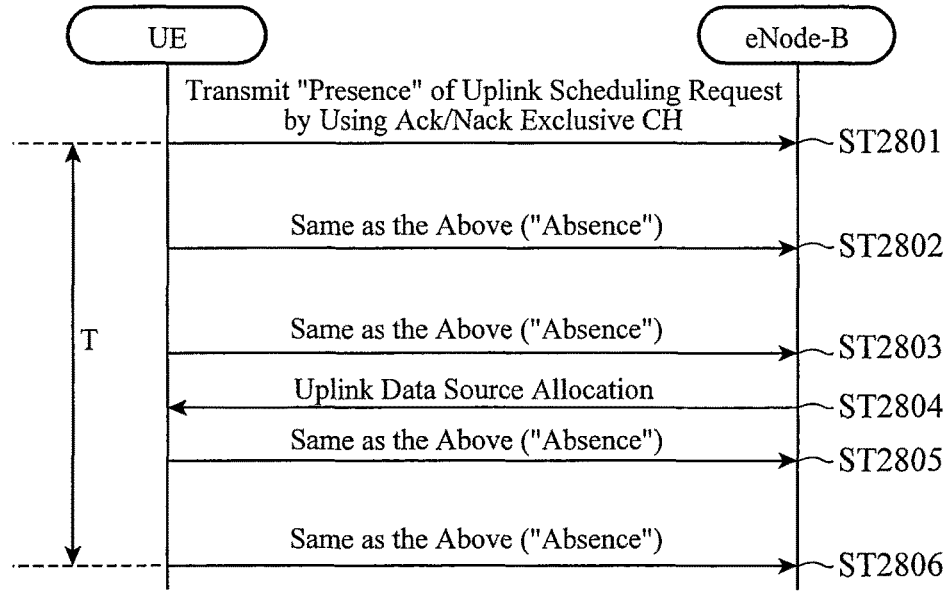
(ii) In the Case of Occurrence of Receiving Error
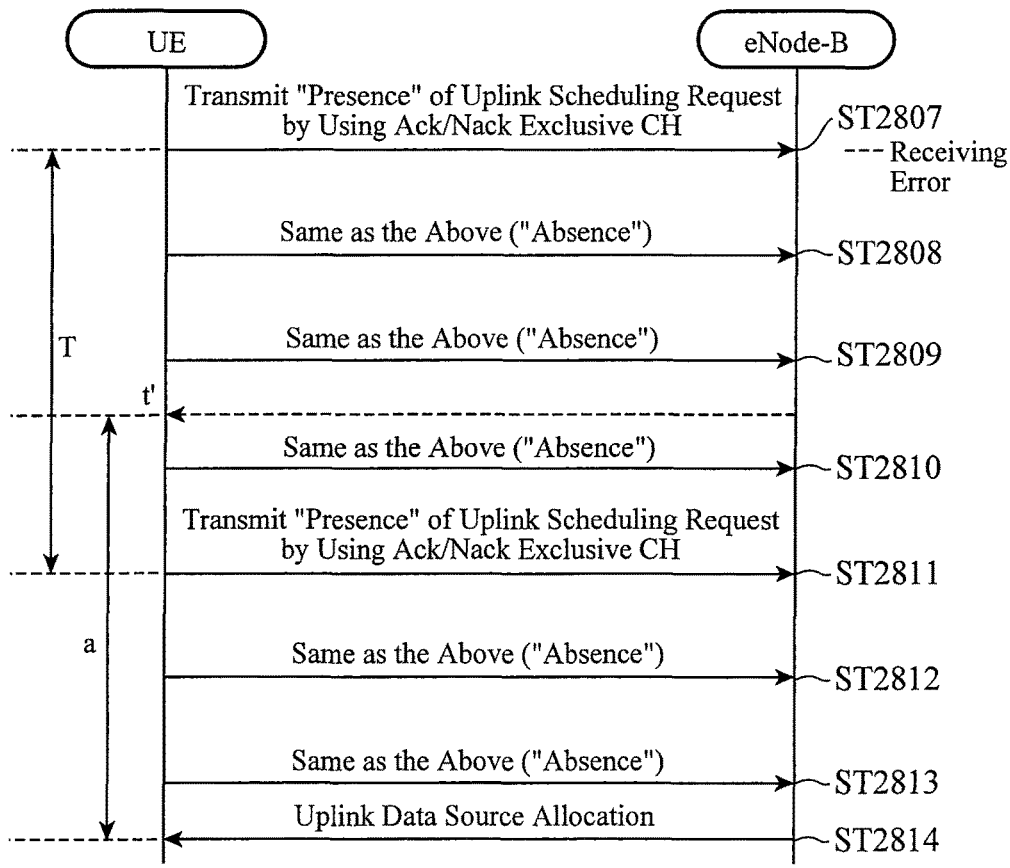

FIG. 31
(i) In the Case of Non-Occurrence of Receiving Error
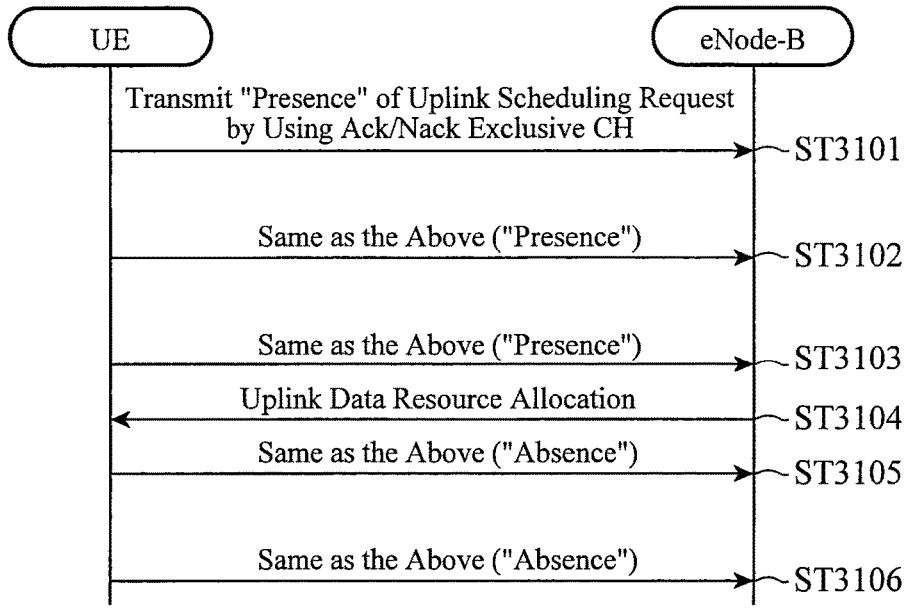
(ii) In the Case of Occurrence of Receiving Error
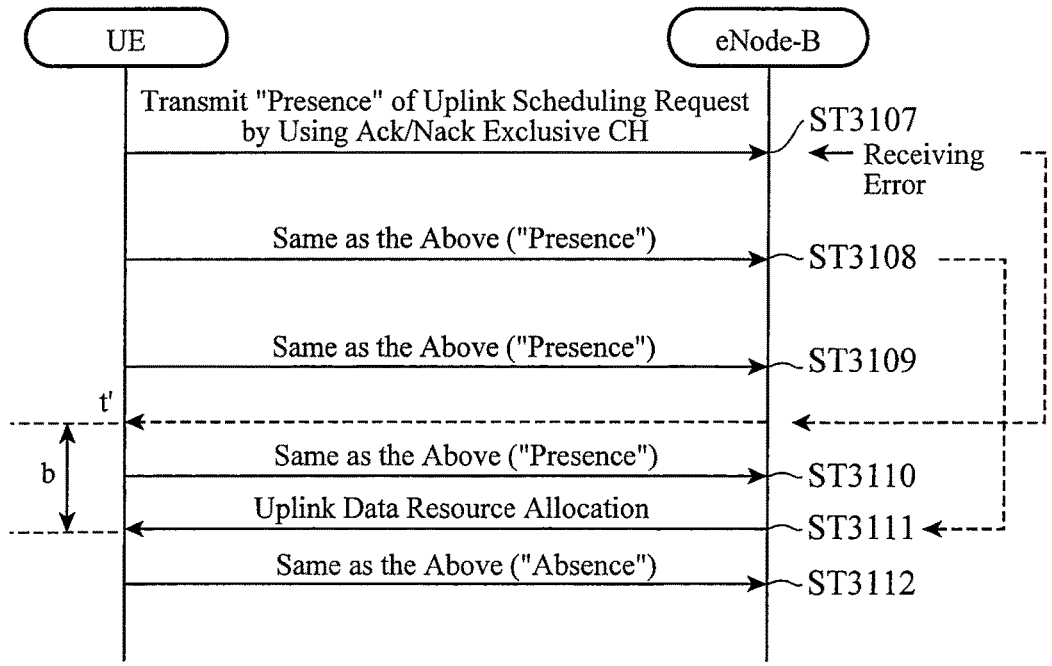

Switching Condition of Switch 3404

| In the Case of Presence of Uplink Scheduling Request | Code b |
|---|---|
| In the Case of Absence of Uplink Scheduling Request | Code a |

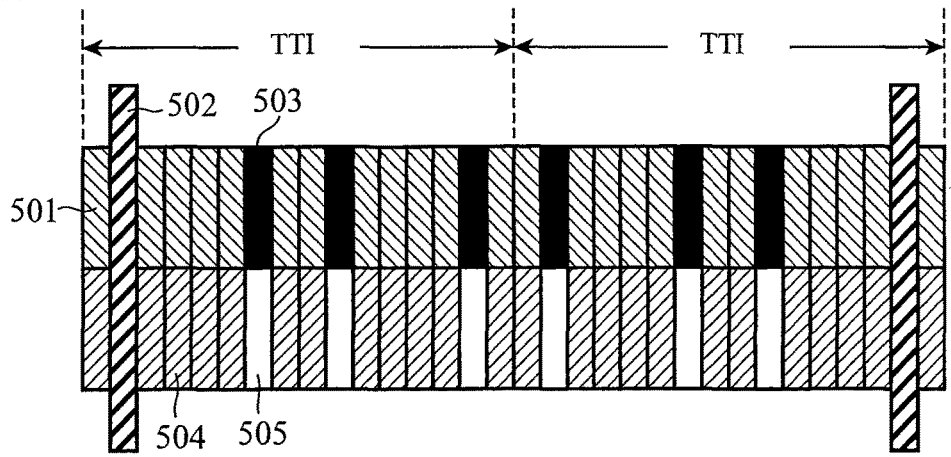

◪ Data Symbol of UE1
■ Reference Signal for Demodulation of UE1
▨ Data Symbol of UE2
☐ Reference Signal for Demodulation of UE2
▨ Sounding RS (Common to All Terminals)

(b)

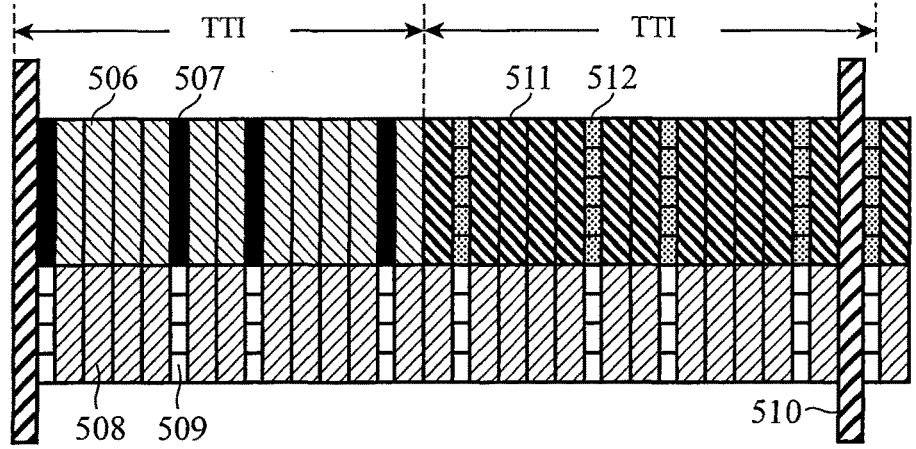

◪ Data Symbol of UE1
■ Reference Signal for Demodulation of UE1
▨ Data Symbol of UE2
☐ Reference Signal for Demodulation of UE2
▨ Data Symbol of UE3
▦ Reference Signal for Demodulation of UE3
▨ Sounding RS (Common to All Terminals)

FIG.38
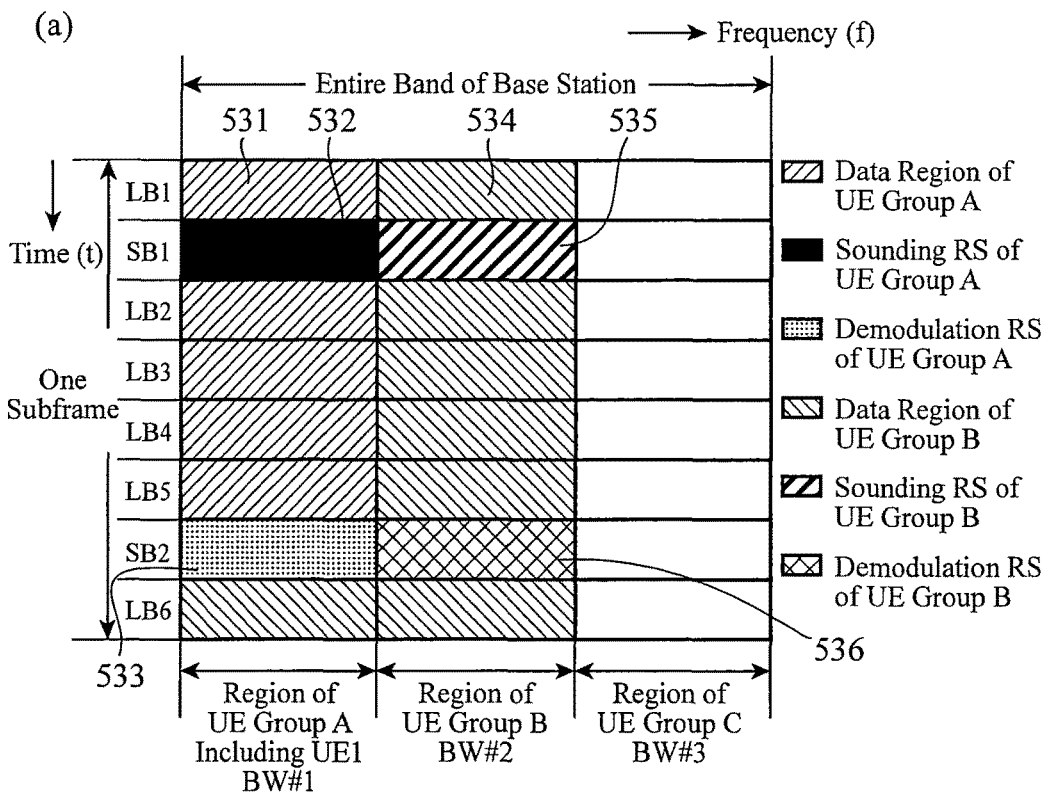
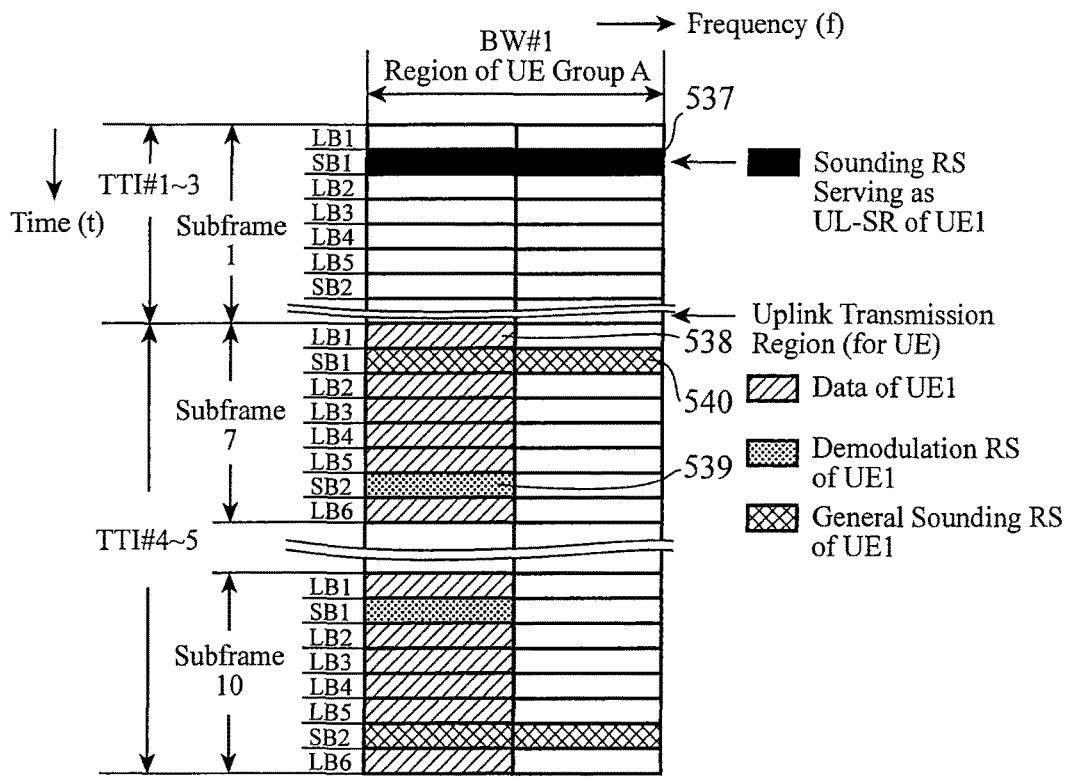

FIG.42
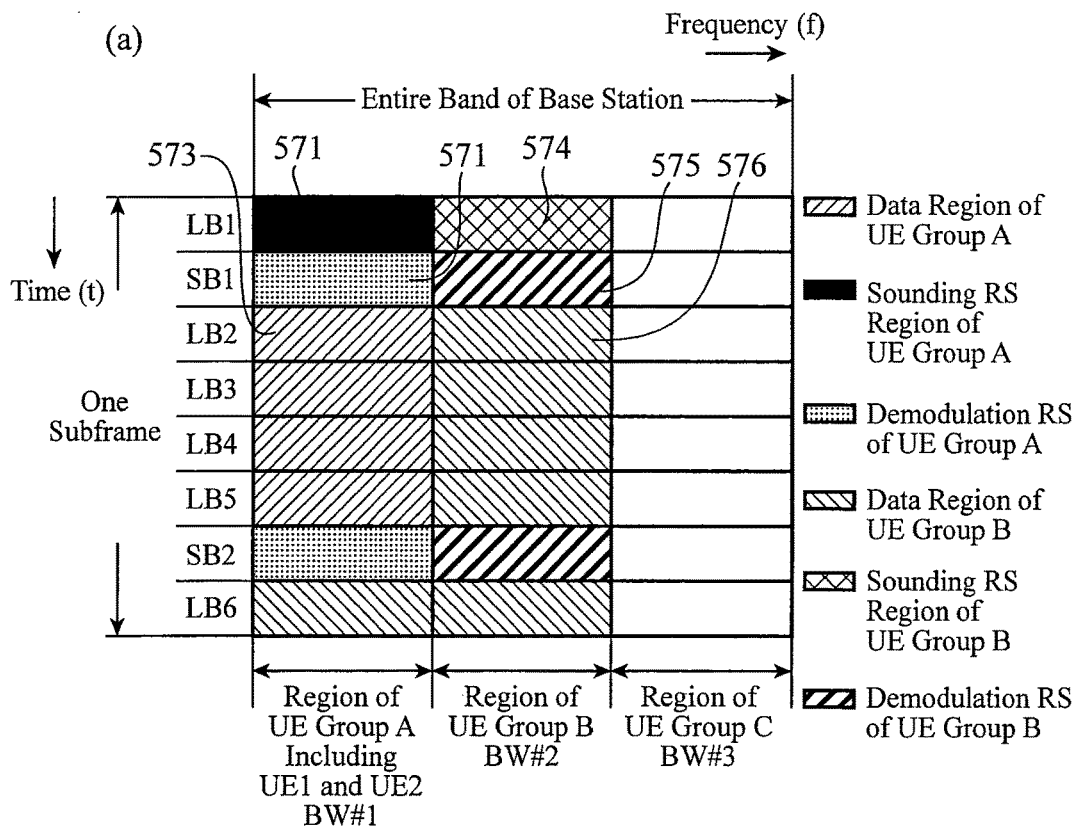
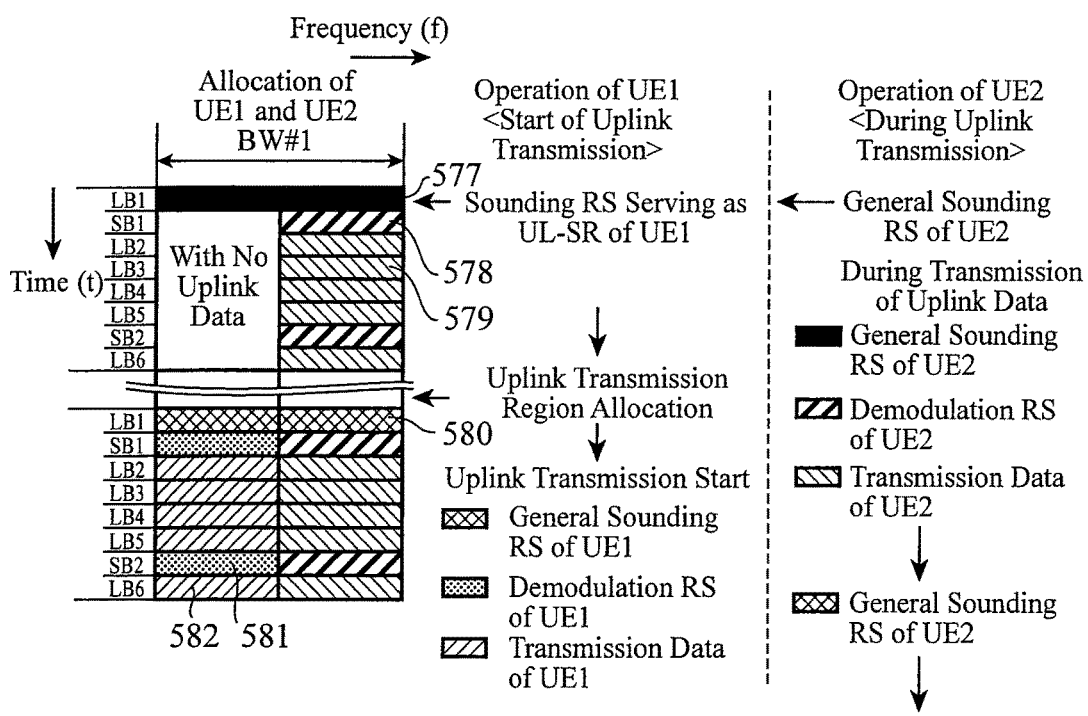

| Uplink Scheduling Request | Symbol for SR |
|---|---|
| Absence | 1 |
| Presence | 0 |

| Uplink Scheduling Request | Code for UE Identification |
|---|---|
| Absence | Code A |
| Presence | Code B |

| Uplink Scheduling Request | Code for SR Presence or Absence Identification |
|---|---|
| Absence | — |
| Presence | Code a |

FIG.56
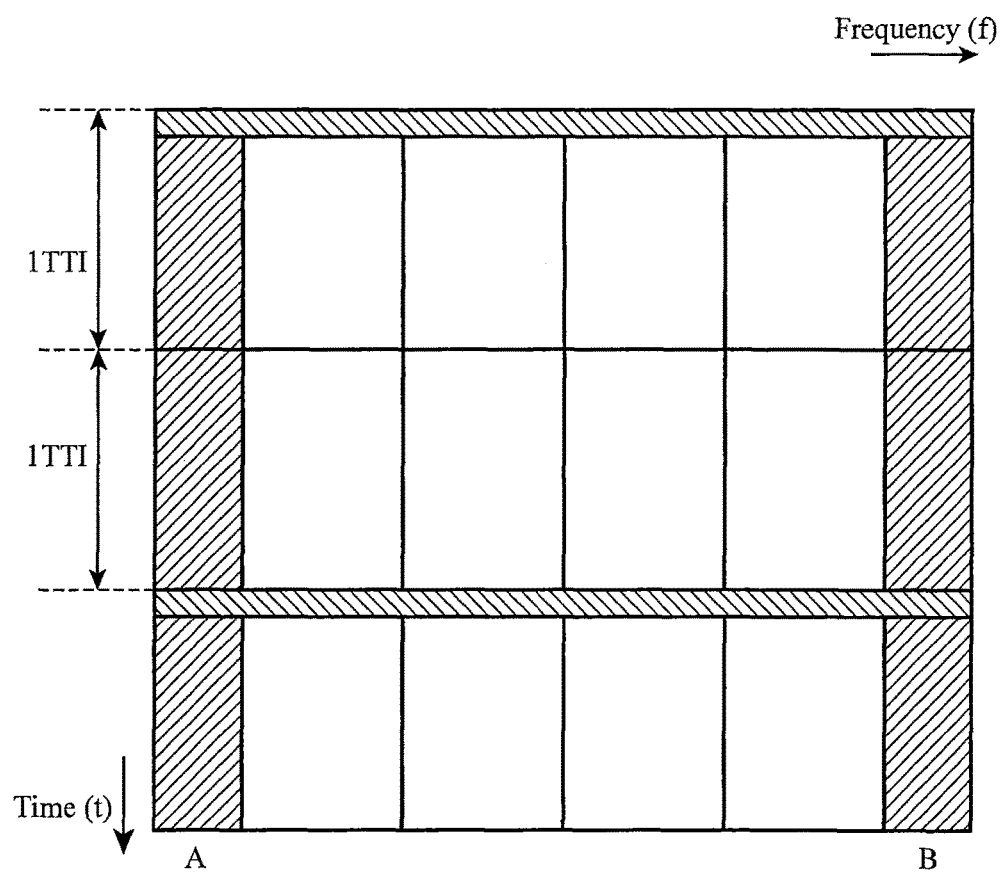
Transmission of Data, and Ack/Nack or/and CQI at Time of Transmission of Data
Ack/Nack or/and CQI at Time of Not Performing Transmission of Data (Ack/Nack Exclusive Channel)
Region for Sounding RS ☐ Transmission of Data,
and Ack/Nack or/and CQI at Time of Transmission of Data ▨ Ack/Nack or/and CQI at Time of Not Performing Transmission of Data
(Ack/Nack Exclusive Channel)

▨ Region for Sounding RS

☐ Transmission of Data, and Ack/Nack or/and CQI at Time of Transmission of Data

▨ Ack/Nack or/and CQI at Time of Not Performing Transmission of Data (Ack/Nack Exclusive Channel)

▧ Region for Sounding RS

DATA COMMUNICATION METHOD, COMMUNICATION SYSTEM AND MOBILE TERMINAL

CROSS-REFERENCE TO RELATED APPLICATIONS

This application is a continuation of U.S. patent application Ser. No. 12/375,574, filed Jan. 29, 2009, which is a National Stage application of PCT Application No. PCT/JP2006/326117, filed Dec. 27, 2006, which claims priority to Japanese Patent Application No. 2006-292641, filed Oct. 27, 2006. The entire contents of U.S. patent application Ser. No. 12/375,574 are incorporated herein by reference in their entirety.

FIELD OF THE INVENTION

The present invention relates to a communication system which is called "Long Term Evolution" (LTE), a mobile terminal which constructs this communication system, and a communication method for an uplink control signal which this mobile terminal transmits to a base station.

BACKGROUND OF THE INVENTION

Commercial services which employ a W-CDMA (Wideband Code division Multiple Access) method which is included in communication methods called a third generation were started in Japan since 2001. Furthermore, a start of a service with HSDPA (High Speed Down Link Packet Access) which implements a further improvement in the speed of data transmission using downlinks (an individual data channel and an associated control channel) by adding a channel for packet transmission (HS-DSCH: High Speed-Downlink Shared Channel) to the downlinks has been planned. In addition, an HSUPA (High Speed Up Link Packet Access) method has also been suggested and studied in order to speed up uplink data transmission.

The W-CDMA is a communication method which was determined by the 3GPP (3rd Generation Partnership Project) which is the organization of standardization of mobile communication systems, and the technical specification of the release 6 has been being organized currently.

In the 3GPP, as a communication method different from the W-CDMA, a new communication method having a wireless section, which is referred to as "Long Term Evolution" (LTE), and a whole system structure including a core network, which is referred to as "System Architecture Evolution" (SAE), has been studied.

The LTE has an access method, a radio channel configuration, and protocols which are different from those of the current W-CDMA (HSDPA/HSUPA). For example, while the W-CDMA uses, as its access method, code division multiple access (Code Division Multiple Access), the LTE uses, as its access method, OFDM (Orthogonal Frequency Division Multiplexing) for the downlink direction and uses SC-FDMA (Single Career Frequency Division Multiple Access) for the uplink direction. Furthermore, while the W-CDMA has a bandwidth of 5 MHz, the LTE can have a bandwidth of 1.25/2.5/5/10/15/20 MHz. In addition, the LTE uses only a packet communication method, instead of a circuit switching method which the W-CDMA uses.

According to the LTE, because a communication system is constructed using a new core network different from a core network (General Packet Radio System GPRS) which complies with the W-CDMA, the communication system is defined as an independent radio access network which is separate from a W-CDMA network. Therefore, in order to distinguish from a communication system which complies with the W-CDMA, in a communication system which complies with the LTE, abase station (Base station) which communicates with a mobile terminal UE (User Equipment) is called eNB (E-UTRAN NodeB, eNodeB, or eNode-B), a base station control apparatus (Radio Network Controller) which performs exchange of control data and user data with a plurality of base stations and is called an aGW (Access Gateway).

This communication system which complies with the LTE carries out point-to-multipoint (Point to Multipoint) communications, such as a multicast and broadcast type multimedia service called a E-MBMS (Evolved Multimedia Broadcast Multicast Service), and also provides a communication service such as a unicast (Unicast) service for each mobile terminal among a plurality of mobile terminals.

In the case of the LTE, because no individual channels (Dedicated Channel and Dedicated Physical Channel) destined for each mobile terminal exist in transport channels and physical channels, transmission of data to each mobile terminal is carried out by using a common channel (Shared channel), unlike in the case of the W-CDMA.

When receiving data, via a downlink, from a base station, a mobile terminal transmits a signal indicating whether the mobile terminal has received the data perfectly, and a signal indicating either the quality of the received data or the quality of the downlink communication path to the base station via an uplink. The response signal indicating whether the mobile terminal could receive the data correctly from the base station is referred to as an Ack/Nack, and the quality information indicating the quality of the received data or the quality of the downlink communication path is referred to as a CQI (Channel Quality Indicator).

An Ack/Nack is a signal with which, when the mobile terminal has received downlink data, the mobile terminal notifies information indicating whether the mobile terminal could receive the downlink data correctly to the base station, and the base station uses the Ack/Nack for retransmission control.

A CQI is a signal with which the mobile terminal notifies the downlink channel's state (the communication path's state) which the mobile terminal has measured to the base station, and the base station uses the CQI for downlink scheduling. Furthermore, when data which the mobile terminal has to transmit to the base station occur, the mobile terminal transmits a signal with which to make a request for allocation of uplink radio resources to the base station. Such a request signal is called a scheduling request, an uplink resource request, or an uplink scheduling request signal (SR: Scheduling Request). The Ack/Nack, the CQI, and the SR as mentioned above are called "uplink L1/L2 control signals" (an L1/L2 control signaling).

FIG. 22 is an explanatory drawing for explaining uplink L1/L2 control signals.

As shown in FIG. 22, uplink L1/L2 control signals are roughly divided into two types of L1/L2 control signals. They are uplink-data-associated L1/L2 control signals (a data-associated L1/L2 control signaling), and uplink-data-non-associated L1/L2 control signals (a data-non-associated L1/L2 control signaling).

An uplink-data-associated L1/L2 control signal is information required for uplink data transmission (reception by a base station), such as a transport format, and is transmitted together with uplink data. Uplink-data-non-associated L1/L2 control signals include an Ack/Nack and a CQI which are relevant to a downlink, and random access (Random Access) signals, such as a scheduling request (SR, UL SR) which is transmitted before uplink data transmission is started.

Although an Ack/Nack and a CQI are transmitted regardless of uplink data transmission because they are relevant to a downlink, there is a case in which they are transmitted at the same time when uplink data are transmitted. On the other hand, random access signals include a synchronous random access (Synchronous Random Access which is referred to as SRA from here on) signal and a non-synchronous random access (Non-Synchronous Random Access which is referred to as NSRA from here on) signal.

An SRA is transmitted in a state in which uplink time synchronization is established, whereas an NSRA is transmitted in a state in which uplink time synchronization is not established.

Not only uplink-data-associated L1/L2 control signals but also an Ack/Nack and a CQI are transmitted in a state in which uplink time synchronization is established. Hereafter, the fact that there is a state in which an Ack/Nack and/or a CQI, and an SRA in a case in which no uplink data transmission is carried out are transmitted simultaneously will be mentioned, and a problem with this state and a solution of this problem will be mentioned.

An uplink Ack/Nack and an uplink CQI are relevant to a downlink. For allocation of an Ack/Nack and a CQI to physical resources to in the case in which no uplink data transmission is carried out, a method of monopolistically allocating one certain time-frequency region or a method of monopolistically allocating a plurality of time-frequency regions having separated narrow bands is used (for example, refer to nonpatent reference 1).

Hereafter, these regions are referred to as an Ack/Nack exclusive channel.

That is, in a state in which uplink data transmission is not performed, an Ack/Nack and a CQI are transmitted by using an Ack/Nack exclusive channel.

In further explaining in detail, (1) in a case in which both an Ack/Nack and a CQI have to be transmitted, the Ack/Nack and the CQI are transmitted by using an Ack/Nack exclusive channel, (2) in a case in which an Ack/Nack has to be transmitted, but a CQI does not have to be transmitted, the Ack/Nack is transmitted by using an Ack/Nack exclusive channel, and (3) in a case in which an Ack/Nack does not have to be transmitted, but a CQI has to be transmitted, the CQI is transmitted by using an Ack/Nack exclusive channel. It can also be considered that, (4) even in a case in which an Ack/Nack does not have to be transmitted, and a CQI does not have to be transmitted, an Ack/Nack exclusive channel is allocated to them. In this case, both no Ack/Nack and no CQI are transmitted by using the above-mentioned channel.

FIG. 23 is an explanatory drawing showing radio resources to which an Ack/Nack and a CQI are allocated in the case in which uplink data transmission is carried out or in the case in which no uplink data transmission is carried out. FIG. 23 shows the method of monopolistically allocating one certain time-frequency region.

An Ack/Nack and a CQI in the case in which no uplink data transmission is carried out are allocated to a region having one or more subframes with respect to time and are allocated to a region having one or more resource units with respect to frequency. In contrast, uplink data, and an Ack/Nack and a CQI in the case in which transmission of either an uplink-data-associated L1/L2 control signal or the uplink data is carried out are allocated to another region.

By allocating an Ack/Nack and a CQI in the case in which no uplink data transmission is carried out, i.e., signals associated with only an Ack/Nack and a CQI to a monopolistic region intended only for the signals, a time during which the Ack/Nack and CQI signals are transmitted can be increased, and therefore a large coverage can be acquired.

FIG. 24 is an explanatory drawing showing radio resources in which an Ack/Nack and a CQI are allocated to an Ack/Nack exclusive channel. FIG. 24 shows the method of monopolistically allocating a plurality of time-frequency regions (A and B in FIG. 24) having separated narrow bands for an Ack/Nack and a CQI.

An Ack/Nack and a CQI in the case in which no uplink data transmission is carried out are allocated to some separated regions in units of a subframe with respect to time and are allocated to some separated regions in units of a subcarrier with respect to frequency. By separating the frequency region into some parts (e.g., A and B in FIG. 24), a frequency diversity gain can be acquired.

When using either of the methods, an Ack/Nack and a CQI of one or more mobile terminals can be allocated to one region. It has been studied to, in order to implement a method of multiplexing an Ack/Nack and a CQI of one or more mobile terminals into one region, establish the orthogonality of each mobile terminal by using FDM (Frequency Division Multiplex)/TDM (Time Division Multiplex)/CDM (Code Division Multiplex). In order to ensure the quality of reception of an Ack/Nack and a CQI by a base station, it has been studied to increase the power by carrying out repetition (repetition) transmission of the Ack/Nack and the CQI. More specifically, there are a method of repeatedly transmitting the same subframe twice within one transmission time interval (Transmission Time Interval TTI), a method of repeatedly including a bit of an Ack/Nack and a bit of a CQI to a plurality of LBs (Long Block) in a subframe so as to transmit them, and so on.

A synchronous random access (Synchronous Random Access SRA) is a signal used for a scheduling request (SR) which a mobile terminal transmits before starting uplink data transmission, which the mobile terminal transmits when the mobile terminal is placed in a state in which uplink time synchronization is established (in other words, the mobile terminal is placed in an Active mode). As a method of allocating an SRA to physical resources, there is provided a method of monopolistically allocating one certain time-frequency region (Nonpatent reference 3: TR25.814V7.0.0). FIG. 25 is an explanatory drawing showing radio resources in which an uplink scheduling request signal is allocated to an S-RACH. FIG. 25 shows the method of monopolistically allocating one certain time-frequency region.

An SRA is allocated to a region in units of a subframe with respect to time and is allocated to a region in units of one or more resource units with respect to frequency. Hereafter, these regions are referred to as an S-RACH (Synchronous Random Access CHannel). In contrast, uplink data are allocated to other regions. Therefore, an SRA and data are multiplexed with respect to either or both of time and frequency.

With which region a mobile terminal transmits an SRA is predetermined or is notified in advance from a base station. An SRA of one or more mobile terminals is allocated to one region. When transmissions of SRAs of a plurality of mobile terminals occur with an identical region, the signals from the plurality of mobile terminals will collide with one another.

When the SRAs from the plurality of mobile terminals collide with one another and therefore the base station cannot receive them, each of the plurality of mobile terminals generally repeats transmission of its SRA again with either or both of a different periodicity and a different region. In order to reduce the probability that SRAs from a plurality of mobile terminals collide with one another, a method of establishing the orthogonality of each mobile terminal by using FDM/TDM/CDM has been studied.

Use of a scheduled channel has been also studied as allocation of a synchronous random access SRA to physical resources (nonpatent reference 4).

A scheduled channel is scheduled to be allocated to each target mobile terminal, unlike a channel, such as an S-RACH, in which collision (or referred to as competition) of signals from a plurality of mobile terminals is allowed. In this case, because a region which is allocated in advance to each mobile terminal is decided, there is no competition between signals from a plurality of mobile terminals, and therefore there is no necessity for the ID number (the UE-ID) of each mobile terminal which is effective within the cell of the base station to be mapped onto an SR signal which each mobile terminal has transmitted. Therefore, in a case in which an uplink SRA is transmitted by using a scheduled channel, the amount of information of the uplink SR signal can be reduced.

A process of transmitting an Ack/Nack and a CQI, and an synchronous random access (an SR or the like) simultaneously in the case in which no uplink data transmission is carried out will be explained.

An uplink Ack/Nack and an uplink CQI are the ones which, when a mobile terminal is receiving downlink data from a base station, the mobile terminal transmits to the base station according to the status of the reception. In contrast, an SRA is the one which the mobile terminal transmits to the base station for an SR or the like before starting transmission of uplink data. Because the descriptions of these signals are independent from one another, there can be a case in which the mobile terminal transmits them simultaneously.

FIG. 26 shows an example in which a mobile terminal transmits an Ack/Nack and an SRA simultaneously in the case in which the mobile terminal is not carrying out any uplink data transmission.

This example is a case in which transmission of uplink data occurs while the mobile terminal carries out continuous reception of downlink data. The mobile terminal is receiving downlink data continuously. The data are demodulated and decoded in units of each TTI. The mobile terminal transmits result information (Ack/Nack) indicating a result of judgment of the reception to the base station according to the status of the reception of the downlink data. When receiving the transmission data normally from the base station, the mobile terminal transmits an Ack signal to the base station. The base station which has received the Ack transmits new data next time. In contrast with this, when not being able to receive the transmission data transmitted normally from the base station, the mobile terminal transmits a Nack signal to the base station. The base station which has received the Nack retransmits the data which the mobile terminal was not able to receive normally to the mobile terminal.

Allocation of the uplink Ack/Nack to physical resources is implemented by monopolistically allocating a plurality of time-frequency regions having separated narrow bands, as previously explained. Therefore, the uplink Ack/Nack is also transmitted continuously. In contrast, when uplink data occurs in the mobile terminal, the mobile terminal transmits a scheduling request SR to the base station before transmitting the uplink data. Allocation of the SR to physical resource is implemented by monopolistically allocating one certain time-frequency region, as previously explained. Therefore, as shown in the figure, when uplink data occur at a certain time, an SR occurs with a short time delay.

When the base station is not able to receive the SR signal which the mobile terminal has transmitted, the mobile terminal transmits the SR signal again. As can be seen from the above explanation, there occurs a status in which, when transmission of uplink data occurs while, for example, a mobile terminal carries out continuous reception of downlink data, the mobile terminal has to transmit an uplink Ack/Nack and an uplink SRA simultaneously. Furthermore, even though the mobile terminal does not receive the downlink data continuously, but receives the downlink data discontinuously, it is apparent that there may be a case in which the mobile terminal carries out the transmission of the uplink SR signal simultaneously if the mobile terminal transmits the uplink Ack/Nack which is a response to the received data.

Similarly, it can be considered that, also when a scheduled channel is allocated as allocation of the scheduling request SR, which the mobile terminal transmits to the base station, to physical resources, there occurs a status in which the mobile terminal have to transmit the uplink Ack/Nack and the uplink SRA simultaneously.

Nonpatent reference 4 describes nothing about what type of channel is used as a scheduled channel and how to allocate a time-frequency region as a physical resource. It is therefore understood that even if there is provided, for example, a channel in which a 1-bit physical resource intended only for a scheduling request SR is allocated, the mobile terminal has to transmit an uplink Ack/Nack continuously when carrying out continuous reception of downlink data, and therefore there occurs a status in which, when transmission of uplink data occurs at that time, the mobile terminal has to transmit an uplink Ack/Nack and an uplink SRA simultaneously.

Furthermore, the nonpatent reference 4 suggests nothing about "the problems of the invention" and "the advantages of the invention" which will be shown in the specification of the present invention.

Nonpatent reference 5 discloses transmitting an uplink scheduling request by using an individual uplink control channel, such as an existing channel (CQICH) for CQI transmission or an existing channel (ACHCH) for Ack/Nack transmission. The reference shows that, as a result, a transmission procedure of transmitting an uplink scheduling request with little delay (Delay) can be established.

However, the nonpatent reference 5 suggests nothing about "the problems of the invention" and "the advantages of the invention" which will be shown in the specification of the present invention.

The nonpatent reference 5 discloses only transmitting an uplink scheduling request by using either a channel (CQICH) for CQI transmission or a channel (ACHCH) for Ack/Nack transmission, but discloses nothing about how to allocate the CQICH and the ACHCH, as physical resources, to a time-frequency region. It is therefore understood that even if a case in which an uplink scheduling request is transmitted by using, for example, a channel (CQICH) for CQI transmission, is considered, when a mobile terminal is carrying out continuous reception of downlink data, the mobile terminal has to transmit an uplink Ack/Nack continuously, and therefore there occurs a status in which, when transmission of uplink data occurs at that time, the mobile terminal has to transmit an uplink Ack/Nack (ACHCH) and an uplink scheduling request (CQICH) simultaneously.

It is therefore understood that the nonpatent reference 5 does not solve "the problems of the invention" shown in the specification of the present invention.

[Nonpatent reference 1] 3GPP contributions R1-062741
[Nonpatent reference 2] 3GPP contributions R1-062742
[Nonpatent reference 3] 3GPP TR25.814V7.0.0
[Nonpatent reference 4] 3GPP contributions R1-062719
[Nonpatent reference 5] 3GPP contributions R1-062571

Because conventional communication systems which comply with the LTE are constructed as mentioned above, an SC-FDMA (Single Career Frequency Division Multiple Access which is also referred to as DFT-spread OFDM) is used as an uplink access method. Because the SC-FDMA is single carrier transmission, compared with multi carrier transmission, such as OFDM, in which symbolic data are transmitted with them being piggybacked onto each subcarrier, the SC-FDMA has a feature of being able to reduce the PAPR (Peak to Average Power Ratio peak to average power ratio). Therefore, because the power consumption of a mobile terminal can be reduced at a time when the mobile terminal carries out transmission and the transmit power which satisfies defined adjacent channel leakage power can be increased, there is provided an advantage of widening the cell coverage. However, there may be a case in which a mobile terminal has to simultaneously carry out a process of transmitting an uplink Ack/Nack and an uplink CQI by using an Ack/Nack exclusive channel and a process of transmitting an uplink scheduling request signal (SR) by using an S-RACH or a scheduled channel, or a CQICH and an ACHCH according on its status. In this case, because those signals have no correlation among them, when transmitted simultaneously, they are not transmitted with single carrier transmission, but are transmitted with multi carrier transmission. In the case in which such signals having no correlation among them are transmitted simultaneously, the PAPR becomes high because the time waveforms of the transmission signals have a high peak. A problem is that as the PAPR becomes high, the power consumption of the mobile terminal increases and therefore the cell coverage becomes narrow. A further problem is that as the PAPR becomes high, those signals become an interference wave to other mobile terminals and the communication system.

The present invention is made in order to solve the above-mentioned problems, and it is therefore an object of the present invention to provide a data communication method, a communication system, and a mobile terminal which can prevent increase in the radio resources load due to temporary increase in the physical channels and can also reduce the PAPR (peak to average power ratio).

DISCLOSURE OF THE INVENTION

In accordance with the present invention, there is provided a data communication method with which a mobile terminal carries out a response signal transmission process of transmitting a response signal to a base station by using an uplink control channel in an uplink direction from the mobile terminal to the base station, a scheduling request signal transmission process of transmitting a scheduling request signal to the base station by using a physical channel different from the uplink control channel when transmission data to be transmitted to the base station occur, and a control process of, when a processing timing of the response signal transmission process coincides with that of the scheduling request signal transmission process, stopping the response signal transmission process during a time interval during which the mobile terminal transmits the scheduling request signal.

As a result, because it is not necessary to use a multi carrier method of simultaneously transmitting data associated with two physical channels (an Ack/Nack exclusive channel an S-RACH) which are allocated to two types of bands, there is provided an advantage of being able to prevent the increase in the radio resource load of the communication system due to temporary increase in the physical channels, and to reduce the PAPR (peak to average power ratio).

In accordance with the present invention, there is provided a communications system in which a mobile terminal includes: a transmitting unit for transmitting a response signal to a base station by using an uplink control channel in an uplink direction from the mobile terminal to the base station, and for transmitting a scheduling request signal to the base station by using a physical channel different from the uplink control channel when transmission data to be transmitted to the base station occur; and a control unit for, when a transmission timing of the response signal coincides with that of the scheduling request signal in the transmitting unit, stopping the transmission process of transmitting the response signal during a time interval during which the transmitting unit transmits the scheduling request signal.

As a result, because it is not necessary to use a multi carrier method of simultaneously transmitting data associated with two physical channels (an Ack/Nack exclusive channel an S-RACH) which are allocated to two types of bands, there is provided an advantage of being able to prevent the increase in the radio resource load of the communication system due to temporary increase in the physical channels, and to reduce the PAPR (peak to average power ratio).

In accordance with the present invention, there is provided a data communication method with which a mobile terminal carries out a control signal generation process of generating an uplink control signal including at least a response signal, while, when transmission data to be transmitted to a base station occur, performing time division multiplexing of a scheduling request signal and the response signal to generate the uplink control signal, and a control signal transmission process of transmitting a control signal including the uplink control signal generated through the control signal generation process to the base station by using an uplink control channel in an uplink direction from the mobile terminal to the base station.

As a result, because it is not necessary to use a multi carrier method of simultaneously transmitting data associated with two physical channels (an Ack/Nack exclusive channel an S-RACH) which are allocated to two types of bands, there is provided an advantage of being able to prevent the increase in the radio resource load of the communication system due to temporary increase in the physical channels, and to reduce the PAPR (peak to average power ratio).

In accordance with the present invention, there is provided a data communication method with which a mobile terminal selectively carries out either a process of coding individual data by using a first code or a process of coding the individual data including a scheduling request signal by using a second code when transmission data to be transmitted the base station occur, and also carries out a process of transmitting the coded individual data by using an uplink common channel.

As a result, because it is not necessary to use a multi carrier method of simultaneously transmitting data associated with two physical channels (an Ack/Nack exclusive channel an S-RACH) which are allocated to two types of bands, there is provided an advantage of being able to prevent the increase in the radio resource load of the communication system due to temporary increase in the physical channels, and to reduce the PAPR (peak to average power ratio).

In accordance with the present invention, there is provided a data communication method with which a mobile terminal carries out a control signal generation process of, when transmission data to be transmitted to abase station occur, performing time division multiplexing of at least a scheduling request signal and a response signal to generate an uplink control signal, and a control signal transmission process of transmitting a control signal including the uplink control signal generated through the control signal generation process to the base station by using a random access channel which is a physical channel.

As a result, because it is not necessary to use a multi carrier method of simultaneously transmitting data associated with two physical channels (an Ack/Nack exclusive channel an S-RACH) which are allocated to two types of bands, there is provided an advantage of being able to prevent the increase in the radio resource load of the communication system due to temporary increase in the physical channels, and to reduce the PAPR (peak to average power ratio).

BRIEF DESCRIPTION OF THE FIGURES

FIG. 19 is an explanatory drawing showing radio resources in which a preamble and a message, an Ack/Nack, a CQI, and an SR are mapped onto an S-RACH;

FIG. 28 is a sequence diagram in a case of a first example of a setting;

FIG. 31 is a sequence diagram in a case of a second example of the setting;

FIG. 35 is an explanatory drawing of allocation of radio resources for a Sounding RS during transmission of uplink data in Embodiment 7;

FIG. 38 is an explanatory drawing showing a method of allocating radio resources in a case in which a base station sets up a plurality of BWs for a usual Sounding RS, and the circumstances of allocation of radio resources to a mobile terminal UE1;

FIG. 42 is an explanatory drawing of allocation of radio resources in a plurality of UEs in one UE group;

FIG. 56 is an explanatory drawing of a time-frequency resource in a case of allocating a region of RS for sounding to all of the entire band of the system;

PREFERRED EMBODIMENTS OF THE INVENTION

Hereafter, in order to explain this invention in greater detail, the preferred embodiments of the present invention will be described with reference to the accompanying drawings. Embodiment 1.

Figure 1:
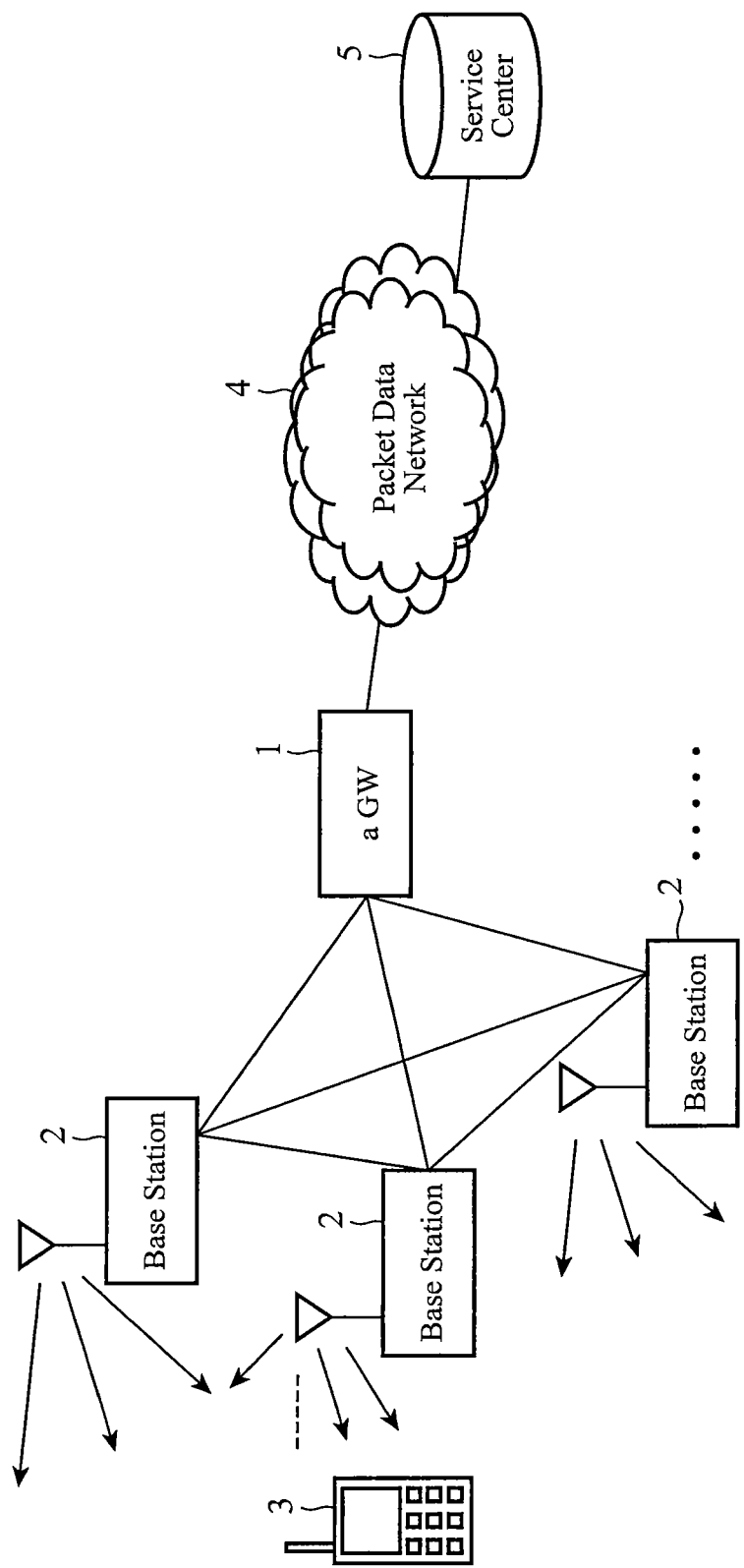
FIG. 1 is an explanatory drawing showing the structure of a mobile communication system mobile communication system which complies with LTE.

FIG. 1 is an explanatory drawing showing the structure of a mobile communication system which complies with LTE. In FIG. 1, an aGW 1 performs transmission and reception of control data and user data with a plurality of base stations (eNodeB) 2, and a base station 2 transmits and receives data to and from a plurality of mobile terminals 3. Between a base station 2 and a mobile terminal 3, broadcast information, information used for processing a call, individual control data, individual user data, control data for E-MBMS, user data, and so on are transmitted. It has also been studied that base stations 2 communicate with each other.

A base station 2 has uplink and downlink schedulers. These schedulers of a base station 2 enable transmission and reception of data between the base station 2 and each mobile terminal 3, and carry out scheduling for improvements in the throughput of each mobile terminal 3 and that of the whole mobile communication system.

A E-MBMS provides a broadcast type point-to-multipoint (Point to Multipoint PtoM) communication service with which data are transmitted at a time from a certain base station toward a plurality of mobile terminals. Concretely, an information service, such as news or weather forecast, and a large-volume broadcast service, such as mobile TV, have been studied.

The aGW 1 communicates with a service center 5 via a PDN 4 (Packet Data Network).

The service center 5 stores and distributes a content used for providing a service for users. A content provider transmits E-MBMS data, such as mobile TV broadcast data, to the service center 5. The service center 5 stores the E-MBMS data therein and also transmits the E-MBMS data to base stations 2 via the PDN 4 and the aGW 1.

Figure 2:
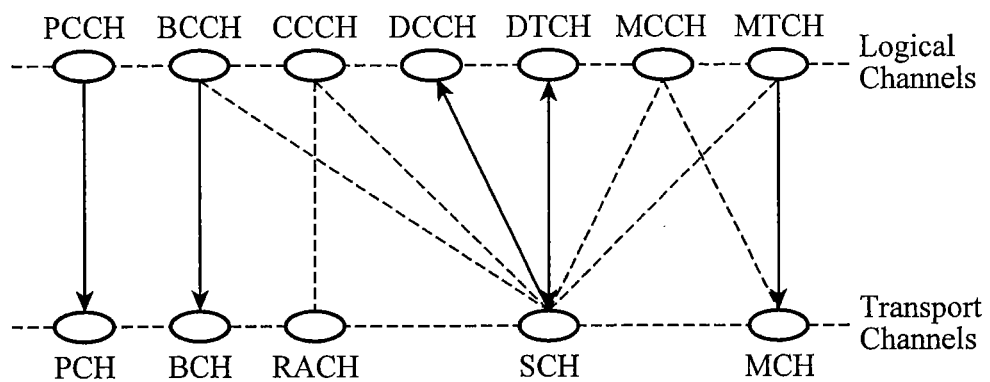
FIG. 2 is an explanatory drawing showing the structure of channels for use with the communications system which complies with LTE.

FIG. 2 is an explanatory drawing showing the structure of channels. Mapping of logical channels (Logical channels) and transport channels (Transport channels) is shown in FIG. 2.

The logical channels are classified according to the functions and logical characteristics of transmission signals. The transport channels are classified according to transmission forms. Broadcast information is piggybacked onto a BCCH (Broadcast Control Channel). A BCCH is mapped to a BCH (Broadcast Channel) and is transmitted from a base station to mobile terminals.

Information used for processing a call is piggybacked onto a PCCH (Paging Control Channel). A PCCH is mapped to a PCH (Paging Channel) and is transmitted from a base station to mobile terminals in the cell of the base station. Individual control data destined for each mobile terminal are piggybacked onto a DCCH (Dedicated Control Channel).

Individual user data destined for each mobile terminal are piggybacked onto a DTCH (Dedicated Traffic Channel). A DCCH and a DTCH are mapped to a DL-SCH (Downlink Shared Channel), and are transmitted individually from a base station to each mobile terminal. In contrast with this, it is individually transmitted from each mobile terminal to abase station by using a UL-SCH (Uplink Shared Channel).

A DL-SCH and a UL-SCH are shared channels (Shared Channels).

Control data for E-MBMS and user data are piggybacked onto an MCCH (Multicast Control Channel) and an MTCH (Multicast Traffic Channel), respectively, and are mapped to a DL-SCH or an MCH (Multicast Channel) and are transmitted from a base station to a mobile terminal.

A connection request signal from a mobile terminal, e.g., a scheduling request signal SR is transmitted from each mobile terminal to a base station by using a random access channel (Random Access Channel RACH). An S-RACH is one of RACHs.

Figure 3:
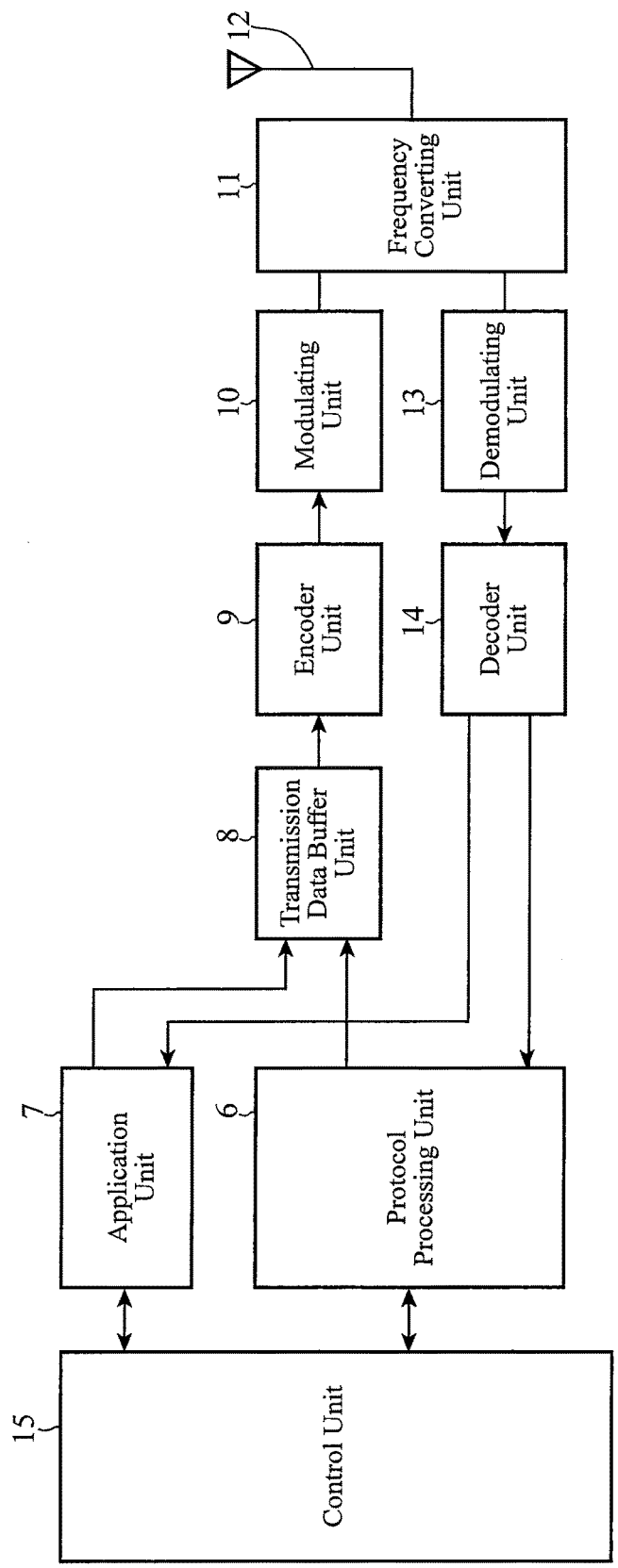
FIG. 3 is a block diagram showing the structure of a mobile terminal.

FIG. 3 is a block diagram showing the structure of a mobile terminal. A transmitting process of the mobile terminal 3 is carried out as follows.

First, control data from a protocol processing unit 6 and user data from an application unit 7 are stored in a transmission data buffer unit 8.

The data stored in the transmission data buffer unit 8 are delivered to an encoder unit 9, and the encoder unit performs an encoding process, such as an error correction, on the data. There can exist data on which no encoding process is performed and which are directly outputted from the transmission data buffer unit 8 to a modulating unit 10.

The modulating unit 10 performs a modulation process on the data on which the encoding process has been performed by the encoder unit 9. After the modulated data are converted into a baseband signal, this baseband signal is outputted to a frequency converting unit 11 and is then converted into a signal having a radio transmit frequency. After that, the transmission signal is transmitted to a base station 2 from an antenna 12.

A receiving process of the mobile terminal 3 is carried out as follows. A radio signal from the base station 2 is received by the antenna 12. The received signal having a radio receive frequency is converted into a baseband signal by the frequency converting unit 11, and a demodulating unit 13 performs a demodulation process on the baseband signal. Data which the demodulating unit obtains after demodulating the baseband signal are delivered to a decoder unit 14, and the decoder unit performs a decoding process, such as an error correction, on the data. Control data among the decoded data are delivered to the protocol processing unit 6, while user data among the decoded data are delivered to the application unit 7. The series of transmission and reception processes of the mobile terminal is controlled by a control unit 15.

Figure 4:
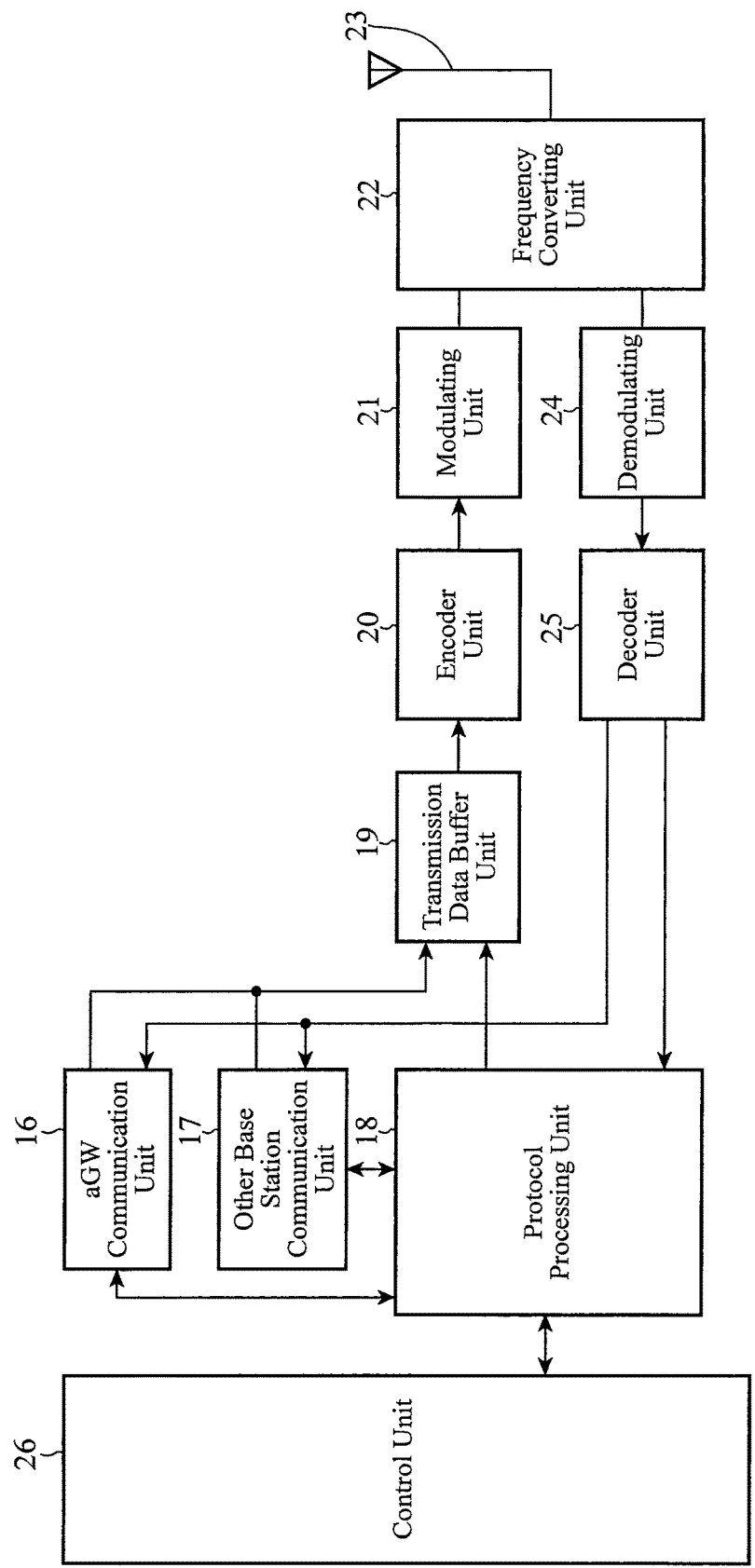
FIG. 4 is a block diagram showing the structure of a base station.

FIG. 4 is a block diagram showing the structure of a base station. A transmitting process of the base station 2 is carried out as follows.

An aGW communication unit 16 transmits and receives data between the base station 2 and an aGW 1. An other base station communication unit 17 transmits and receives data to and from another base station.

Each of the aGW communication unit 16 and the other base station communication unit 17 receives and sends information from and to a protocol processing unit 18. Control data from the protocol processing unit 18 and user data from the aGW communication unit 16 and the other base station communication unit 17 are stored in a transmission data buffer unit 19.

The data stored in the transmission data buffer unit 19 are delivered to an encoder unit 20, and the encoder unit performs an encoding process, such as an error correction, on the data. There can exist data on which no encoding process is performed and which are directly outputted from the transmission data buffer unit 19 to a modulating unit 21. The modulating unit 21 performs a modulation process on the data on which the encoding process has been performed by the encoder unit.

After the modulated data are converted into a baseband signal, this baseband signal is outputted to a frequency converting unit 22 and is then converted into a signal having a radio transmit frequency. After that, the transmission signal is transmitted from an antenna 23 to one or more mobile terminals 1.

A receiving process of the base station 2 is carried out as follows.

A radio signal from one or more mobile terminals 3 is received by the antenna 23. The received signal having a radio receive frequency is converted into a baseband signal by the frequency converting unit 22, and a demodulating unit 24 performs a demodulation process on the baseband signal. Data which the demodulating unit obtains after demodulating the baseband signal are delivered to a decoder unit 25, and the decoder unit performs a decoding process, such as an error correction, on the data. Control data among the decoded data are delivered to the protocol processing unit 18, and user data among the decoded data are delivered to the aGW communication unit 16 and the other base station communication unit 17. The series of transmission and reception processes of the base station 2 is controlled by a control unit 26.

Hereafter, the operation of a mobile terminal in accordance with the present invention will be explained.

When a mobile terminal is not performing uplink data transmission and is receiving downlink data, the mobile terminal transmits an Ack/Nack signal indicating the result of the reception of the downlink data (whether the mobile terminal has received the data properly) to the base station by using an Ack/Nack exclusive channel.

The mobile terminal also transmits a downlink communication path quality (CQI) signal for the downlink scheduling by the base station, as well as the Ack/Nack signal indicating the result of the reception of the downlink data, to the base station by using the Ack/Nack exclusive channel.

Furthermore, regardless of whether the mobile terminal has received the downlink data, in order to enable the downlink scheduling by the base station or maintain the synchronization between the base station and the mobile terminal, the mobile terminal transmits a CQI signal to the base station by using the Ack/Nack exclusive channel.

When the mobile terminal starts transmission of uplink data in a state in which the mobile terminal transmits an Ack/Nack signal and/or a CQI signal to the base station, as mentioned, the mobile terminal has to transmit an uplink scheduling request signal SR independently from the above-mentioned Ack/Nack and/or the above-mentioned CQI to the base station. In this embodiment, a method of, when transmitting an uplink scheduling request signal SR to the base station by using a physical channel (S-RACH) different from the Ack/Nack exclusive channel, transmitting the uplink scheduling request signal by using an SC-FDMA method which implements a wider coverage and a lower PAPR will be explained.

In this Embodiment 1, in a case in which a mobile terminal desires to start transmission of uplink data in a state in which the mobile terminal transmits an Ack/Nack signal and/or a CQI signal by using an uplink Ack/Nack exclusive channel while receiving downlink data without performing transmission of uplink data, the mobile terminal transmits an uplink scheduling request signal SR for setting up a channel for uplink data transmission by using a physical channel (in this Embodiment 1, by using an S-RACH) to which a frequency band different from that of the Ack/Nack exclusive channel is allocated.

At that time, the mobile terminal does not use a multi carrier method of simultaneously transmitting data associated with two physical channels which are allocated to two types of bands, respectively, the mobile terminal does not transmit an Ack/Nack signal and/or a CQI signal by using the Ack/Nack exclusive channel (DTX Discontinuous Transmission) while transmitting an SR (preamble/message) which the mobile terminal temporarily transmits to the base station when starting transmission of uplink data.

As a result, increase in the radio resource load on the system due to temporary increase in the physical channels of one mobile terminal can be prevented, while transmission with a single carrier method which guarantees a low PAPR can be implemented.

Figure 5:
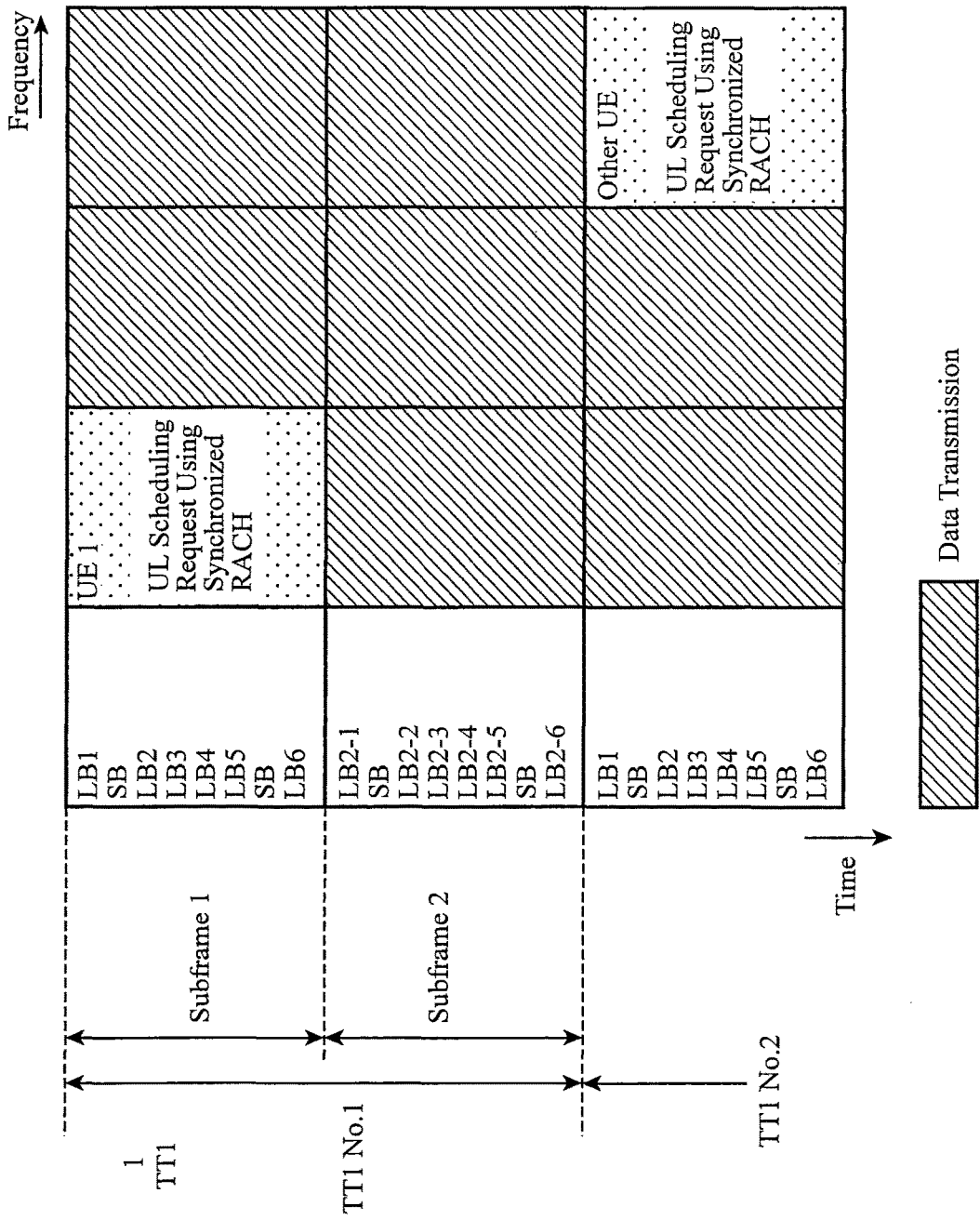
FIG. 5 is an explanatory drawing for explaining radio resources which are allocated to an Ack/Nack exclusive channel and an S-RACH for transmission of an uplink scheduling request signal SR.
Figure 6:
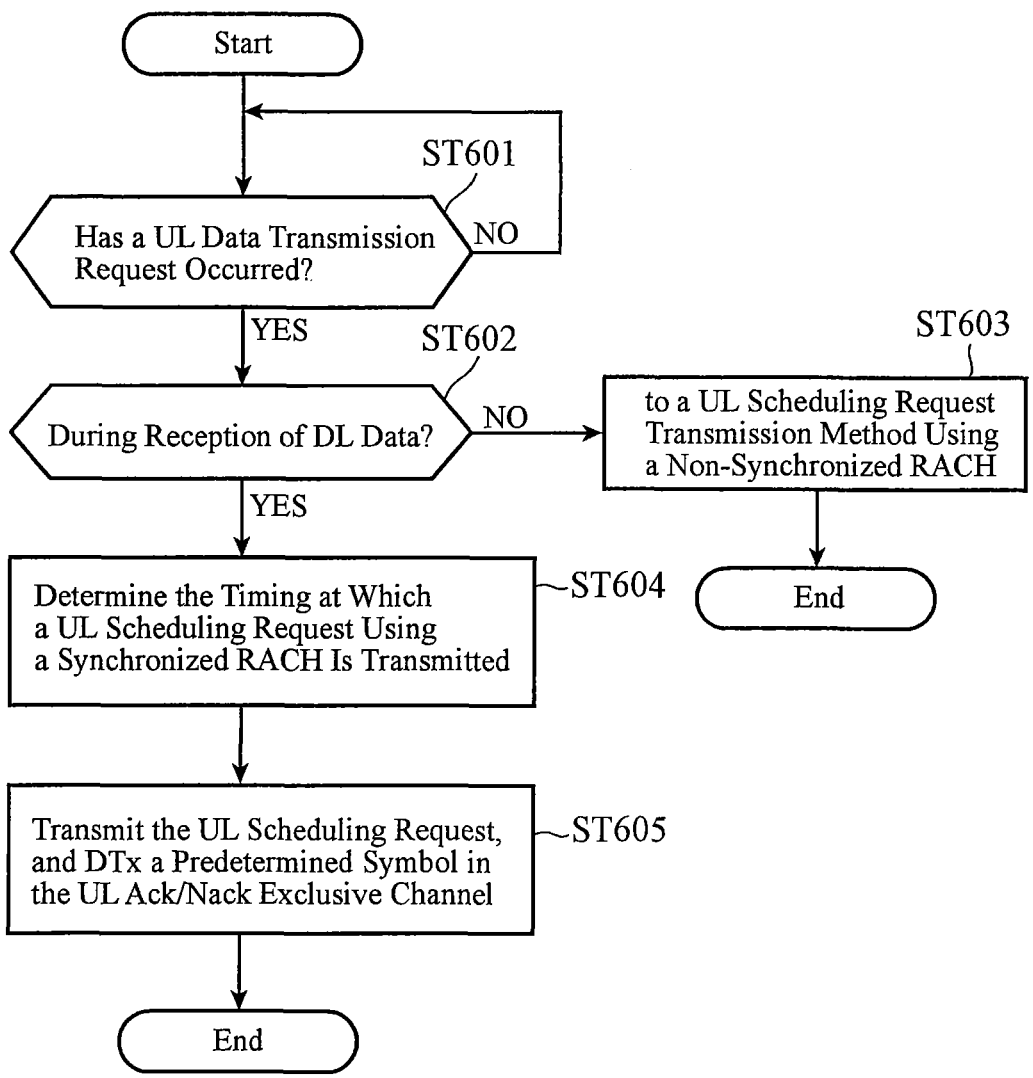
FIG. 6 is a flow chart explaining processing carried out by a mobile terminal, including up to a process of transmitting an uplink scheduling request signal.

FIG. 5 is an explanatory drawing for explaining radio resources which are allocated to an Ack/Nack exclusive channel and an S-RACH for transmission of an uplink scheduling request signal SR. FIG. 6 is a flowchart explaining processing carried out by a mobile terminal, including up to a process of transmitting an uplink scheduling request signal.

Figure 7:
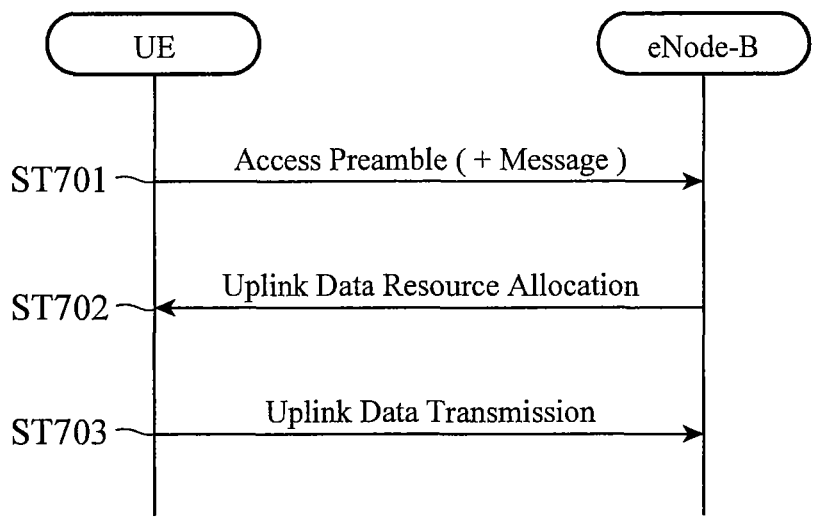
FIG. 7 is a flow chart explaining a series of processes including from the process of transmitting an uplink scheduling request signal up to a process of starting transmission of uplink data.
Figure 8:
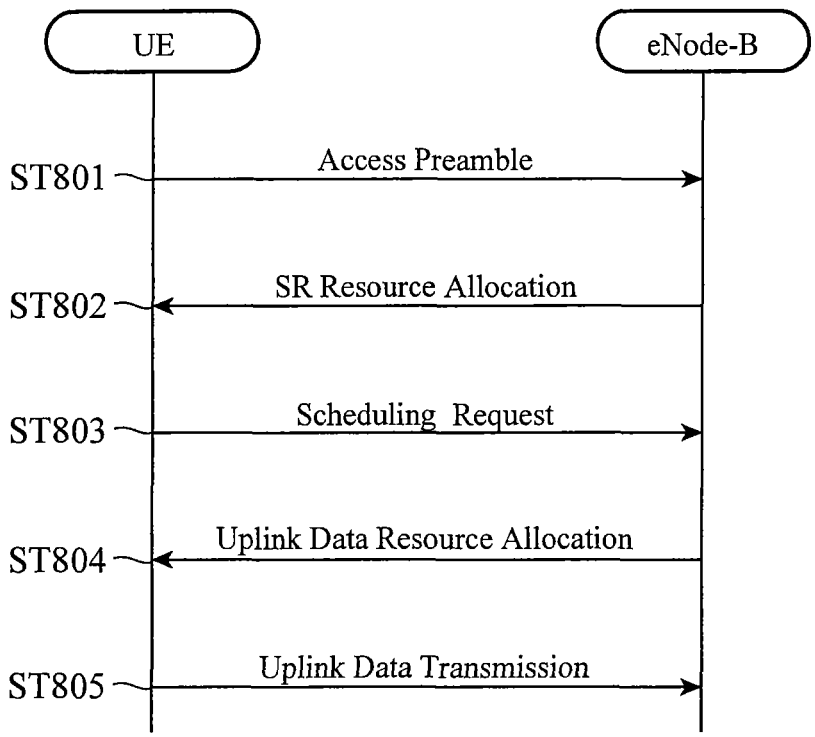
FIG. 8 is a flow chart explaining the series of processes including from the process of transmitting an uplink scheduling request signal up to the process of starting transmission of uplink data.

FIGS. 7 and 8 are flow charts explaining a series of processes including from the process of transmitting an uplink scheduling request signal up to a process of starting transmission of uplink data. In FIG. 5, it is assumed that at the same time when the mobile terminal UE1 is not carrying out transmission of uplink data, such as user data, but is receiving only downlink data, the mobile terminal is transmitting an Ack/Nack and/or a CQI to these received data by using an Ack/Nack exclusive channel.

The modulating unit 10 of the mobile terminal shown in FIG. 3 performs a CDM multiplexing process (can alternatively perform an FDM multiplexing process or a TDM multiplexing process), which is specific to the mobile terminal, on the Ack/Nack signal, and transmits the Ack/Nack signal by using the Ack/Nack exclusive channel. Therefore, there can be a case in which the mobile terminal UE1 transmits the Ack/Nack signal continuously with respect to time by using the Ack/Nack exclusive channel.

In this case, when an uplink data transmission request in ST501 of FIG. 6 occurs (if Yes in ST501), the mobile terminal, in ST602, checks the receiving state of the downlink data (DL data).

In this Embodiment 1, because the mobile terminal is receiving the downlink data, the mobile terminal advances to ST604 in which the mobile terminal determines the timing at which the mobile terminal transmits an uplink scheduling request signal SR (preamble or/and message) by using an S-RACH. If the mobile terminal is not receiving any downlink data and the synchronization with the base station is not established (if No in ST602), the mobile terminal, in ST603, carries out an algorithm of transmitting an uplink scheduling request signal SR by using a physical channel called a Non-S-RACH.

After, in ST604, determining the transmission timing of the uplink scheduling request signal SR, at the same time when the mobile terminal UE1 transmits the uplink scheduling request signal SR by using the S-RACH, the mobile terminal, in ST605, stops the transmission of a predetermined Ack/Nack symbol (or LB) of the uplink Ack/Nack exclusive channel or a CQI symbol (or LB), which the mobile terminal was originally scheduled to transmit at the same timing, and suspends the transmission while the mobile terminal transmits the uplink scheduling request signal SR (symbol DTX or DTX of LB). This stop (DTX) of the transmission of the Ack/Nack symbol is performed by the modulating unit 10 under the control of the control unit 15.

FIG. 5 shows an example of the allocation of radio resources to an S-RACH which is a physical channel via which an uplink scheduling request signal SR is transmitted, and an Ack/Nack exclusive channel.

In FIG. 5, the radio resources are divided into a plurality of time-frequency regions. In each time-frequency region, the time axis is divided into units of each subframe (=0.5 ms), and the frequency axis is divided into units having different bands according to the amount of transmission data associated with the physical channel.

In the allocation of the radio resources according to this Embodiment 1, the S-RACH and the channel for uplink data transmission use time-frequency unit regions having the same size, respectively, whereas the Ack/Nack exclusive channel uses a frequency band unit region narrower than the time-frequency unit regions (the same time division). A subframe 1 of one subcarrier in the Ack/Nack exclusive channel is comprised of six long blocks (Long Blocks LB1 to LB6) and two short blocks (Short Blocks SB, small blocks).

A symbol for physical channel synchronization (a symbol for demodulation) is included in a short block SB. While the mobile terminal UE1 transmits the uplink scheduling request signal SR with the length of one subframe by using the time-frequency region of the S-RACH which is allocated as shown in FIG. 5, the mobile terminal stops the modulation and transmission of the symbol data of the long blocks LB1 to LB6 and the two short blocks SB which are currently allocated to the Ack/Nack exclusive channel (the mobile terminal carries out DTX).

However, because, in the next subframe 2, there is no transmission of the uplink scheduling request signal SR using the S-RACH and there is also no transmission of uplink data such as user data, the mobile terminal transmits symbol data (LB2-1 to LB2-6) for the subframe 2 by using the Ack/Nack exclusive channel. Furthermore, in the next subframe (a subframe 1 during TTI No. 2), an uplink scheduling request signal SR from another mobile terminal UE occurs, an S-RACH for this SR is allocated to a time-frequency region which exists in a frequency band different from that of the mobile terminal UE1.

In this case, the S-RACH of the other mobile terminal UE is transmitted, and Ack/Nack symbol data and/or CQI symbol data from the mobile terminal UE1 during this subframe interval are transmitted by using the Ack/Nack exclusive channel. The sequence including from the transmission of an uplink scheduling request signal SR by using the S-RACH up to the uplink data transmission is shown in FIGS. 7 and 8.

FIG. 7 shows a flow chart in a case (ST701) in which the mobile terminal transmits an uplink scheduling request signal SR (preamble and message) in only one step.

FIG. 8 shows a flow chart in a case (ST801 and ST803) in which the mobile terminal transmits an uplink scheduling request signal SR by sequentially transmitting its preamble (preamble) and its message (message) in two steps.

In FIG. 7, after the mobile terminal notifies the uplink scheduling request to the base station with the preamble and the message, the mobile terminal receives information "uplink data resource allocation (Uplink Data Resource Allocation)" about allocation of radio resources for uplink data transmission and timing by using a downlink L1/L2 control signal from the base station.

In FIG. 8, the mobile terminal receives "scheduling request resource allocation (SR Resource Allocation)" after transmitting the preamble, and, after notifying a message part of the scheduling request to the base station by using a resource which is allocated thereto with the scheduling request resource allocation, receives information (Uplink Data Resource Allocation) about radio resources allocation for uplink data transmission and timing by using a downlink L1/L2 control signal from the base station.

The mobile terminal then starts transmission of uplink data by using a UL-SCH (Uplink Shared channel). In this Embodiment 1, the example in which one subframe is allocated to transmission of an uplink scheduling request signal SR is explained. However, because there is a case in which a preamble and a message are sent at a time during a long transmission time, as shown in FIG. 7, and a case in which a preamble is sent at a time during short transmission time and a message is sent at a time during another short transmission time, as shown in FIG. 8, the length of a transmission time during which an Ack/Nack cannot be transmitted, and the occurrence frequency can be changed according to the length and frequency of the transmission time of the uplink scheduling request signal SR.

The structure of long blocks and short blocks in a subframe shown in FIG. 5 is only an example, and, even if the structure of the subframe changes, the concept of the present invention can be applied.

Hereafter, the preamble and message of an uplink scheduling request signal SR will be explained. It is considered that, for example, a "random ID (random ID (UE ID))" which is specific identifying information for identifying the terminal is allocated to the preamble. As the message, the amount of uplink transmission data (a buffer state in the UE), the QoS of the uplink transmission data, or a transmission power margin of the terminal, in addition to the "UE ID" previously shown, can be considered.

In conventional communication methods (FDMA, TDMA, and CDMA), a stop (DTX) of transmission of symbols via an uplink provides an advantage of reducing the power consumption of a mobile terminal, reducing the highest transmit power of the mobile terminal to within a power range indicated by a base station, and also reducing the transmit power of the whole system to within a fixed range. In contrast, by using the method of stopping transmission of symbols (DTX) in accordance with the present invention, because, for an uplink, not only the PAPR in the mobile terminal can be reduced, but single carrier transmission can be carried out, unlike in the case of using DTX of a conventional communication method, the scale of the implementation of the modulation and demodulation processes can be reduced in both the mobile terminal and the base station, and the processing load on the whole system can be reduced compared with the case of using a multi carrier transmission method.

As mentioned above, by using Embodiment 1, there can be provided an advantage of, in a case in which a mobile terminal is not carrying out transmission of uplink data, but is receiving downlink data, enabling the mobile terminal which has to transmit an uplink scheduling request signal SR together with an Ack/Nack to perform the transmission of these signals simultaneously without increasing the PAPR in the mobile terminal.

In contrast, there can be a case in which in the mobile communication system, even when a mobile terminal does not receive downlink data, an Ack/Nack exclusive channel is allocated to the mobile terminal.

More specifically, there can be considered a case in which even when there exist no downlink data in a base station, in order to prepare future downlink scheduling or maintain the synchronization between the base station and a mobile terminal, the result (CQI) of measurement of the quality of a downlink communication path is notified from the mobile terminal to the base station. Also in such a case, there can be considered a case in which the transmission of the CQI using an Ack/Nack exclusive channel and an uplink scheduling request signal SR occur simultaneously. In such a mobile communication system, it is preferable that when performing judgment as shown in ST602, a mobile terminal judges whether or not an Ack/Nack exclusive channel is allocated thereto. In addition, even a mobile communication system in which when a mobile terminal does not receive downlink data no Ack/Nack exclusive channel is allocated to the mobile terminal can adopt this judgment.

Embodiment 2

In above-mentioned Embodiment 1, in a case in which a mobile terminal transmits an uplink scheduling request signal SR by using an S-RACH while transmitting an Ack/Nack signal and/or a CQI signal by using an Ack/Nack exclusive channel, the mobile terminal stops the transmission of the Ack/Nack signal and/or the CQI signal while transmitting the uplink scheduling request signal SR.

By stopping the transmission of the Ack/Nack signal and/or the CQI signal while transmitting the uplink scheduling request signal SR, the mobile terminal does not have to use a multi carrier method with which to simultaneously transmit data associated with the two physical channels (the Ack/Nack exclusive channel and the S-RACH) which are allocated to two types of bands, respectively. Therefore, increase in the radio resources load on the communication system due to temporary increase in the physical channels can be prevented, and transmission with a single carrier method which guarantees a low PAPR can be implemented.

In contrast, in Embodiment 2 which will be explained hereafter, a mapping method for an Ack/Nack exclusive channel of, when performing a stop (DTX) of transmission of an Ack/Nack symbol, preventing a bad influence from being exerted upon the performance of communications of symbols on the Ack/Nack exclusive channel will be explained.

Figure 52:
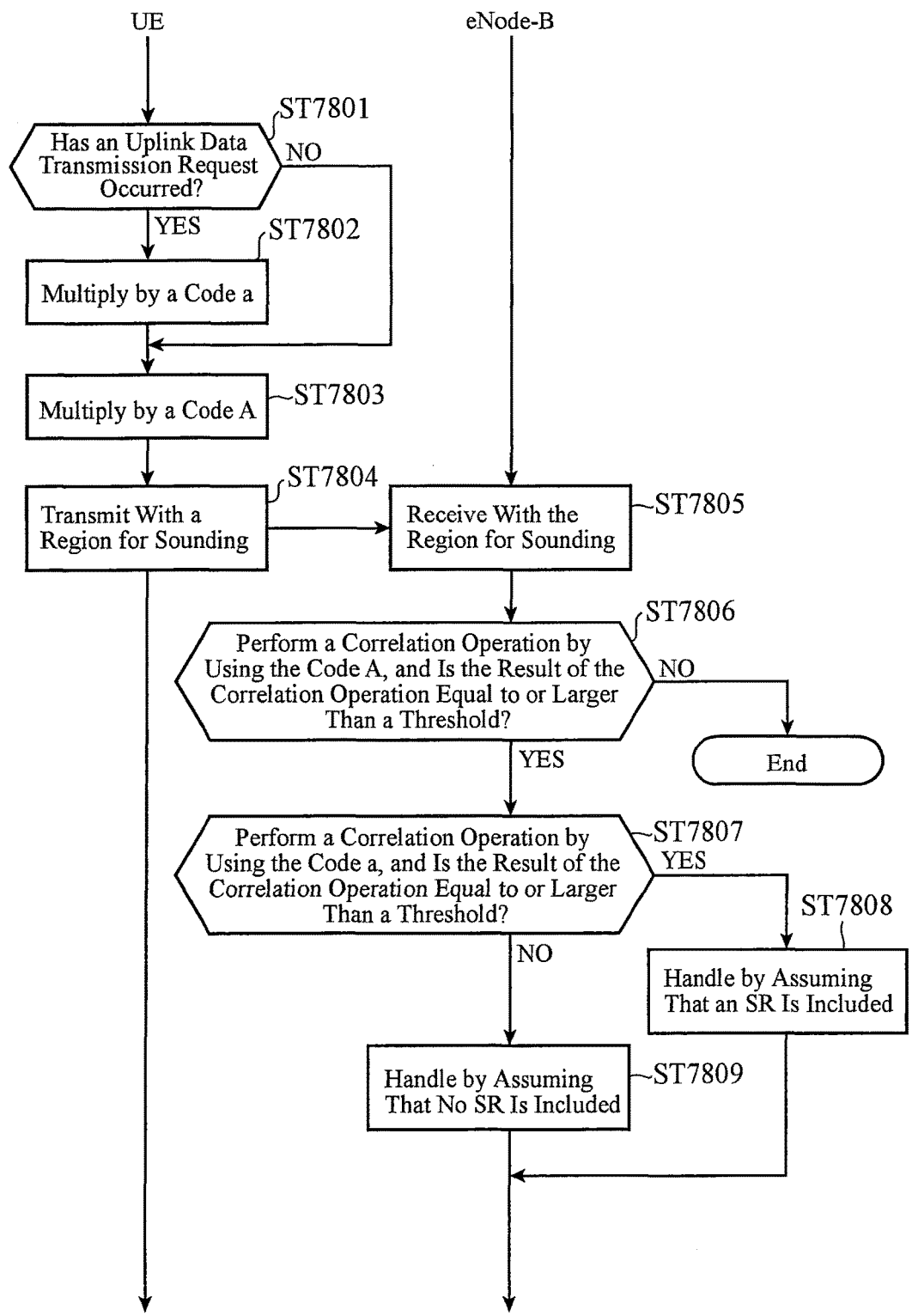
FIG. 52 is a diagram of sequences between a mobile terminal and a base station.

In Embodiment 1, the processing including from the process of transmitting an uplink scheduling request signal SR by using an S-RACH up to a process of transmitting uplink data is explained with reference to FIG. 52. More specifically, the transmission of an uplink scheduling request signal SR (a preamble or/and a message) includes a case, as shown in FIG. 7, in which a long transmission time is needed in order to send the preamble and the message at a time and a case, as shown in FIG. 8, in which the preamble is transmitted at a time and the message is transmitted at another time and therefore their respective transmission time become short.

In the case in which the transmission time of an uplink scheduling request signal SR is long, the time during which an Ack/Nack and/or a CQI cannot be transmitted (the DTX of the Ack/Nack symbol and/or the CQI symbol) becomes long, whereas in the case in which the transmission time of an uplink scheduling request signal SR are short, the time interval during which an Ack/Nack and/or a CQI cannot be transmitted becomes short. For each of the cases, a method of preventing the degradation of the communication quality because no transmission of the Ack/Nack symbol information and/or the CQI symbol information is carried out during the time during which the uplink scheduling request signal SR is transmitted will be explained hereafter.

First, the process in the case of FIG. 7 will be explained. Because the preamble and the message are collectively transmitted at a time in the transmission of the uplink scheduling request signal SR shown in FIG. 7, the time interval during which the Ack/Nack and/or the CQI cannot be transmitted becomes long, and can have a length of about one subframe as shown in FIG. 5. In order to prevent the degradation in the communication quality due to errors in the transmission of the Ack/Nack symbol information and/or the CQI symbol information which can occur during this time interval, in accordance with this Embodiment 2, a pattern of symbols to be sent by using the Ack/Nack exclusive channel is mapped in such a way that a pattern having a length of one subframe is repeated twice and is updated during each transmission time interval (TTI).

Furthermore, in order to ensure communication quality, a symbol pattern having a length of one subframe is formed to be a combination of symbols in which important information (higher-order bits) are given a higher priority and the number of repetitions of the important information is increased. Concrete examples of the mapping of symbol information which is to be transmitted by using an Ack/Nack exclusive channel are shown in FIGS. 9 and 10.

Figure 9:
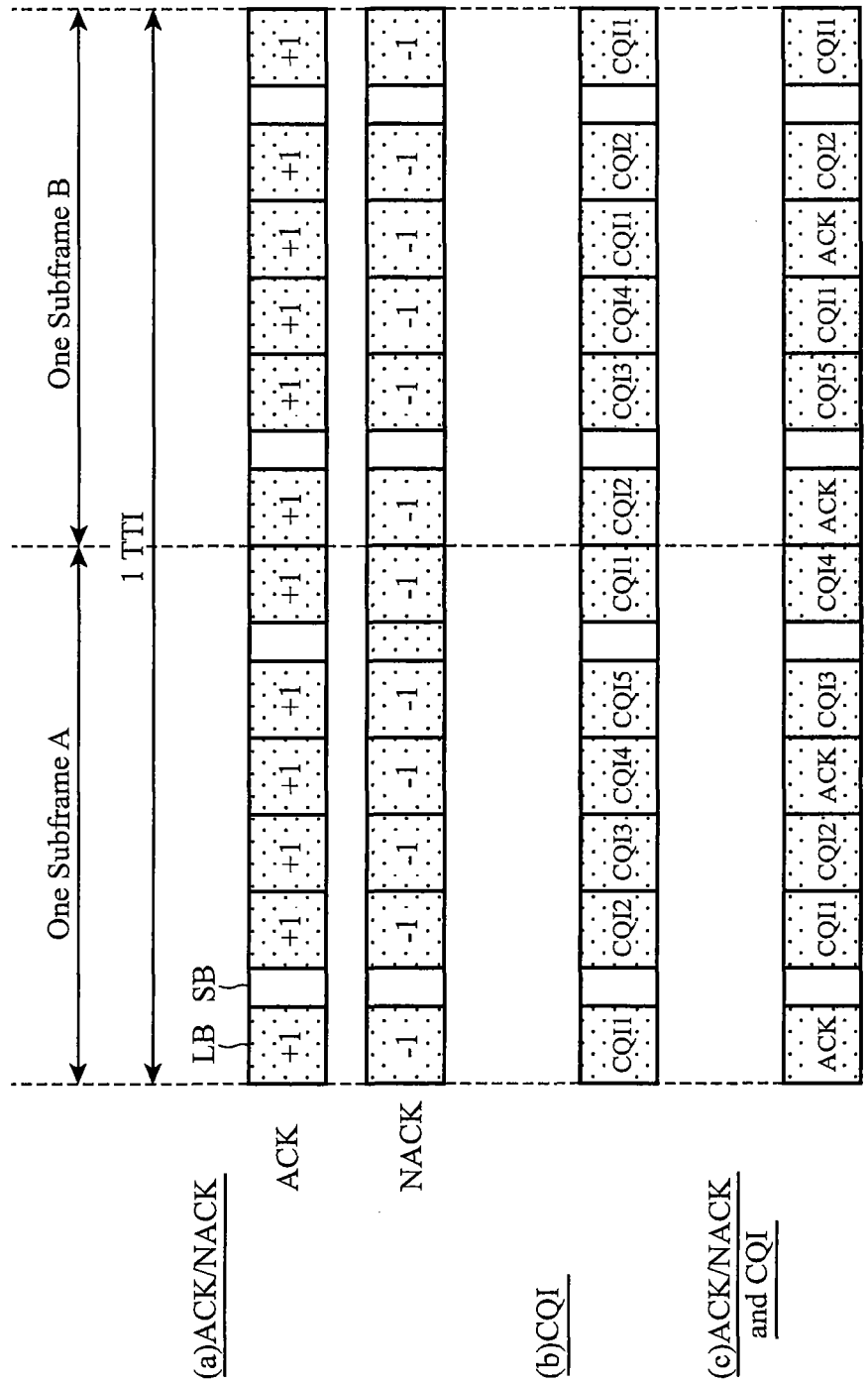
FIG. 9 is an explanatory drawing for explaining examples of mapping of Ack/Nack symbols to be transmitted by using an Ack/Nack exclusive channel.
Figure 10:
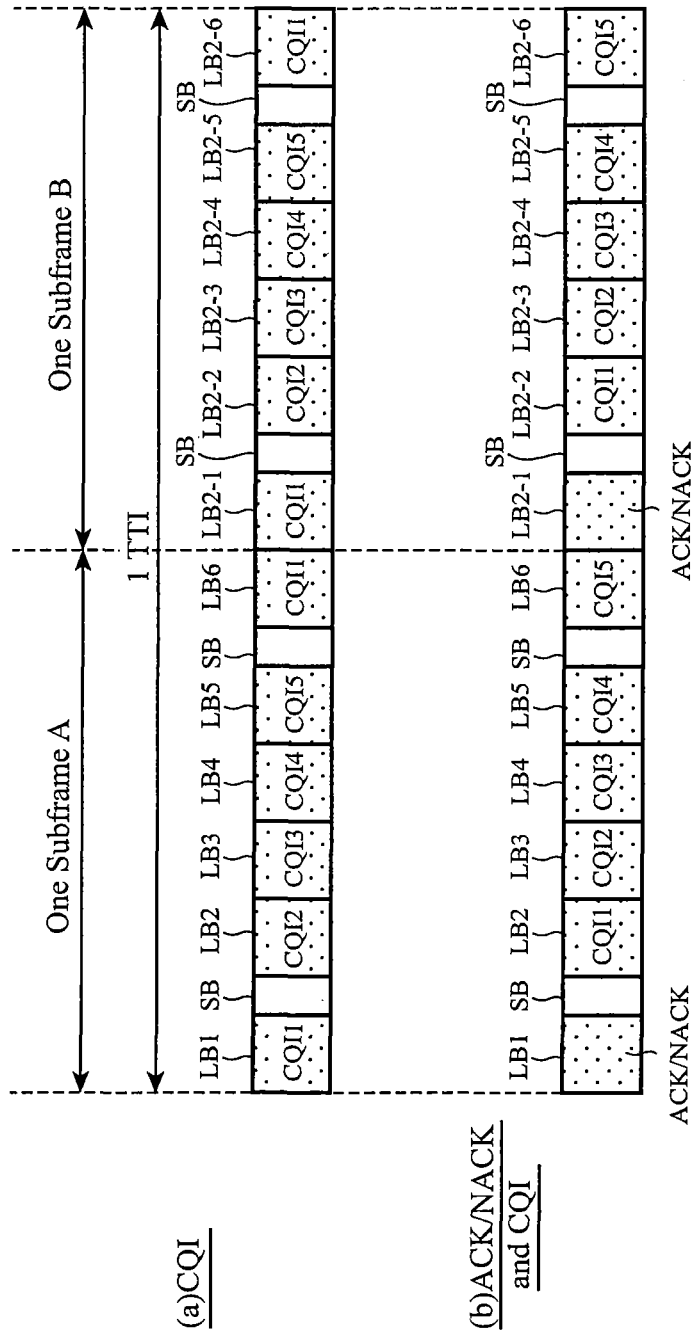
FIG. 10 is an explanatory drawing for explaining examples of mapping of Ack/Nack symbols to be transmitted by using an Ack/Nack exclusive channel.

FIG. 9 is an explanatory drawing explaining examples of the mapping of Ack/Nack symbols to be transmitted by using an Ack/Nack exclusive channel. FIG. 9 shows an example of the mapping of symbols to the Ack/Nack exclusive channel, which has been proposed by the 3GPP (3rd Generation Partnership Project) until now (refer to the nonpatent reference 2).

For each of a case in which only Ack/Nack symbols are mapped to long blocks LB (FIG. 9(a)), a case in which only CQI symbols are mapped to long blocks (FIG. 9(b)), and a case in which CQI symbols and Ack/Nack symbols are multiplexed and are mapped to long blocks LB (FIG. 9(c)), a symbol mapping structure with a transmission time interval length (TTI) is shown.

A symbol pattern which is proposed in this Embodiment 2 is formed in such a way that even in a case in which an Ack/Nack and/or a CQI cannot be transmitted for a long period of time (=1 subframe), a symbol pattern having a length of one subframe is repeated twice within 1 TTI for the purpose of preventing occurrence of errors in the transmission of the Ack/Nack and/or the CQI, thereby improving the communication quality.

In the symbol pattern shown in FIG. 9 in the case of CQI symbols, for one subframe A, CQI1, CQI2, CQI3, CQI4, CQI5, and CQI1 are mapped to long blocks, whereas for one subframe B, CQI2, CQI3, CQI4, CQI1, CQI2, and CQI1 are mapped to long blocks, and the CQI symbols are not arranged with the same symbol pattern in the subframes.

Therefore, when, for example, the one subframe A is DTXed, CQI5 is not transmitted once (one LB) during 1 TTI.

Also in the symbol pattern in which CQIs and Acks/Nacks are multiplexed with respect to time, they are not arranged with the same symbol pattern in both the one subframe A and the one subframe B.

A mapping example of mapping the CQI symbols and a mapping example of multiplexing and mapping the CQI and the Ack/Nack, which are proposed by the present invention, are shown in FIG. 10.

First, in the mapping example of mapping the CQI symbols of FIG. 10(a), the same symbol mapping pattern is repeated in both a first subframe (single sub-frame A) and a second subframe (single sub-frame B) within 1 TTI. Furthermore, in the mapping of the symbols to each subframe length, symbols with a higher priority (i.e., symbols showing a higher-order digit of the CQI: in this example, CQI1) are repeated a larger number of times.

Furthermore, also in the mapping example of multiplexing and mapping the CQI symbols and the Ack/Nack symbol of FIG. 10(b), the same symbol mapping pattern is repeated in both a first subframe (single sub-frame A) and a second subframe (single sub-frame B) within 1 TTI, and, in the mapping of the symbols to each subframe length, symbols with a higher priority (the Ack/Nack and so on) are placed in a vicinity of a short block SB.

In this Embodiment 2, an Ack/Nack and the higher-order bits of a CQI (CQI1 is the most significant bit) are considered as symbols having a higher priority. An Ack/Nack indicates the result of reception of downlink data, and therefore there arises a problem that retransmission of corresponding packet data occurs when this bit cannot be received properly by the base station. It is therefore necessary to increase the priority of the Ack/Nack in the symbol arrangement. It is further necessary to place the higher-order ones of the CQI bits indicating the reception state of the downlink data on a priority basis so as to enable the base station to cope with transmission errors and so on.

Thus, it is not necessary to limit the mapping pattern in the symbol mapping method of taking into consideration a risk of the Ack/Nack information not being transmitted while the uplink scheduling request signal SR is transmitted and the importance of the symbols to the pattern of FIG. 10 which is explained in this Embodiment 2.

Even though the symbol mapping is not performed as shown in FIG. 10, this Embodiment 2 can be implemented. Therefore, the concept about the symbol mapping will be mentioned hereafter.

(1) Repeat symbols having a higher priority a larger number of times. (2) Place symbols having a higher priority in a vicinity of a short block SB.

In general, an Ack/Nack and the higher-order bits of a CQI (CQI1 is the most significant bit) are symbols having a higher priority.

An Ack/Nack indicates the result of reception of downlink data, and therefore there arises a problem that, when this symbol cannot be received properly by the base station, retransmission of the corresponding packet data occurs and the throughput of the downlink data falls as a result. It is therefore necessary to increase the priority of the Ack/Nack in the symbol arrangement.

Also in the case of the higher-order ones of the CQI bits indicating the state of the reception of the downlink data, when a transmission error occurs, the erroneous difference between the downlink communication path quality which is measured by the mobile terminal and the downlink communication path quality which the base station has received becomes large, and therefore appropriate scheduling cannot be carried out by the base station and this results in reduction in the downlink throughput of the whole mobile communications system. It is therefore necessary to increase the priority of the higher-order ones of the CQI bits indicating the state of the reception of the downlink data in the symbol arrangement.

The priority of the Ack/Nack and that of the CQI depend on the desired error rates of their respective signals.

Because increase in the number of repetitions (repetition) can increase the receive power of the base station, the larger number of repetitions (repetition) a symbol has the more rarely an error occurs in the symbol.

Because it can be considered that a short block is used for phase compensation when receiving the short block and then demodulating the short block, the phase compensation is carried out more correctly as the difference between the transmission timing of the short block and that of the corresponding symbol decreases. Therefore, an error occurs more rarely in a symbol which is placed nearer to a short block. Some predetermined patterns exist in the mapping of the symbols of Ack/Nack information (an Ack/Nack and/or a CQI), and the mobile station can select one pattern from among the predetermined patterns, one pattern can be selected and notified by the base station, or one pattern can be dynamically allocated to the mobile station. As previously explained, when transmission of an Ack/Nack symbol and/or CQI symbols using an Ack/Nack exclusive channel cannot be carried out temporarily for a long period of time (=during one subframe) because of transmission of an uplink scheduling request signal SR by using an S-RACH, an transmission error can be preventing from occurring in the information symbols of the Ack/Nack exclusive channel and therefore high communication quality can be maintained.

Next, a case in which the transmission time during which an uplink scheduling request signal SR is transmitted once is sufficiently short, like the sequence of FIG. 8, will be explained.

In a case in which a mobile terminal, in ST605 of FIG. 6, transmits an uplink scheduling request signal SR, as shown in the flow chart of FIG. 8, by dividing it into a preamble and a message or sending the preamble and the message of a small size together, the time interval during which the mobile terminal transmits the uplink scheduling request signal SR becomes short. Therefore, the transmission stop time interval during which transmission of an Ack/Nack symbol and/or a CQI symbol in the Ack/Nack exclusive channel is stopped during the transmission of the uplink scheduling request signal SR also becomes short.

Figure 11:
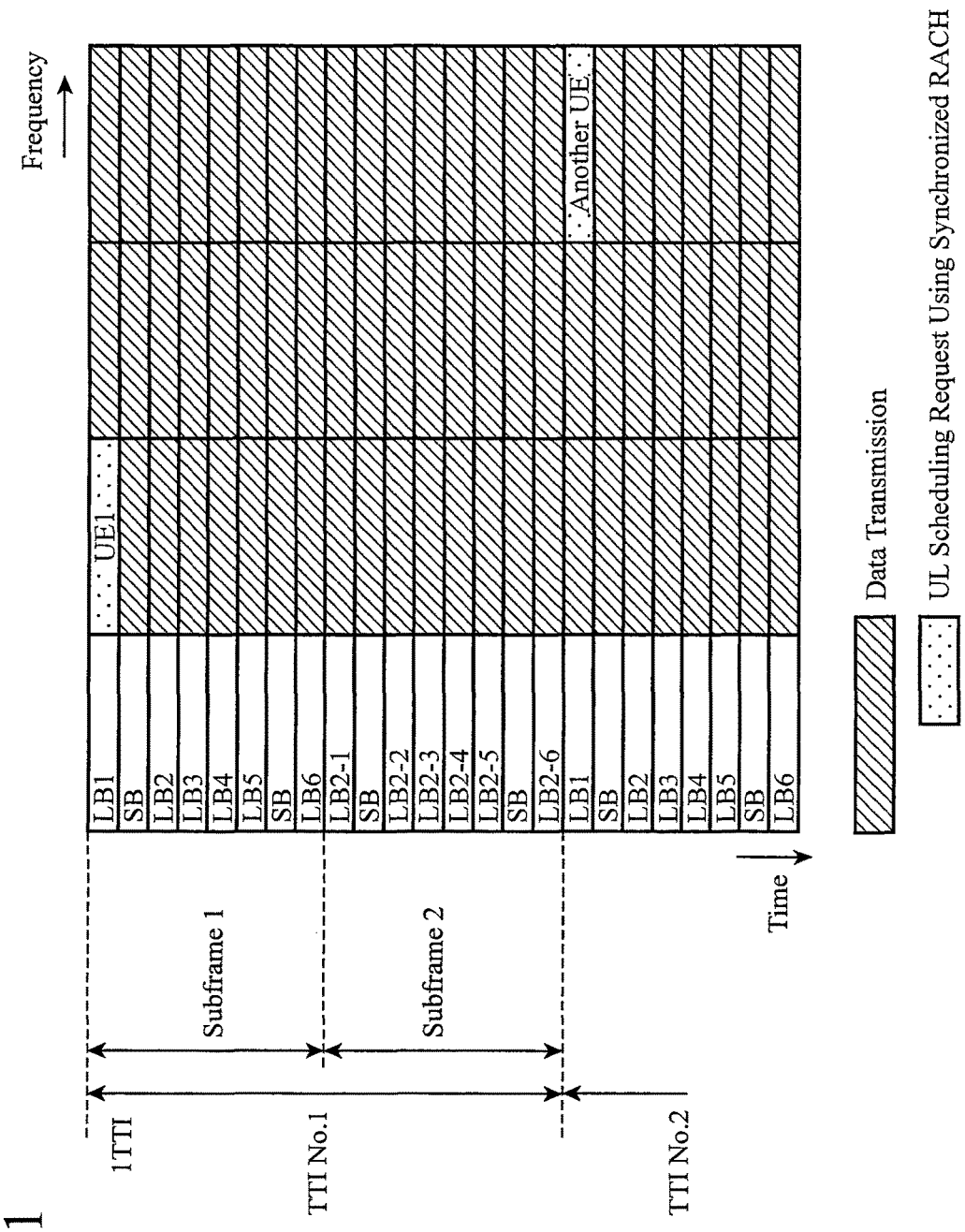
FIG. 11 is an explanatory drawing for explaining radio resources which are allocated to an Ack/Nack exclusive channel and an S-RACH for transmission of an uplink scheduling request signal SR.

An example of how, in such a case, the S-RACH used for the transmission of the uplink scheduling request signal SR and the Ack/Nack exclusive channel are allocated in time-frequency is shown in FIG. 11.

Because the amount of information of the uplink scheduling request signal SR in the sequence diagram of FIG. 8 is sufficiently small, in FIG. 11, a region to which the S-RACH of the mobile terminal UE1 is allocated in time-frequency is only one leading data symbol block included in one time-frequency unit region. An Ack/Nack symbol or a CQI symbol which is transmitted at the same timing as this block is a symbol in a long block LB1 of the Ack/Nack exclusive channel. While the uplink scheduling request signal SR using the S-RACH of the mobile terminal UE1 is transmitted, the Ack/Nack information symbol or the CQI symbol in the block which is the long block LB1 is not transmitted.

Figure 12:
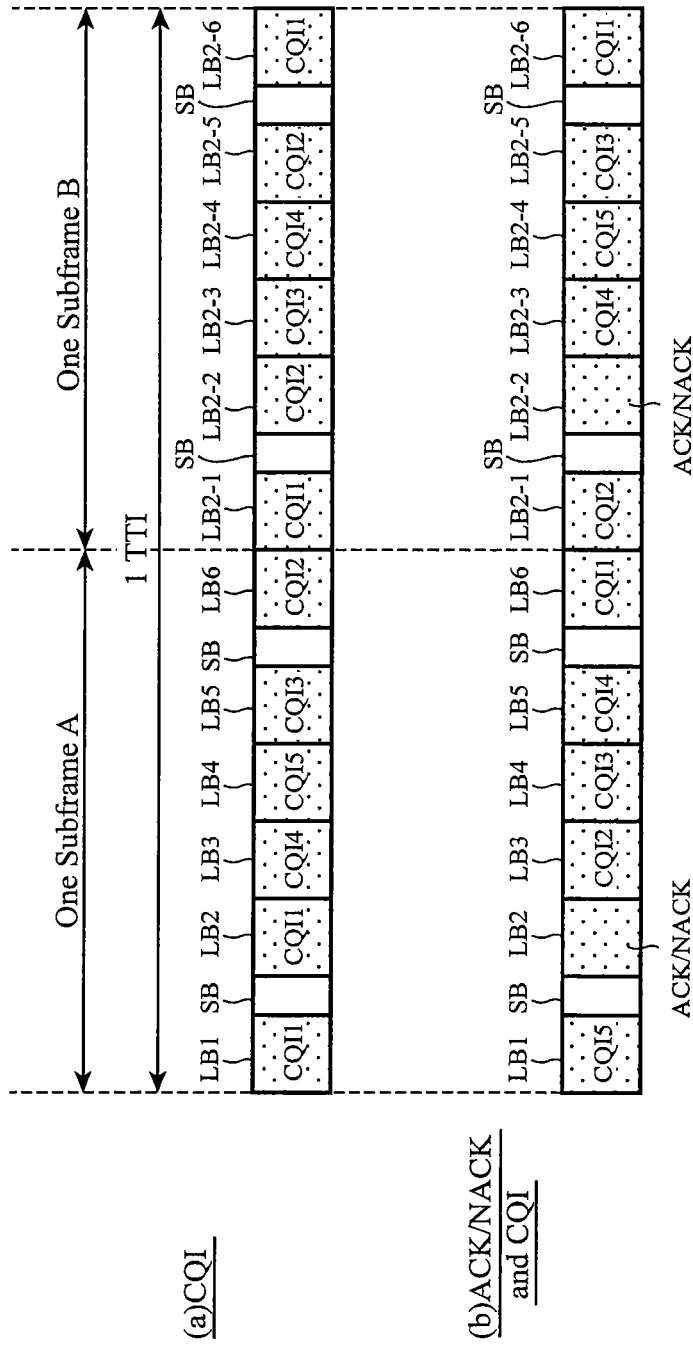
FIG. 12 is an explanatory drawing for explaining examples of mapping of Ack/Nack symbols to be transmitted by using an Ack/Nack exclusive channel.

FIG. 12 is an explanatory drawing for explaining examples of the mapping of an Ack/Nack symbol and CQI symbols which are transmitted by using the Ack/Nack exclusive channel.

Unlike FIG. 10, FIG. 12 shows cases in each of which different symbols are mapped in a first subframe (one sub-frame A) and a second subframe (one sub-frame B) within 1 TTI, respectively, and either the Ack/Nack or higher-order CQI bits having a higher priority are placed a larger number of repetitions within the TTI.

As shown in FIG. 12(*a*), in a case in which only CQI symbols are transmitted, when transmission of an uplink scheduling request signal SR occurs, a symbol CQI1 having a higher priority is allocated to the position of a long block LB (e.g., LB1) having a possibility of not being transmitted and the same symbol CQI1 is also allocated to the next long block LB2.

As a result, even in a case in which transmission of an uplink scheduling request signal SR occurs, the most important symbol CQI1 can be transmitted with the second long block LB2, and, even in a case in which no transmission of an uplink scheduling request signal SR occurs, the degradation in the quality at the time of occurrence of a communication error can be prevented by transmitting the most important symbol CQI1 four times.

Furthermore, in a case in which the CQI symbols and the Ack/Nack symbol are multiplexed and mapped, as shown in FIG. 12(*b*), even when transmission of an uplink scheduling request signal SR occurs through allocation of a low-priority symbol CQI5 to the position of an LB (LB1) having a possibility of not being transmitted, and the CQI5 symbol cannot be transmitted, other symbols having a higher priority can be sent without their repetition numbers being reduced, and therefore the communication quality can be maintained.

It is not necessary to limit the mapping pattern in the symbol mapping method according to the importance of the symbols to the pattern which is explained in this Embodiment 2. Because the concept of the symbol mapping is already explained, the explanation of this concept will be omitted hereafter. Either the mobile terminal or the base station can select one pattern from among some predetermined patterns of the mapping of the symbols of Ack/Nack information (an Ack/Nack and/or a CQI), or one of them can be dynamically selected and allocated to the mobile terminal.

As a case in which a region to which the S-RACH of the mobile terminal UE1 is allocated in time-frequency is only a part of data symbol blocks with respect to time, as shown in FIG. 11, there can be not only a case in which the information which is to be transmitted by using the S-RACH as shown in the flow chart of FIG. 8, but also a case in which the amount of information of the uplink scheduling request signal SR is large as shown in the flow chart of FIG. 7.

In this case, the uplink scheduling request signal can be sent in a small amount of time by allocating the S-RACH to the time-frequency region whose band is extended in the frequency direction, and transmitting the uplink scheduling request signal by using the S-RACH. More specifically, compared with the case of allocation of FIG. 11, either a wider time-frequency region in the frequency direction or a plurality of time-frequency unit regions which are continuous in the frequency direction are allocated to the transmission of the uplink scheduling request signal SR.

Embodiment 1 and Embodiment 2 are based on the CDM multiplexing of the Ack/Nack information which is carried out for each mobile terminal in the Ack/Nack exclusive channel. As an alternative, there can be another method of carrying out TDM multiplexing or FDM multiplexing of the pieces of Ack/Nack information about a plurality of mobile terminals. Also in such a case, the invention explained in above-mentioned Embodiment 1 can be applied.

By doing in the above-mentioned way, also in a case in which an uplink Ack/Nack symbol and/or CQI symbols which are allocated to the same timing as the time-frequency region to which the symbols of the uplink transmission request signal SR are allocated with the S-RACH cannot be modulated and transmitted (DTX) during the transmission time of the uplink scheduling request signal SR, there can be provided an advantage of being able to use the radio resources effectively and to maintain the communication quality of the uplink or reduce the degradation in the communication quality of the uplink to a minimum.

Embodiment 3

In above-mentioned Embodiment 1, by stopping transmission of an Ack/Nack signal and/or a CQI signal while transmitting an uplink scheduling request signal SR by using an S-RACH, and by no using a multi carrier method with which to simultaneously transmit data associated with the two physical channels (the Ack/Nack exclusive channel and the S-RACH) which are allocated to two types of bands, respectively, increase in the radio resources load on the communication system due to temporary increase in the physical channels can be prevented, and transmission with a single carrier method which guarantees a low PAPR can be implemented.

In this Embodiment 3, a method of implementing transmission using an SC-FDMA method which implements a wider coverage and a lower PAPR (peak to average power ratio) by transmitting an Ack/Nack and/or a CQI and an uplink scheduling request signal SR by using an identical physical channel will be explained hereafter.

In accordance with this Embodiment 3, a mobile terminal transmits an uplink scheduling request signal SR by mapping the uplink scheduling request signal SR to an Ack/Nack exclusive channel instead of an S-RACH. By transmitting an uplink scheduling request signal SR by using an Ack/Nack exclusive channel, increase in the radio resources load on the communication system due to temporary increase in the physical channels can be prevented, and transmission with a single carrier method which guarantees a low PAPR can be implemented. As a result, even when the number of control signals (L1/L2 control signalings) which have to be temporarily transmitted increases in a certain mobile terminal, increase in the radio resources load on the communication system can be prevented, and transmission with a single carrier method which guarantees a low PAPR and high communication quality can be implemented.

In this case, the Ack/Nack exclusive channel is a scheduled channel for which radio resources are scheduled in advance. As mentioned above, in the nonpatent reference 4, allocation of an synchronous random access SRA to a scheduled channel is studied. However, because the nonpatent reference 4 describes nothing about what type of channel is used as the scheduled channel and how a time-frequency region is allocated as a physical resource, in a case in which there is disposed a channel to which a 1-bit physical resource used for a scheduling request SR is allocated to a time-frequency region different from the Ack/Nack exclusive channel, a status in which an uplink Ack/Nack and/or a CQI and an uplink SR have to be transmitted simultaneously occurs, and these signals are transmitted simultaneously with respect to time. In this case, because they are not transmitted with single carrier transmission, but are transmitted with multi carrier transmission, there arises a problem that the PAPR increases.

In order to solve this problem, in accordance with this Embodiment 3, a mobile terminal transmits an uplink scheduling request signal SR by mapping an Ack/Nack and a CQI with the uplink scheduling request signal SR, to an Ack/Nack exclusive channel.

An important thing to satisfy request for a single carrier transmission from a mobile terminal is that the mobile terminal transmits all of an "Ack/Nack", a "CQI", and an "uplink scheduling request signal SR", which are signals having a possibility of having to be transmitted simultaneously, by using an Ack/Nack exclusive channel in a state in which uplink time synchronization is established and the mobile terminal is not transmitting uplink data. By transmitting an Ack/Nack and a CQI with an uplink scheduling request signal SR, by using an Ack/Nack exclusive channel, increase in the radio resources load on the communication system due to temporary increase in the physical channels can be prevented, and transmission with a single carrier method which guarantees a low PAPR can be implemented.

As a result, even when the number of control signals (L1/L2 control signalings) which has to be temporarily transmitted increases in a certain mobile terminal, increase in the radio resources load on the communication system can be prevented, and transmission with a single carrier method which guarantees a low PAPR and high communication quality can be implemented.

Figure 13:
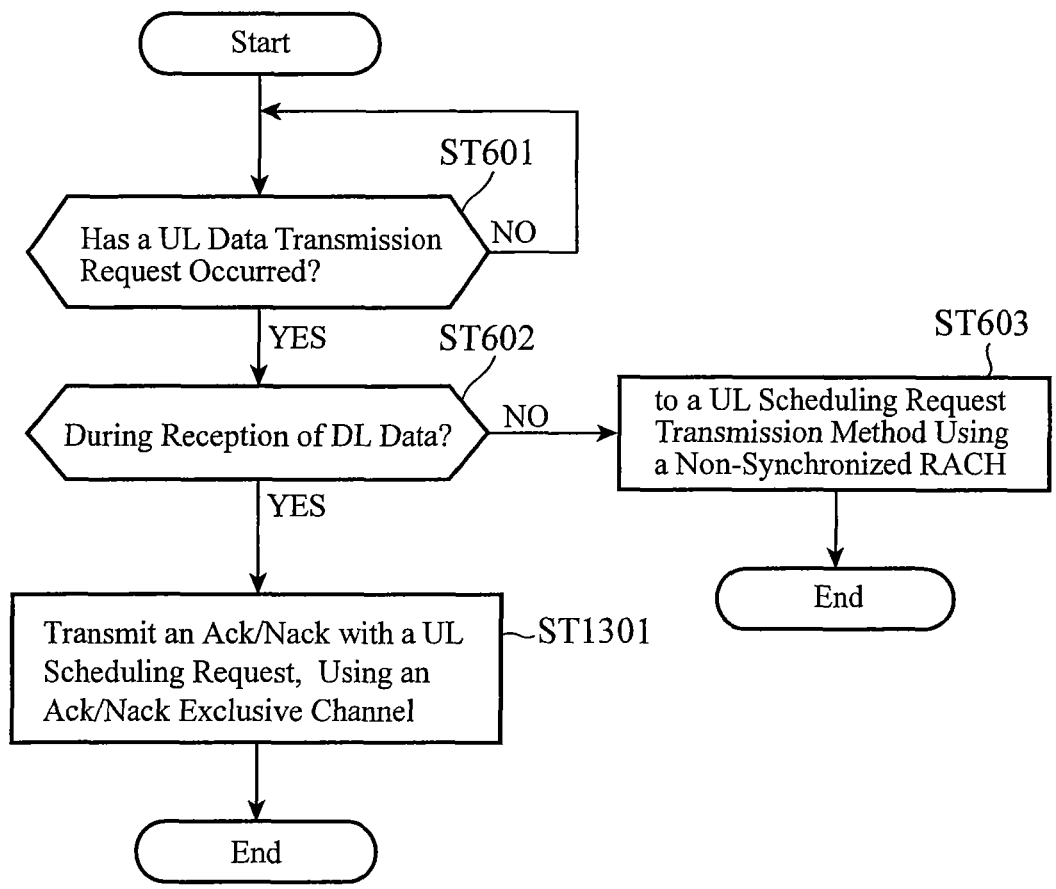
FIG. 13 is a flow chart explaining processing carried out by a mobile terminal, including up to a process of transmitting an uplink scheduling request signal.
Figure 14:
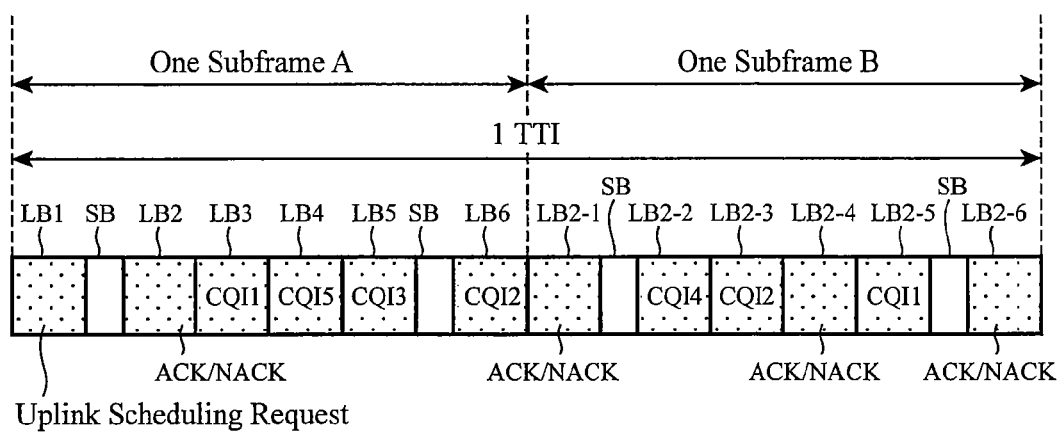
FIG. 14 is an explanatory drawing for explaining an example of mapping of an uplink scheduling request signal which is transmitted by using an Ack/Nack exclusive channel.

FIG. 13 is a flow chart for explaining processing carried out by a mobile terminal, the processing including up to a process of transmitting an uplink scheduling request signal. FIG. 14 is an explanatory drawing for explaining an example of mapping of an uplink scheduling request signal which is transmitted by using an Ack/Nack exclusive channel.

Hereafter, the operation of a mobile terminal in accordance with Embodiment 3 of the present invention will be explained with reference to FIG. 13. In FIG. 13, because the same reference numerals as those shown in FIG. 6 denote the same components or like components, the explanation of the components will be omitted hereafter.

A mobile terminal is not carrying out uplink user data transmission, and, at the same time when receiving downlink data, is transmitting, via an uplink, an Ack/Nack and/or a CQI to the received data by using a physical channel for an Ack/Nack and/or a CQI.

For the Ack/Nack exclusive channel, multiplexing of signals from mobile terminals is carried out by using either one of a CDM method, an FDM method, and a TDM method. When a request for transmission of uplink data occurs in the mobile terminal (ST601), the state of the reception of the downlink data is checked in ST602.

In this Embodiment 3, because the mobile terminal is receiving the downlink data, the mobile terminal advances to ST1301 in which the mobile terminal transmits Ack/Nack information with an uplink scheduling request signal SR (only a part corresponding to a preamble or a part corresponding to the preamble and a message), by using the Ack/Nack exclusive channel.

The sequence including from the transmission in ST1301 of the uplink scheduling request signal SR up to the transmission of the uplink data is shown in FIG. 8. In a case in which the information size of the uplink scheduling request signal SR is small and the transmission time is short, transmitting the uplink scheduling request signal SR by using the Ack/Nack exclusive channel is very effective from the viewpoint of the two following aspects: the efficiency of use of radio resources; and the attainment of the communication quality of transmission (an L1/L2 control signaling) of an L1/L2 control signal having a small size, like an Ack/Nack or an uplink scheduling request signal SR.

A time-frequency region having a length of one subframe in the Ack/Nack exclusive channel is comprised of six data symbol blocks which are called long blocks LB and symbol blocks for physical channel synchronization which are called short blocks SB.

In this Embodiment 3, an example of the mapping of symbols at the time of carrying out multiplexing of an uplink scheduling request signal SR, Ack/Nack information and/or CQI information within a time-frequency region of 1 TTI (=two subframes) with a predetermined positional relationship will be shown.

FIG. 14 is an example of the symbol mapping in a case in which CQI information and Ack/Nack information are multiplexed, and an uplink scheduling request signal SR is further allocated to these pieces of multiplexed information. In this case, it is assumed that the Ack/Nack, the CQI, and the uplink scheduling request signal SR are multiplexed, and are mapped and updated in units of 1 TTI.

First, the uplink scheduling request (UL scheduling request) is mapped to a leading symbol block (LB1) within the time-frequency region having a length of a transmission time interval (TTI) (=a length of two subframes). The number of times that the uplink scheduling request signal SR is mapped and transmitted is one time/two subframes at the fastest rate. The description of the SR symbol is 1 bit long, and is information indicating either with request or without request.

Even though the symbol mapping is not carried out as shown in FIG. 14, this Embodiment 3 can be implemented. Therefore, the concept about the symbol mapping will be mentioned hereafter.

(1) Repeat symbols having a higher priority a larger number of times. (2) Place symbols having a higher priority in a vicinity of a short block SB.

In general, an Ack/Nack, the higher-order bits of a CQI (CQI1 is the most significant bit), and an uplink scheduling request signal SR are symbols having a higher priority.

An Ack/Nack indicates the result of reception of downlink data, and therefore there arises a problem that, when this symbol cannot be received properly by the base station, retransmission of the corresponding packet data occurs and the throughput of the downlink data falls as a result. It is therefore necessary to increase the priority of the Ack/Nack in the symbol arrangement.

Also in the case of the higher-order ones of the CQI bits indicating the state of the reception of the downlink data, when a transmission error occurs, the erroneous difference between the downlink communication path quality which is measured by the mobile terminal and the downlink communication path quality which the base station has received becomes large, and therefore appropriate scheduling cannot be carried out by the base station and this results in reduction in the downlink throughput of the whole mobile communications system. It is therefore necessary to increase the priority of the higher-order ones of the CQI bits indicating the reception state of the downlink data in the symbol arrangement.

Furthermore, a case in which an uplink scheduling request signal SR is accidentally received by the base station will be considered. When the base station erroneously receives "presence" of an uplink scheduling request SR from a mobile terminal even though the mobile terminal shows "absence" of the uplink scheduling request SR, an unnecessary uplink resource is allocated to the mobile terminal and hence the radio resource goes to waste.

In contrast, when the base station erroneously receives "absence" of an uplink scheduling request SR from a mobile terminal even though the mobile terminal shows "presence" of the uplink scheduling request SR, there arises a problem that the mobile terminal has to retransmit the uplink scheduling request SR and the uplink throughput decreases as a result.

The priorities of the Ack/Nack, the CQI, and the uplink scheduling request SR depend on their error rates.

Because increase in the number of repetitions (repetition) can increase the receive power of the base station, the larger number of repetitions (repetition) a symbol has the more rarely an error occurs in the symbol.

Because it can be considered that a short block is used for phase compensation when receiving data and then performing demodulation of the data, the phase compensation is carried out more correctly as the difference between the transmission timing of the short block and that of the corresponding symbol decreases. Therefore, an error occurs more rarely in a symbol which is placed nearer to a short block.

In the explanation of the concept of the symbol mapping, which is made until now, the case in which the multiplexing of a CQI and an Ack/Nack in an Ack/Nack exclusive channel is carried out by using the TDM method is shown. Even in a case in which the multiplexing is carried out by using another method, the concept of the above-mentioned symbol mapping can be applied as the method of mapping an uplink scheduling request signal SR.

Furthermore, an uplink scheduling request signal SR has a value which is defined as follows: "with request=('1')" and "without request=('0')", as mentioned above. However, the definition is not limited to this example, and, for example, an uplink scheduling request signal SR can alternatively have a value which is defined as follows: "with request=('0')" and "without request=('1')". Further speaking, an uplink scheduling request signal SR has only to show the presence or absence of an uplink scheduling request.

There can be considered the two following examples of the setting of the value of this bit.

In the first example of the setting, when there is no uplink scheduling request signal SR, 0 is always transmitted. In contrast, in a case in which the mobile terminal transmits an uplink scheduling request signal SR, as shown in the flow chart of FIG. 8, the mobile terminal transmits "with request (='1')", and then transmits 0 during the next transmission time interval (TTI).

If there does not occur any receiving error, when "uplink data resource allocation (Uplink Data Resource Allocation)" which the base station ought to have transmitted to the mobile station does not arrive thereat, the mobile terminal judges that an receiving error has occurred in the base station, and then transmits the uplink scheduling request signal SR indicating "with request ('1')" again.

The first example of the setting will be explained in greater detail with reference to FIGS. 28, 29, and 30.

Figure 29:
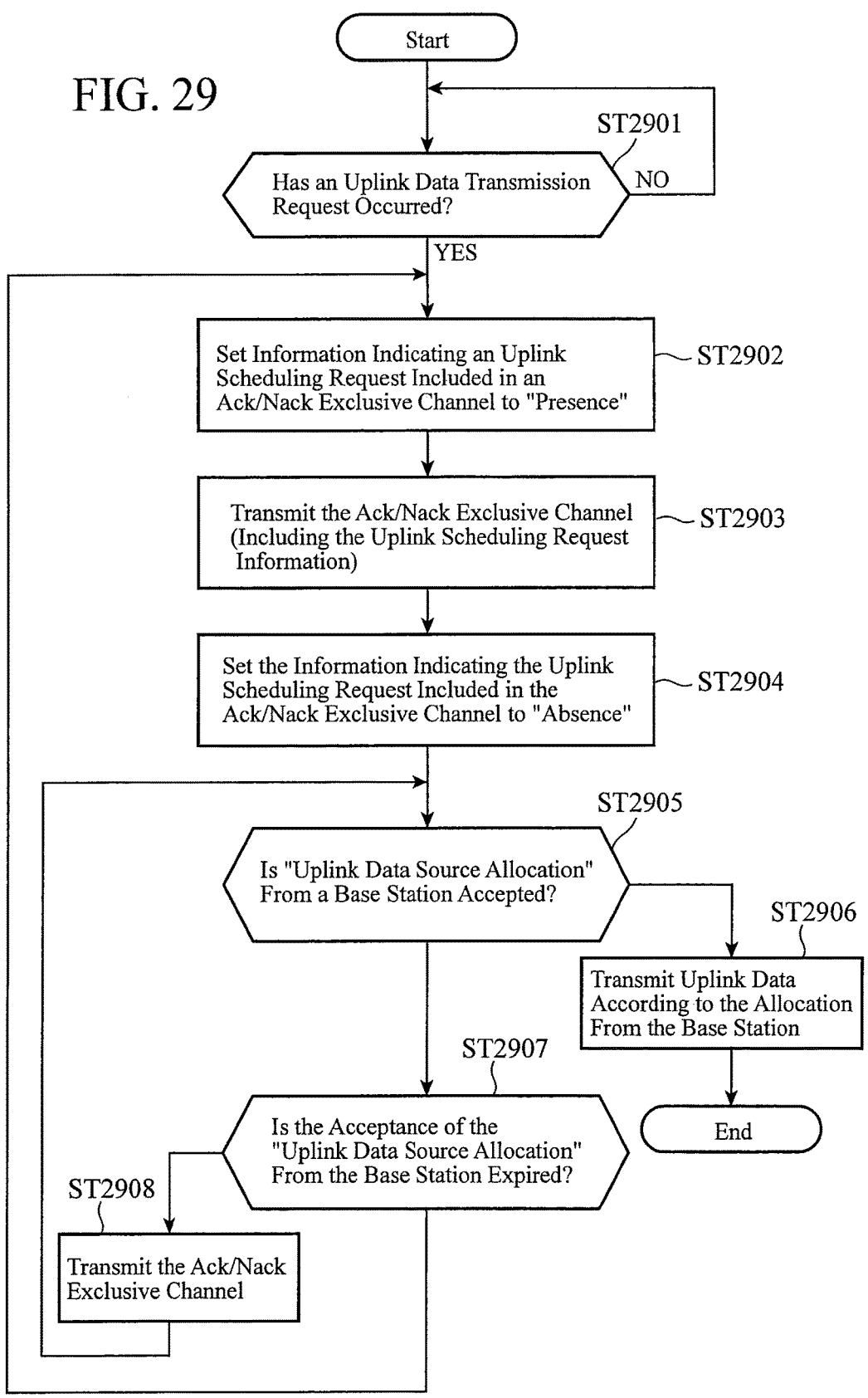
FIG. 29 is a flow diagram of processing carried out by a mobile terminal in the case of the first example of the setting.
Figure 30:
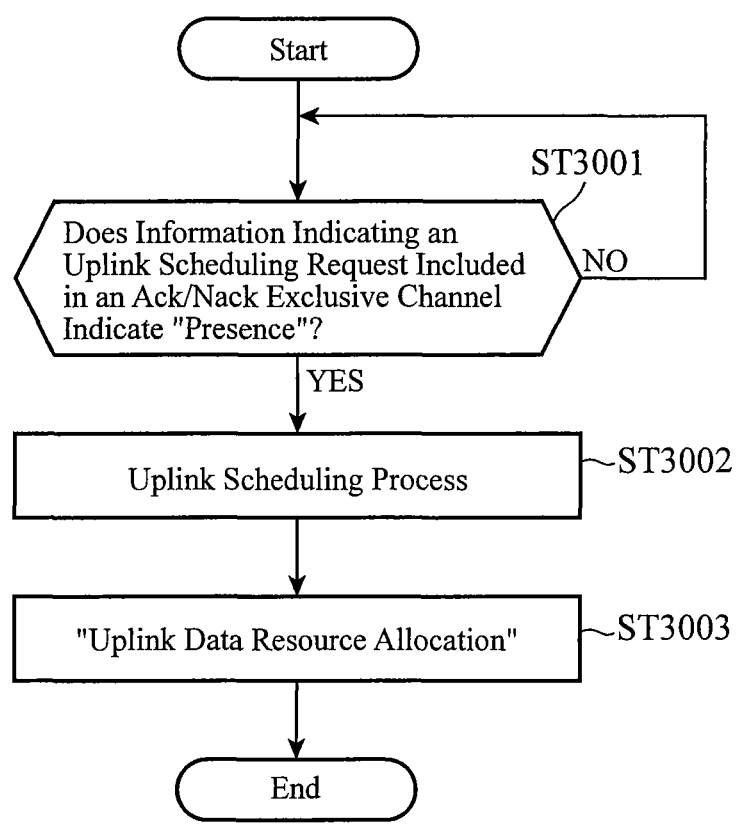
FIG. 30 is a flow diagram of processing carried out by a base station in the case of the first example of the setting.

FIG. 28 is a sequence diagram, and FIG. 29 is a flow diagram of processing carried out by the mobile terminal. FIG. 30 is a flow diagram of processing carried out by the base station.

In FIG. 28, a time T shows a time limit (an upper limit) by which the mobile terminal has to receive uplink resource allocation made by the base station, and the mobile terminal uses a timer or the like in order to implement the time T.

The operation of the first example of the setting will be explained by mainly referring to FIG. 29.

First, a case in which no receiving error occurs when the base station receives an uplink scheduling request signal SR will be explained. As a sequence diagram, FIG. 28(i) shows the case in which no receiving error occurs.

The mobile terminal, in ST2901, judges whether a request for transmission of uplink data has occurred. When a request for transmission of uplink data has occurred, the mobile terminal advances to ST2902. In contrast, when no request for transmission of uplink data has occurred, the mobile terminal returns to the judgment of ST2901.

The mobile terminal, in ST2902, sets up information indicating the presence of an uplink scheduling request (UL Scheduling request="1" currently allocated to LB1 in FIG. 14) in the Ack/Nack exclusive channel.

The mobile terminal then, in ST2903, transmits the information indicating the "presence" of uplink scheduling by using the Ack/Nack exclusive channel. This step corresponds to ST2801 in FIG. 28.

After transmitting the information indicating the "presence" of uplink scheduling by using the Ack/Nack exclusive channel, the mobile terminal, in ST2904, sets up information indicating the absence of an uplink scheduling request (UL Scheduling request="0" currently allocated to LB1 in FIG. 14) in the Ack/Nack exclusive channel.

The mobile terminal, in ST2905, judges whether the mobile terminal has received uplink data resource allocation "Uplink Data Resource Allocation" from the base station. That is, the mobile terminal judges whether the mobile terminal has received uplink transmission allocation from the base station.

When, in ST2905, has received uplink data resource allocation, the mobile terminal advances to ST2906. This step corresponds to ST2804 in FIG. 28. The mobile terminal, in ST2906, transmits uplink data according to the allocation from the base station.

In contrast, when, in ST2905, has not received uplink data resource allocation, the mobile terminal advances to ST2907. The mobile terminal, in ST2907, judges whether the current time exceeds the time limit by which the mobile terminal has to receive "Uplink Data Resource Allocation" from the base station. More specifically, the mobile terminal judges whether the time which has elapsed since the mobile terminal transmitted the information indicating the "presence of an uplink scheduling request signal SR exceeds the time T as shown in FIG. 28.

When, in ST2905, the elapsed time does not exceed the time T, the mobile terminal advances to ST2908. The mobile terminal, in ST2908, transmits the information indicating the "absence" of uplink scheduling by using the Ack/Nack exclusive channel (UL Scheduling request="0" currently allocated to LB1 in FIG. 14).

After, in ST2908, transmitting the information indicating the "absence" of uplink scheduling by using the Ack/Nack exclusive channel, the mobile terminal returns to the judgment of ST2905. This step corresponds to ST2802 and ST2803 in FIG. 28.

Next, a case in which an receiving error occurs when the base station receives an uplink scheduling request signal SR will be explained. As a sequence diagram, FIG. 28(ii) shows the case in which a receiving error occurs.

Because the explanation of the steps of ST2901 to ST2906 is the same as that in the above-mentioned case in which no receiving error occurs, the explanation will be omitted.

The mobile terminal, in ST2907, judges whether the current time exceeds the time limit by which the mobile terminal has to receive "Uplink Data Resource Allocation" from the base station, like in the above-mentioned case in which no receiving error occurs. More specifically, the mobile terminal judges whether the time which has elapsed since the mobile terminal transmitted the information indicating the "presence" of an uplink scheduling request signal SR exceeds the time T as shown in FIG. 28.

In this case, as shown in FIG. 28(ii), an receiving error has occurred in the information indicating the presence or absence of an uplink scheduling request currently allocated, in ST2807, to the Ack/Nack exclusive channel. Therefore, at the timing (time "'t'" of (ii) of FIG. 28) at which the mobile terminal should have originally received "Uplink Data Resource Allocation" from the base station, the mobile terminal does not accept any uplink transmission allocation from the base station. As a result, the mobile terminal, in ST2907, judges that the time which has elapsed since the mobile terminal, in ST2811 of FIG. 28, transmitted the information indicating the "presence" of an uplink scheduling request signal SR exceeds the time T.

In this case, the mobile terminal returns to ST2902, sets up information indicating the presence of an uplink scheduling request (UL Scheduling request="1" currently allocated to LB1 in FIG. 14) in the Ack/Nack exclusive channel, and then retransmits the uplink scheduling request signal SR (ST2903). This step corresponds to ST2811 in FIG. 28.

Next, a flow of processing performed by the base station in the first example of the setting will be explained with reference to FIG. 30.

The base station, in step ST3001, judges whether the information indicating the presence or absence of an uplink scheduling request currently allocated to the Ack/Nack exclusive channel in ST3001 shows the "presence." When the information indicates the "absence," the base station returns to the judgment of ST3001.

When the base station, in step ST3001, judges that the information indicates the "presence", the base station performs an uplink scheduling process for the mobile terminal which, in step ST3002, has transmitted the uplink scheduling request thereto by using the Ack/Nack exclusive channel. This step corresponds to ST2801 or ST2811 in FIG. 28.

In order to perform uplink transmission allocation for the mobile terminal, the base station, in ST3003, transmits the result as "Uplink Data Resource Allocation." This step corresponds to ST2804 or ST2814 in FIG. 28.

In the second example of the setting, when not receiving any uplink scheduling request signal SR, the base station always transmits 0, like in the case of the first example of the setting. In contrast, in the flow chart of FIG. 8, when the mobile terminal transmits an uplink scheduling request signal SR, the mobile terminal continues transmitting the information indicating "the presence of a request (='1')" until "Uplink Data Resource Allocation" is transmitted thereto from the base station, and, after receiving "Uplink Data Resource Allocation", the mobile terminal transmits the information indicating "the absence of a request (='0')".

The second example of the setting will be explained in greater detail with reference to FIGS. 31, 32, and 33.

Figure 32:
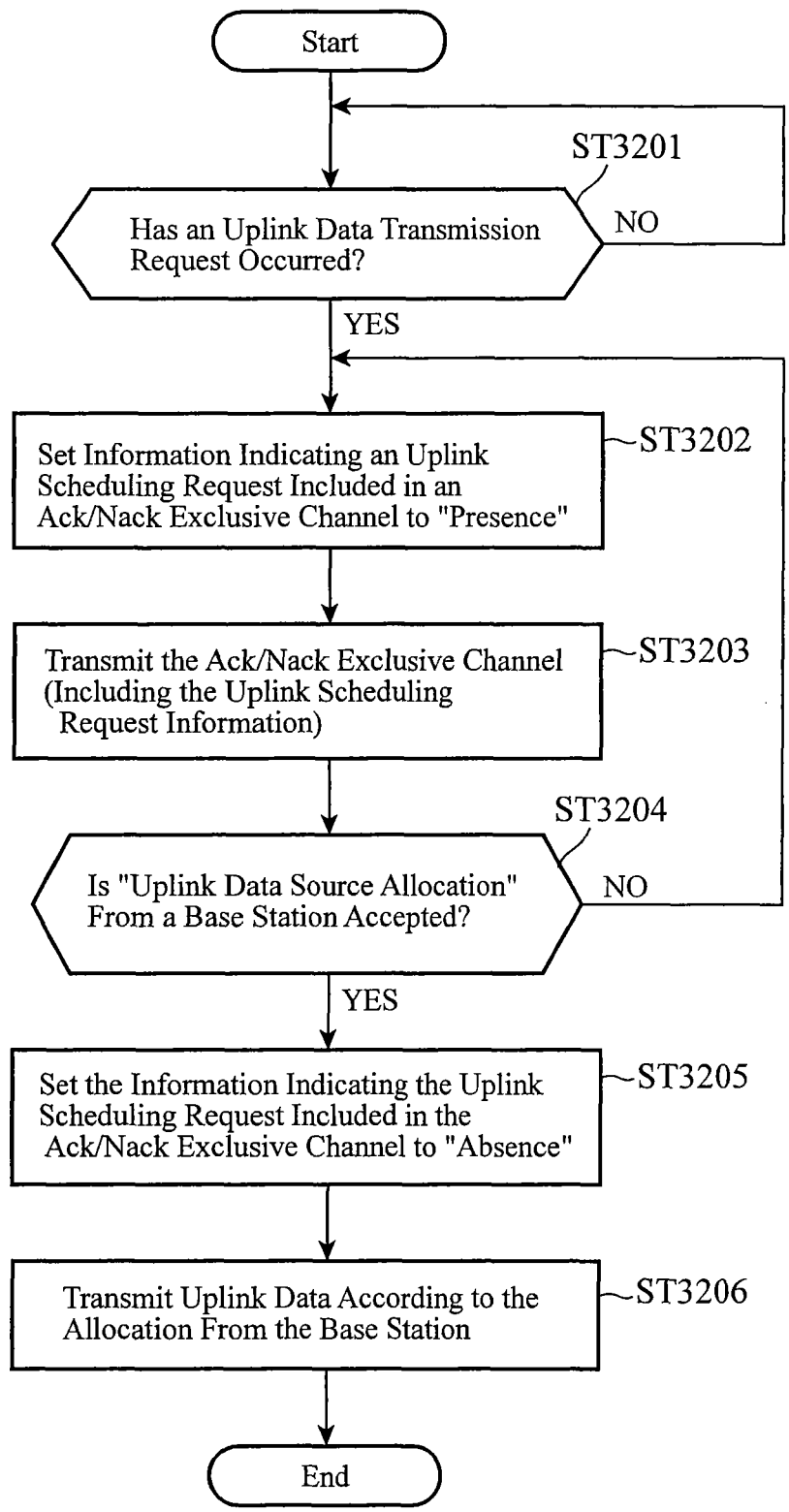
FIG. 32 is a flow diagram of processing carried out by a mobile terminal in the case of the second example of the setting.
Figure 33:
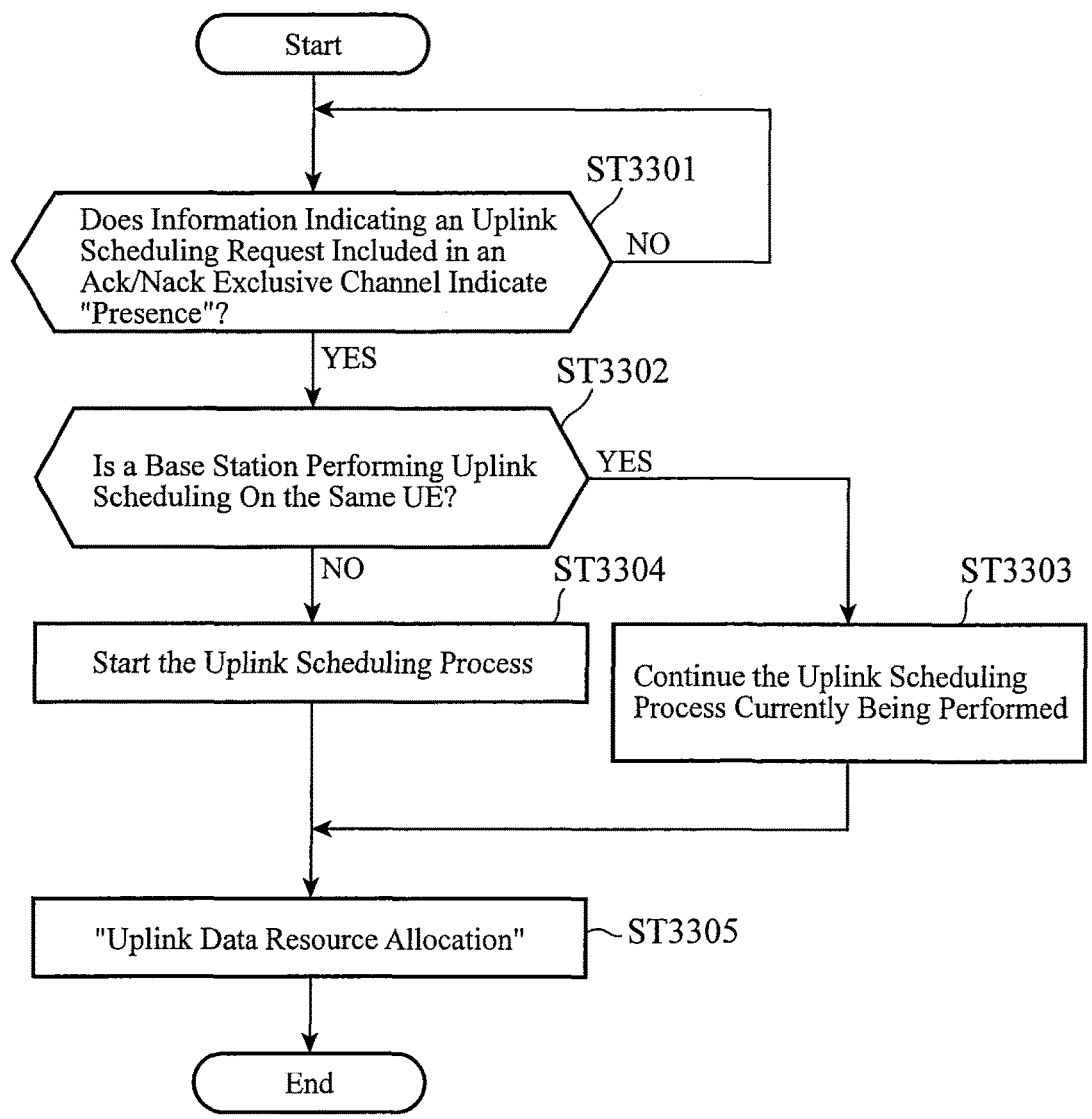
FIG. 33 is a flow diagram of processing carried out by a base station in the case of the second example of the setting.

FIG. 31 is a sequence diagram, and FIG. 32 is a flow diagram showing processing carried out by the mobile terminal. FIG. 33 is a flow diagram showing processing carried out by the base station.

The operation of the second example of the setting will be explained by mainly referring to FIG. 32.

First, a case in which no receiving error occurs when the base station receives an uplink scheduling request signal SR will be explained. As a sequence diagram, FIG. 31(i) shows the case in which no receiving error occurs.

The mobile terminal, in ST3201, judges whether a request for transmission of uplink data has occurred. When a request for transmission of uplink data has occurred, the mobile terminal advances to ST3202. In contrast, when no request for transmission of uplink data has occurred, the mobile terminal returns to the judgment of ST3201.

The mobile terminal, in ST3202, sets up information indicating the presence of an uplink scheduling request (UL Scheduling request="1" currently allocated to LB1 in FIG. 14) in the Ack/Nack exclusive channel.

The mobile terminal then, in ST3203, transmits an uplink scheduling request by using the Ack/Nack exclusive channel. This step corresponds to ST3101 in FIG. 31.

The mobile terminal, in ST3204, judges whether the mobile terminal has received "uplink data resource allocation (Uplink Data Resource Allocation)" from the base station. That is, the mobile terminal judges whether the mobile terminal has received uplink transmission allocation from the base station.

When, in ST3204, has received uplink transmission allocation, the mobile terminal advances to ST3205. In contrast, when has not received uplink transmission allocation, the mobile terminal returns to ST3202. This step corresponds to ST3104 in FIG. 31.

The mobile terminal, in ST3205, sets up information indicating the absence of an uplink scheduling request (UL Scheduling request="0" currently allocated to LB1 in FIG. 14) in the Ack/Nack exclusive channel. This step corresponds to ST3105 in FIG. 31.

The mobile terminal, in ST3206, transmits uplink data according to the allocation from the base station.

Next, a case in which a receiving error occurs when the base station receives an uplink scheduling request signal SR will be explained. As a sequence diagram, FIG. 31(ii) shows the case in which a receiving error occurs.

Because the flow of the processing carried out by the mobile terminal in this case is the same as that in the above-mentioned case in which no receiving error occurs, the flow will be omitted.

The case (ii) shown in FIG. 31 will be explained.

A receiving error occurs in the information indicating the presence or absence of an uplink scheduling request currently allocated, in ST3107, to the Ack/Nack exclusive channel. Therefore, at the timing (time "'t'" in the case (ii) of FIG. 31) at which the mobile terminal should have originally received "Uplink Data Resource Allocation" from the base station, the mobile terminal does not accept any uplink transmission allocation from the base station.

However, in the second example of the setting, following the step of ST3107, the mobile terminal, also in ST3108, transmits the information indicating the presence of an uplink scheduling request (UL Scheduling request="1" currently allocated to LB1 in FIG. 14) by using the Ack/Nack exclusive channel. Therefore, when normally receiving the information indicating the presence or absence of an uplink scheduling request currently allocated to the Ack/Nack exclusive channel transmitted in ST3108, the base station, in ST3111, transmits "Uplink Data Resource Allocation." That is, the mobile terminal receives the uplink transmission allocation from the base station.

Next, a flow of processing carried out by the base station in the second example of the setting will be explained with reference to FIG. 33.

The base station, in step ST3301, judges whether the information indicating the presence or absence of an uplink scheduling request currently allocated to the Ack/Nack exclusive channel shows the "presence". When the information indicates the "absence," the base station returns to the judgment of ST3301.

When the base station, in step ST3301, judges that the information indicates the "presence," the base station, in ST3302, judges whether or not the base station is performing an uplink scheduling process for the mobile terminal.

When, in ST3302, judging that the base station is performing an uplink scheduling process for the mobile terminal (corresponding to ST3102, ST3103, ST3109, and ST3110 in FIG. 31), the base station advances to ST3303. The base station, in ST3303, continues performing the uplink scheduling process which the base station has been performing.

In contrast, when, in ST3302, judging that the base station is not performing any uplink scheduling process for the mobile terminal (corresponding to ST3101 and ST3108 in FIG. 31), the base station advances to ST3304. The base station, in ST3304, starts performing an uplink scheduling process for the mobile terminal.

When, in ST3303 or ST3304, completing the uplink scheduling process for the mobile terminal, the base station, in ST3305, transmits the result of the process as "Uplink Data Resource Allocation" in order to perform uplink transmission allocation for the mobile terminal. This step corresponds to ST3104 or ST3111 in FIG. 31.

The advantages of the first example of the setting and the second example of the setting will be explained.

Compared with the second example of the setting, the merits of the first example of the setting can be provided as follows:

(1) Because, when receiving an uplink scheduling request by using the Ack/Nack exclusive channel, the base station does not have to judge whether or not the base station is performing an uplink scheduling process for the mobile terminal (ST3302 in FIG. 33), the processing carried out by the base station can be simplified.

Compared with the first example of the setting, the merits of the second example of the setting can be provided as follows:

(1) When a receiving error occurs in the information indicating the presence or absence of an uplink scheduling request currently allocated to the Ack/Nack exclusive channel, the time which has elapsed until the mobile terminal actually receives "Uplink Data Resource Allocation" from the timing at which the mobile terminal was expected to receive "Uplink Data Resource Allocation" from the base station becomes short. In the first example of the setting, the time is equal to "a", as shown in FIG. 28. In contrast, in the second example of the setting, the time is equal to "b," as shown in FIG. 31.

(2) Because the mobile terminal does not have to judge whether the current time exceeds the time limit by which the mobile terminal has to receive "Uplink Data Resource Allocation" from the base station (ST2907 in FIG. 29) in its internal processing, the processing carried out by the mobile terminal can be simplified.

Each of the first and second examples of the setting of a scheduling request signal SR which are explained above can also be used in anyone of Embodiment 1, Embodiment 6, Embodiment 7, Embodiment 8, Embodiment 9, and Embodiment 10.

Furthermore, in a case in which the mobile terminal does not have to transmit an Ack/Nack and/or a CQI, but has to transmit only a scheduling request signal, the mobile terminal does not transmit any information about the Ack/Nack and the CQI by using the Ack/Nack exclusive channel, but can transmit only the scheduling request by using the Ack/Nack exclusive channel.

An Ack/Nack symbol and CQI symbols are mapped to long blocks (LB2 to LB6) other than the leading LB (LB1), to which an uplink scheduling request signal SR is mapped, during a transmission time interval (TTI). In this mapping, the Ack/Nack symbol and CQI symbols at higher-order digits with a higher priority among all the CQI symbols are given a higher priority so that they are repeatedly mapped. In FIG. 14, during 1 TTI (=2 subframes), the Ack/Nack symbol is repeatedly mapped three times, and CQI1 and CQI2 with a higher priority are repeatedly mapped twice.

As previously explained, in a case in which the transmission time of an uplink scheduling request signal SR is sufficiently small as shown in the sequence of FIG. 8, the uplink scheduling request signal SR, and Ack/Nack information symbols (an Ack/Nack and/or a CQI), is mapped to the Ack/Nack exclusive channel. As a result, even when a plurality of "data-non-associated L1/L2 control signals" which have to be transmitted occur simultaneously in a mobile terminal, while the communication quality of these important control signals is attained, increase in the radio resources load on the communication system can be prevented, and transmission with a single carrier method which guarantees a low PAPR and high communication quality can be implemented.

Furthermore, because the Ack/Nack exclusive channel is not a channel (contention based channel), such as an S-RACH, which allows communications competition among a plurality of mobile terminals, compared with the case of using an S-RACH, the use of this method can also provide an advantage of eliminating the necessity to transmit the identification number (UE-ID) of the mobile terminal through transmission of an uplink scheduling request signal SR.

Figure 24:
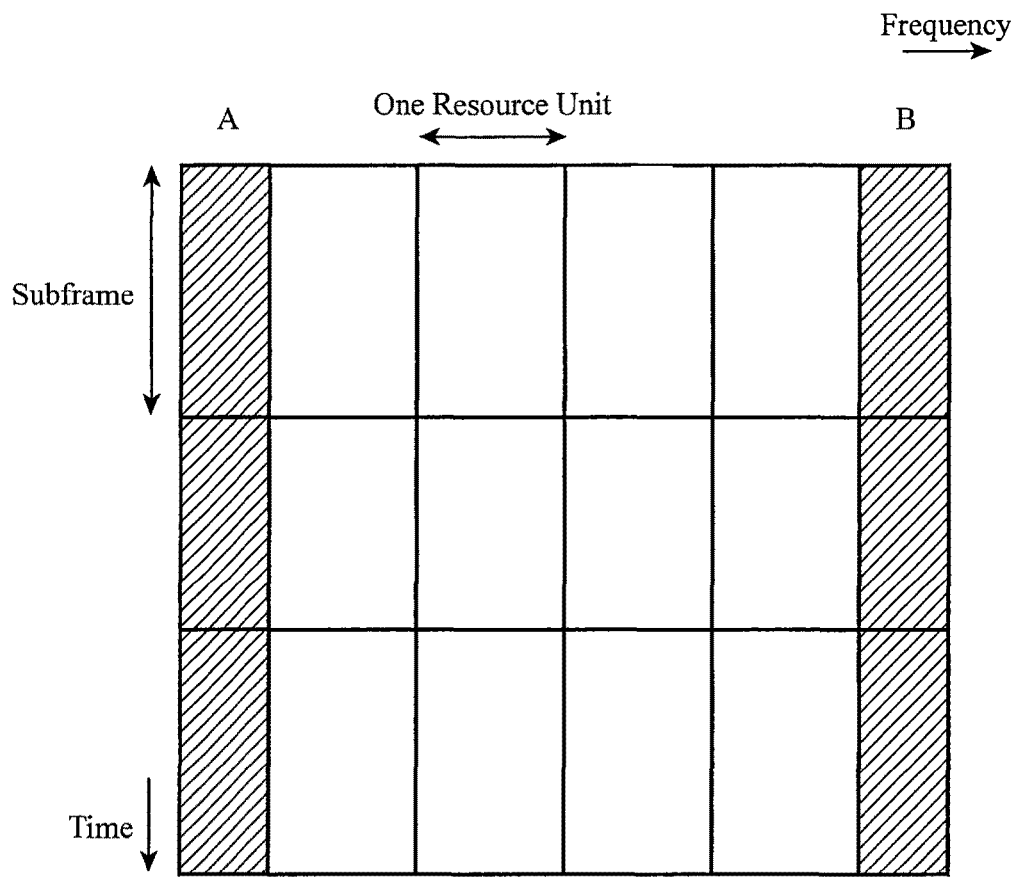
FIG. 24 is an explanatory drawing showing radio resources in which an Ack/Nack and a CQI are allocated to an Ack/Nack exclusive channel.

Therefore, in a case in which the frequency of the transmission of an SR is high, it can be said that it is an effective means because the required number of bits for transmitting an SR is small. In addition, a plurality of time-frequency regions (A and B in FIG. 24) having narrow bands which are separated as shown in FIG. 24 are allocated to the Ack/Nack exclusive channel. As a result, a scheduling request signal SR which is transmitted by using the Ack/Nack exclusive channel has high resistance to the frequency selective fading. In other words, a scheduling request signal SR can have a frequency diversity gain.

Furthermore, in a case in which a scheduling request signal SR is transmitted from the mobile terminal to the base station by not using an S-RACH, but using the Ack/Nack exclusive channel when the mobile terminal is not performing any transmission of uplink data, but is receiving downlink data, the radio resources (the frequency-time regions) which are beforehand allocated for the S-RACH can be released for a UL-SCH or the like, and the method is effective from the viewpoint of effective use of the radio resources.

The Ack/Nack exclusive channel is a channel which the mobile terminal has been using in the state in which the mobile terminal is not performing any transmission of uplink data, but is receiving downlink data. Therefore, by mapping an Ack/Nack and a CQI with an uplink scheduling request signal SR, to the Ack/Nack exclusive channel, there is provided an advantage of being able to use the radio resources currently being used effectively, in addition to an advantage of being able to implement transmission by using a single carrier method which guarantees both a low PAPR and high communication quality.

Furthermore, as mentioned above, by using a scheduled channel like the Ack/Nack exclusive channel, there can be provided a further advantage of eliminating the necessity to transmit the identification number (UE-ID) of the mobile terminal through transmission of an uplink scheduling request signal SR. Therefore, the processing load on the base station when receiving an uplink scheduling request signal can be reduced.

In addition, because the Ack/Nack exclusive channel is used with a frequency band narrower than usually being allocated thereto, the Ack/Nack exclusive channel has a small amount of information to be processed per a unit time. Therefore, because the processing time in each of the transmission and the reception also becomes short, the process delay (Latency) of the sequence (ST701 to ST703 of FIG. 7 and ST801 to ST804 of FIG. 8) including from the transmission of an uplink scheduling request signal SR up to a start of the transmission becomes short, and this can contribute to greater efficiency and a speedup of the processing of the whole communication system.

On the other hand, there can be considered a mobile communication system in which even when a mobile terminal is not receiving any downlink data, an Ack/Nack exclusive channel is allocated to the mobile terminal. More specifically, there can be considered a case in which, in order to prepare for future downlink scheduling even when there exist no downlink data, or maintain synchronization between a base station and a mobile terminal, the mobile terminal notifies the result (CQI) of measurement of the quality of a downlink communication path. Also in such a case, there may be a case in which transmission of a CQI using an Ack/Nack exclusive channel and that of an uplink scheduling request signal SR occur simultaneously. In such a mobile communication system, in the judgment of ST602, the mobile terminal had better to makes the judgment by judging whether the mobile terminal has received allocation of an Ack/Nack exclusive channel. In addition, even a mobile communication system in which when a mobile terminal is not receiving any downlink data no Ack/Nack exclusive channel is allocated to the mobile terminal can use this judgment.

Figure 23:
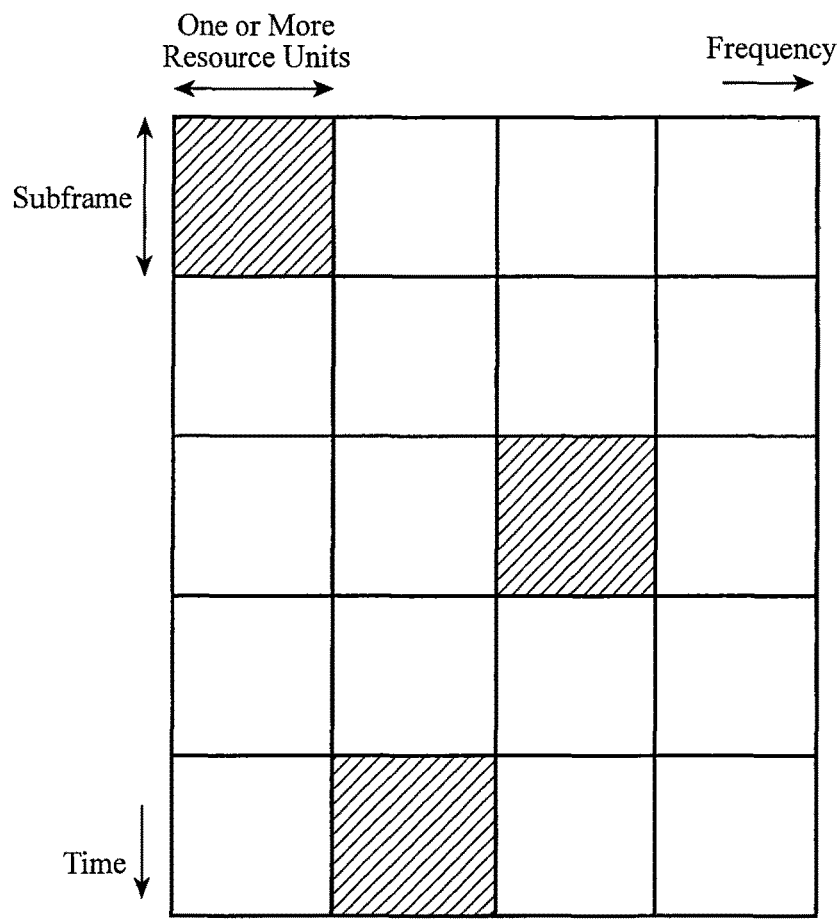
FIG. 23 is an explanatory drawing showing radio resources to which an Ack/Nack and a CQI are allocated in the case in which uplink data transmission is carried out or in the case in which no uplink data transmission is carried out.

In this Embodiment 3, an Ack/Nack exclusive channel to which a plurality of time-frequency regions having narrow bands which are separated as shown in FIG. 24 are allocated monopolistically is explained. However, this Embodiment 3 can also be adapted to an Ack/Nack exclusive channel not having a narrow band, as shown in FIG. 23.

Embodiment 4

In a case in which a mobile terminal is not transmitting any uplink data (Uplink data, UL data) such as user data, but is receiving downlink data (Downlink data, DL data) transmitted from a base station, the mobile terminal has to transmit an Ack/Nack signal, which is the result of the reception of the downlink data, and a CQI indicating the quality of a downlink communication path to the base station.

Furthermore, when a necessity for transmission of uplink data occurs in a mobile terminal, the mobile terminal has to transmit an uplink scheduling request signal SR to the base station.

Hereafter, a method of making a mobile terminal which has to transmit an Ack/Nack and an uplink scheduling request signal SR simultaneously perform these transmissions simultaneously without increasing the PAPR will be explained.

In accordance with above-mentioned Embodiment 3, by transmitting an Ack/Nack and a CQI with a scheduling request signal SR, by using an Ack/Nack exclusive channel, transmission through use of a single carrier method which guarantees both a low PAPR and high communication quality can be implemented. However, in a case of an example shown in FIG. 14, in the transmission, it is necessary to map a symbol indicating the presence or absence of a scheduling request signal SR to the Ack/Nack exclusive channel. Therefore, in the case of using above-mentioned Embodiment 3 to multiplex an Ack/Nack, a CQI and an uplink scheduling request signal SR (SR) to the Ack/Nack exclusive channel by using a TDM method, the following two problems newly arise.

The first problem will be explained hereafter.

Even in a case in which an SR does not have to be transmitted, an LB to which an SR is mapped has to be allocated in advance. Therefore, a radio resource must always be allocated to the information which does not have to be transmitted. The problem is therefore that there cannot be provided an advantage of making effective use of the radio resources.

The second problem will be explained hereafter.

Compared with a case in which an SR is not multiplexed to an Ack/Nack exclusive channel by using a TDM method, there is a disadvantage of reducing the number of repetitions that an Ack/Nack or a CQI is transmitted. In most cases, an encoding process with high error correction capability is not performed on an Ack/Nack and a CQI, unlike in the case of data. Therefore, in order to prevent a receiving error from occurring in a base station, repeating the same information to increase the receive power of the base station is important to improve the reception quality (repetition). The problem is therefore that from the viewpoint of maintaining the reception quality of the base station, reduction in the number of LBs which can be used for the repetition has to be avoided as much as possible.

A method of solving the first and second problems arising newly will be explained hereafter.

Figure 15:
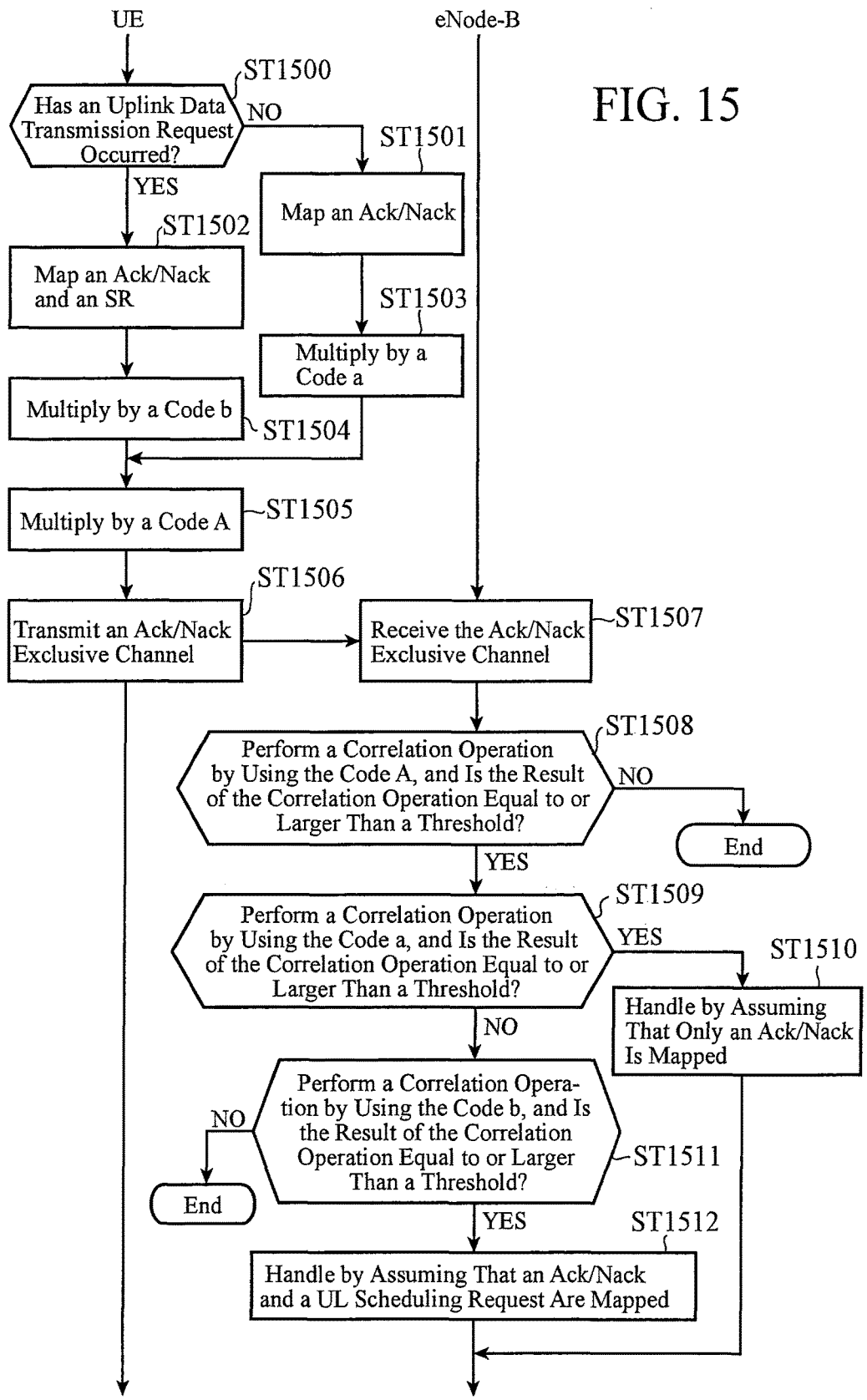
FIG. 15 is a flow chart for explaining processing carried out by a mobile terminal which transmits an uplink scheduling request signal, and processing carried out by a base station which receives the uplink scheduling request signal.

FIG. 15 is a flow chart for explaining processing carried out by a mobile terminal which transmits an uplink scheduling request signal, and processing carried out by a base station which receives the uplink scheduling request signal. FIG. 15 shows processing in a case in which the mobile terminal is not performing transmission of uplink data, but is receiving downlink data.

The mobile terminal, in ST1500, judges whether a request for transmission of uplink data has occurred. When no request for transmission of uplink data has occurred (if No in ST1500), the mobile terminal advances to ST1501. The mobile terminal, in ST1501, maps either or both of an Ack/Nack and a CQI to an Ack/Nack exclusive channel.

As an example of the mapping, the example shown in FIG. 9 can be used. The mobile terminal, in ST1503, multiplies the Ack/Nack exclusive channel by a code (code a) indicating that either or both of the Ack/Nack and CQI are mapped to the Ack/Nack exclusive channel.

This multiplication by code is carried out by the modulating unit 10 or the encoder unit 9. After the multiplication by code is carried out, a process of ST1505 is carried out.

In contrast, when, in ST1500, a request for transmission of uplink data has occurred, a process of ST1502 is carried out. The mobile terminal, in ST1502, maps either or both of the Ack/Nack and the CQI to the Ack/Nack exclusive channel, and also maps an uplink scheduling request signal SR to the Ack/Nack exclusive channel.

As an example of the mapping, the example shown in FIG. 14 can be used. The mobile terminal, in ST1504, multiplies the Ack/Nack exclusive channel by a code (code b) indicating that either or both of the Ack/Nack and the CQI, and the uplink scheduling request signal SR are mapped to the Ack/Nack exclusive channel, the code being different from the code a. This multiplication by code is carried out by the modulating unit 10 or the encoder unit 9. After the multiplication by code is carried out, the process of ST1505 is carried out. As the codes a and b, codes which are perpendicular to each other can be used in order to reduce occurrence of an error in the judgment by the base station.

In the mobile communication system, in a case in which code division multiplexing is used as multiplexing of signals from a plurality of mobile terminals in the Ack/Nack exclusive channel, the Ack/Nack exclusive channel is, in ST1505, multiplied by a code (a code A) for identifying the plurality of mobile terminals. This multiplication by code is carried out by the modulating unit 10. After the multiplication by code is carried out, ST1506 is carried out.

Since the Ack/Nack exclusive channel is, in ST1505, multiplied by the code (the code A) for identifying the plurality of mobile terminals, the codes (the codes a and b) by which the Ack/Nack exclusive channel is multiplied in steps ST1503 and ST1504 can be used in common by the plurality of mobile terminals whose signals are multiplexed into the Ack/Nack exclusive channel. The order in which the Ack/Nack exclusive channel is multiplied by the codes a and A, and the order in which the Ack/Nack exclusive channel is multiplied by the codes b and A can be reverse. The mobile terminal, in ST1506, transmits the Ack/Nack exclusive channel to the base station.

The base station, in ST1507, receives the signal transmitted thereto by using the Ack/Nack exclusive channel. The base station then performs a process of multiplying the signal by the codes which are used for the multiplexing of the signals from the plurality of mobile terminals in the Ack/Nack exclusive channel in order to demultiplex the signal transmitted thereto by using the Ack/Nack exclusive channel into the signals from the plurality of mobile terminals.

The base station, in ST1508, performs a correlation operation by using the code (code A) indicating the mobile terminal. When the result of the correlation operation is equal to or larger than a predetermined threshold (if Yes in ST1508), the base station judges that the reception is the one of the Ack/Nack exclusive channel from the mobile terminal, and carries out a process of ST1509.

When the result of the correlation operation which the base station performed in step ST1508 is smaller than the predetermined threshold (if No in ST1508), the base station judges that the reception is not the one of Ack/Nack exclusive channel from the mobile terminal, and ends the processing. The correlation operation using the code A is carried out by the demodulating unit 24. The base station, in ST1509, performs a correlation operation by using the code a in order to judge whether or not only the Ack/Nack and the CQI are mapped to the Ack/Nack exclusive channel from the mobile terminal. When the result of the correlation operation is equal to or larger than the predetermined threshold (if Yes in ST1509), the base station judges that only the Ack/Nack and the CQI are mapped to the Ack/Nack exclusive channel from the mobile terminal (judges that any scheduling request signal SR is not mapped to the Ack/Nack exclusive channel), and carries out a process of ST1510.

The correlation operation using the code a is carried out by the demodulating unit 24 or the decoder unit 25. The base station, in ST1510, carries out the process by judging that only the Ack/Nack and the CQI are mapped to the received Ack/Nack exclusive channel from the mobile terminal.

In contrast, when the result of the correlation operation which the base station, in ST1509, performed by using the code a is less than the predetermined threshold (if No in ST1509), the base station carries out ST1511. The base station, in ST1511, performs a correlation operation by using the code b in order to judge whether or not the scheduling request signal SR, in addition to the Ack/Nack and the CQI, is mapped to the Ack/Nack exclusive channel from the mobile terminal. When the result of the correlation operation is equal to or larger than a predetermined threshold (if Yes in ST1511), the base station judges that the scheduling request signal SR, in addition to the Ack/Nack and the CQI, is mapped to the Ack/Nack exclusive channel from the mobile terminal, the base station carries out a process of ST1512.

The correlation operation using the code b is carried out by the demodulating unit 24 or the decoder unit 25. The base station, in ST1512, carries out the processing by judging that the scheduling request signal SR, in addition to the Ack/Nack and the CQI, is mapped to the received Ack/Nack exclusive channel from the mobile terminal. In contrast, when the result of the correlation operation which the base station, in ST1511, performed by using the code b is less than the predetermined threshold (if No in ST1511), the base station judges that a receiving error has occurred and ends the processing.

Figure 34:
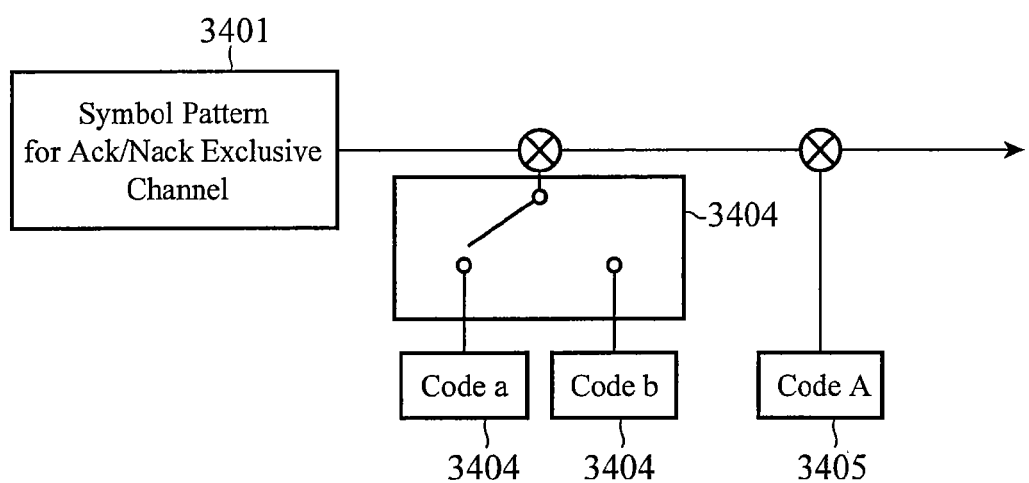
FIG. 34 is a detailed block diagram of a mobile terminal which transmits an uplink scheduling request signal.

As mentioned above, in FIG. 15, ST1503 in which the multiplication by the code a is performed, ST1504 in which the multiplication by the code b is performed, and ST1505 in which the multiplication by the code A is performed are carried out by the encoder unit 9 and the modulating unit 10 in the mobile terminal. A detailed block diagram showing the multiplication by the code a, the multiplication by the code b, and the multiplication by the code A is shown in FIG. 34.

A symbol pattern 3401 for the Ack/Nack exclusive channel in the transmission buffer 8 or the encoder unit 9 is multiplied by either the code a 3402 indicating that either or both of the Ack/Nack and the CQI are mapped to the Ack/Nack exclusive channel, or the code b 3403 indicating that either or both of the Ack/Nack and the CQI and the scheduling request signal SR are mapped to the Ack/Nack exclusive channel.

The multiplication by the code a 3402 and the multiplication by the code b 3403 are switched by a switch 3404. The switching condition of the switch 3404 is as shown in FIG. 34.

When a request for transmission of uplink data has occurred, i.e., when there is an uplink scheduling request, the switch operates in such a way that the symbol pattern 3401 for the Ack/Nack exclusive channel is multiplied by the code b. In contrast, when no request for transmission of uplink data has occurred, i.e., when there is no uplink scheduling request, the switch operates in such a way that the symbol pattern 3401 for the Ack/Nack exclusive channel is multiplied by the code a.

After multiplying the symbol pattern by the code a or b, the mobile terminal multiplies the symbol pattern by the code A 3405 for identifying the mobile terminal. After that, a modulation process is performed on the symbol pattern by the modulating unit 10.

As previously explained, because the mobile terminal multiplies the Ack/Nack exclusive channel by a code which differs according to whether or not a scheduling request signal SR, in addition to an Ack/Nack and a CQI, is mapped to the Ack/Nack exclusive channel, the mobile terminal does not have to reserve a symbol for the scheduling request signal SR in the Ack/Nack exclusive channel. For example, the scheduling request signal SR is mapped to the first long block LB1 shown in FIG. 14, though, when no scheduling request signal SR is transmitted, the Ack/Nack, the CQI, and so on can be mapped to the LB1. Furthermore, because the base station can identify easily whether a signal from a certain mobile terminal includes a scheduling request signal SR by using the code by which the signal is multiplied, the base station can perform an appropriate process on the signal according to whether or not the scheduling request signal SR is mapped.

In accordance with the W-CDMA method which is a conventional technology, in order to enable a base station to demultiplex a received signal into signals associated with a plurality of channels transmitted simultaneously from a mobile terminal, a signal associated with each channel is multiplied by a different code (a channelization code) and the signals associated with the plurality of channels are simultaneously transmitted from the mobile terminal to the base station.

In contrast, in accordance with this Embodiment 4, in order to demultiplex the received signal into the several types of information: "Ack/Nack and CQI" or "Ack/Nack, CQI, and SR"), which are transmitted with the codes, the codes are used.

In this Embodiment 4, either "Ack/Nack and CQI" or "Ack/Nack, CQI, and SR" are transmitted from the mobile terminal to the base station, and both "Ack/Nack and CQI" and "Ack/Nack, CQI, and SR" which are demultiplexed with the codes are not transmitted simultaneously. In the above-mentioned point, this Embodiment 4 differs from the conventional technology (W-CDMA) which uses codes in order to demultiplex a received signal into a plurality of channels transmitted simultaneously.

By using this Embodiment 4, the following advantages can be provided, like in the case of using above-mentioned Embodiment 3.

There can be provided an advantage of enabling a mobile terminal which has to transmit, an uplink scheduling request signal SR and an Ack/Nack in a case in which the mobile terminal is not performing any transmission of uplink data, but is receiving downlink data to simultaneously transmit them without increasing the PAPR of the mobile terminal.

There can be provided another advantage of eliminating the necessity to add a UE-ID to an uplink scheduling request signal SR through transmission of the uplink scheduling request signal SR by using an Ack/Nack exclusive channel. Therefore, in a case in which the frequency of the transmission of an SR is high, it can be said that it is an effective means because the required number of bits for transmitting an SR is small. In addition, a plurality of time-frequency regions (A and B in FIG. 24) having narrow bands which are separated as shown in FIG. 24 are allocated to the Ack/Nack exclusive channel. As a result, a scheduling request signal SR which is transmitted by using the Ack/Nack exclusive channel has high resistance to the frequency selective fading.

In other words, a scheduling request signal SR can have a frequency diversity gain. Furthermore, in a case in which a scheduling request signal SR is transmitted from a mobile terminal to a base station by not using an S-RACH, but using an Ack/Nack exclusive channel when the mobile terminal is not performing any transmission of uplink data, but is receiving downlink data, the radio resources (the frequency-time regions) which are beforehand allocated for the S-RACH can be released for a UL-SCH or the like, and the method is effective from the viewpoint of effective use of the radio resources.

By using this Embodiment 4, the following advantages can be provided in addition to the advantages offered in the case of using above-mentioned Embodiment 3.

Ina case in which no SR has occurred in a mobile terminal, an LB which is beforehand allocated for transmitting an SR in an Ack/Nack exclusive channel can be eliminated, and therefore the radio resources can be used more effectively. Furthermore, because the allocation for mapping an SR can be eliminated, in the case in which no SR has occurred in the mobile terminal, it becomes unnecessary to reduce the number of repetitions of an Ack/Nack or a CQI in the conventional Ack/Nack exclusive channel. Therefore, there can be provided an advantage of improving the quality of reception of the Ack/Nack or the CQI by a base station.

There can be considered a case in which in the mobile communication system, even when a mobile terminal is not receiving any downlink data, an Ack/Nack exclusive channel is allocated to the mobile terminal. More specifically, there can be considered a case in which, in order to prepare for future downlink scheduling even when there exist no downlink data, or maintain synchronization between a base station and a mobile terminal, the mobile terminal notifies the result (CQI) of measurement of the quality of a downlink communication path. Also in such a case, there may be a case in which transmission of a CQI using an Ack/Nack exclusive channel and that of an uplink scheduling request signal SR occur simultaneously. This Embodiment 4 can also be used for such a mobile communication system.

Hereafter, variants will be explained.

As a first variant, there can be considered a case in which in order to judge whether only an Ack/Nack and a CQI are mapped to an Ack/Nack exclusive channel, only one of the code a or the code b indicating that an uplink scheduling request signal SR is furthermore mapped to the Ack/Nack exclusive channel is used.

As a concrete example, the mobile terminal multiplies the Ack/Nack exclusive channel by the code a when only an Ack/Nack and a CQI are mapped to the Ack/Nack exclusive channel, whereas when an uplink scheduling request signal SR, in addition to an Ack/Nack and a CQI, is mapped to the Ack/Nack exclusive channel, the mobile terminal carries out the process of ST1505 without multiplying the Ack/Nack exclusive channel by the code b (ST1504 is omitted).

The base station, in ST1509, performs a correlation operation by using the code a. When the result of the correlation operation is equal to or larger than a predetermined threshold, the base station judges that only an Ack/Nack and a CQI are mapped to the Ack/Nack exclusive channel and advances to ST1510.

In contrast, when the result of the correlation operation which the base station, in ST1509, performed is smaller than the predetermined threshold, the base station judges that a scheduling request signal SR, in addition to an Ack/Nack and a CQI, is mapped to the Ack/Nack exclusive channel and then carries out ST1512.

By using this first variant, the number of the codes can be reduced, and the process of multiplying the Ack/Nack exclusive channel by the codes in the mobile terminal, and the process of performing correlation operations using the codes in the base station can be reduced. Furthermore, because the number of the codes is reduced, there is provided an advantage of increasing the number of mobile terminals which can be allocated to the Ack/Nack exclusive channel.

As a second variant, there can be considered a case in which for each mobile terminal whose signals are multiplexed into the Ack/Nack exclusive channel, two codes (a code A and a code B) indicating that only an Ack/Nack and a CQI is mapped to the Ack/Nack exclusive channel or an uplink scheduling request signal SR, in addition to the Ack/Nack and the CQI, is mapped to the Ack/Nack exclusive channel are allocated.

As a concrete example, the mobile terminal multiplies the Ack/Nack exclusive channel by the code A when only an Ack/Nack and a CQI are mapped to the Ack/Nack exclusive channel (ST1503), whereas when an uplink scheduling request signal SR, in addition to the Ack/Nack and the CQI, are mapped to the Ack/Nack exclusive channel, the mobile terminal multiplies the Ack/Nack exclusive channel by the code B (ST1504) and advances to ST1506. That is, because the codes allocated for each mobile terminal are used, the mobile terminal, in ST1505, does not have to further multiply the Ack/Nack exclusive channel by a code indicating the mobile terminal.

The base station, in ST1508, performs a correlation operation by using the code (the code A) indicating the mobile terminal. When the result of the correlation operation is equal to or larger than a predetermined threshold, the base station judges that only an Ack/Nack and a CQI are mapped to the Ack/Nack exclusive channel from the mobile terminal, and then advances to ST1510.

In contrast, when the result of the correlation operation is smaller than the predetermined threshold, the base station further, in ST1508, performs a correlation operation by using the code (the code B) indicating the mobile terminal. When the result of the correlation operation is equal to or larger than a predetermined threshold, the base station judges that an uplink scheduling request signal SR, in addition to the Ack/Nack and the CQI, are mapped to the Ack/Nack exclusive channel, and then advances to ST1512. That is, the steps ST1509 and ST1511 among the steps of FIG. 15 can be omitted.

Furthermore, in this Embodiment 4, the entire Ack/Nack exclusive channel is multiplied by either of the code a indicating that only an Ack/Nack and a CQI are mapped to the Ack/Nack exclusive channel and the code b indicating that an uplink scheduling request signal SR, in addition to the Ack/Nack and the CQI, is mapped to the Ack/Nack exclusive channel.

Ina third variant, a long block on the Ack/Nack exclusive channel to which an Ack/Nack and a CQI are mapped is multiplied by the code a indicating that effect and a long block on the Ack/Nack exclusive channel to which an uplink scheduling request signal SR is mapped is multiplied by the code b indicating that effect.

Concretely, the steps ST1503 and ST1504 among the steps shown in FIG. 15 are omitted, and, instead, a step of multiplying a long block on the Ack/Nack exclusive channel to which an Ack/Nack and a CQI are mapped by the code a indicating that effect, and multiplying a long block on the Ack/Nack exclusive channel to which an uplink scheduling request signal SR is mapped by the code b indicating that effect is added.

Furthermore, the steps of ST1509, ST1510, ST1511, and ST1512 among the steps carried out by the base station are omitted, and, instead, a process of performing a correlation operation by using the code a in order to judge whether or not a long block is the one to which an Ack/Nack and a CQI are mapped is added.

When the result of the correlation operation is equal to or larger than a predetermined threshold, the base station judges that the long block is the one to which an Ack/Nack and a CQI are mapped, and then performs a subsequent process. In contrast, when the result of the correlation operation is smaller than the threshold, the base station performs a correlation operation by using the code b in order to judge whether or not the long block is the one to which an uplink scheduling request signal SR is mapped.

When the result of the correlation operation is equal to or larger than a predetermined threshold, the base station judges that the long block is the one to which an uplink scheduling request signal SR is mapped, and then performs a subsequent process. In this case, in addition to the advantages provided by Embodiment 4, there can be provided an advantage of being able to freely choose the location of a long block on the Ack/Nack exclusive channel to which an uplink scheduling request signal SR is mapped.

Hereafter, a fourth variant will be explained.

One type of mapping to the Ack/Nack exclusive channel is provided regardless of whether or not an SR is included in the mapping. The mapping can use the example of FIG. 9. Therefore, information which is, in ST1501 and ST1502, actually mapped to the Ack/Nack exclusive channel is only an Ack/Nack or/and a CQI.

Because subsequent processing carried out by the mobile terminal is the same as that of FIG. 15, the explanation of the subsequent processing will be omitted hereafter.

The base station which has received the Ack/Nack exclusive channel, in ST1510, judges that the base station has not received an SR from the mobile terminal, and then performs a process on the Ack/Nack exclusive channel after judging that only an Ack/Nack or/and a CQI are mapped to the Ack/Nack exclusive channel.

The base station, in ST1512, judges that the base station has received an SR from the mobile terminal, and then performs the processing on the Ack/Nack exclusive channel by judging that only an Ack/Nack or/and a CQI are mapped to the Ack/Nack exclusive channel.

Figure 27:
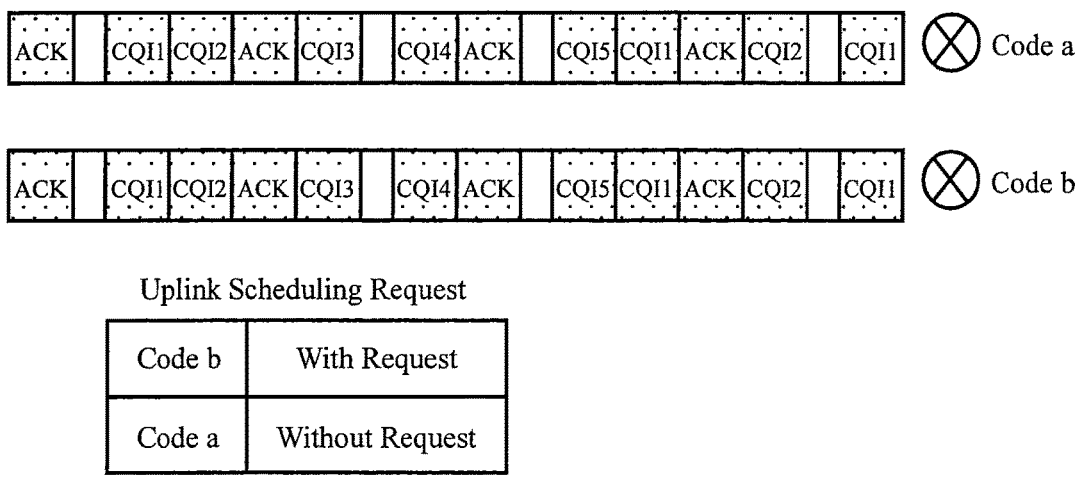
FIG. 27 is an explanatory drawing for explaining an example of mapping of an uplink scheduling request signal which is transmitted by using an Ack/Nack exclusive channel.

FIG. 27 is an explanatory drawing for explaining an example of the mapping of information to the Ack/Nack exclusive channel according to the fourth variant of Embodiment 4. In accordance with the fourth variant of this Embodiment 4, it becomes unnecessary to map an SR to the Ack/Nack exclusive channel, and it becomes possible to make further effective use of the radio resources. Furthermore, even in a case in which an uplink scheduling request signal SR is transmitted from the mobile terminal, the number of repetitions of an Ack/Nack or/and a CQI can be maintained. Therefore, there can be provided an advantage of being able to maintain the quality of reception of an Ack/Nack or/and a CQI by the base station even in a case in which an uplink scheduling request signal SR is transmitted to the base station, like in a case in which no SR is transmitted to the base station. That is, the use of this method can offer an advantage of, when desiring to transmit an uplink scheduling request signal SR, being able to not only use physical channels and radio resources which have already been used, but also hardly affect the amount of information and the quality of other data which are being transmitted by using the radio resources. Therefore, when, for example, allocating an uplink Ack/Nack exclusive channel to a radio resource, the base station does not have to take into consideration the influence of transmission of an uplink scheduling request signal SR upon selection of a condition of the radio resource (a frequency bandwidth or the like).

In this Embodiment 4 and its variants, the case in which the multiplexing of a plurality of mobile terminals into an Ack/Nack exclusive channel is carried out by using a CDM method is explained. As an alternative, Embodiment 4 and the variants can also be applied to a case in which an FDM method or a TDM method is used as the multiplexing method. In this Embodiment 4 and its variants, an Ack/Nack exclusive channel to which a plurality of time-frequency regions having narrow bands separated as shown in FIG. 24 are allocated monopolistically is explained. However, this Embodiment 4 and its variants can also be applied to an Ack/Nack exclusive channel not having a narrow band, as shown in FIG. 23.

Embodiment 5

Figure 16:
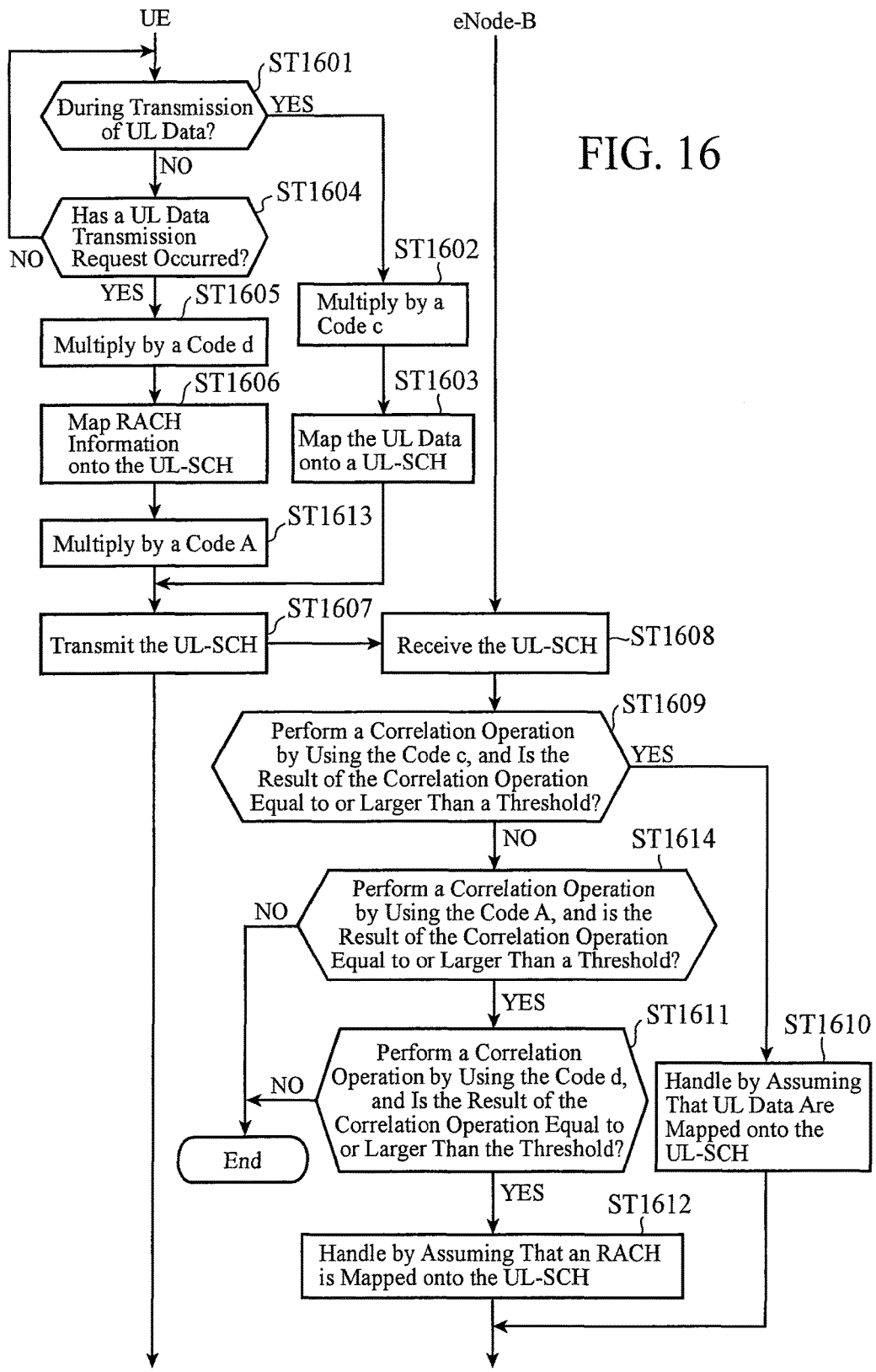
FIG. 16 is a flow chart for explaining processing carried out by a mobile terminal which transmits an uplink scheduling request signal, and processing carried out by a base station which receives the uplink scheduling request signal.

FIG. 16 is a flow chart for explaining processing carried out by a mobile terminal which transmits an uplink scheduling request signal, and processing carried out by a base station which receives the uplink scheduling request signal.

The mobile terminal, in ST1601, judges whether or not the mobile terminal is transmitting uplink data. When the mobile terminal is transmitting uplink data, the mobile terminal advances to ST1602. The mobile terminal which is transmitting uplink data, i.e., which is scheduled to have an uplink resource from the base station does not have to transmit an uplink scheduling request signal SR, and therefore, when the mobile terminal is, in ST1601, transmitting uplink data, the mobile terminal can carry out a process of advancing to ST1602 without going via judgment of ST1604. In other words, it can be considered that in one mobile terminal, uplink data and an uplink scheduling request signal SR do not coexist in a UL-SCH, and the relation of SC-FDMA is not satisfied and hence no increase is produced in the PAPR in the mobile terminal.

The mobile terminal, in ST1602, multiplies the UL-SCH by a code (a code c) indicating that a symbol mapped to the UL-SCH is uplink data. This multiplication by code is carried out by the modulating unit 10 or the encoder unit 9. After performing the multiplication by the code c, the mobile terminal advances to ST1603.

The mobile terminal, in ST1603, maps the uplink data to a resource included in the UL-SCH on which scheduling has been performed by the base station, and advances to ST1607. In contrast, when, in ST1601, the mobile terminal is not transmitting any uplink data, the mobile terminal advances to ST1604.

The mobile terminal, in ST1604, judges whether a request for transmission of uplink data has occurred. When no request for transmission of uplink data has occurred, the mobile terminal returns to ST1601. In contrast, when a request for transmission of uplink data has occurred, the mobile terminal advances to ST1605.

The mobile terminal, in ST1605, multiplies the UL-SCH by a code (a code d) indicating that the symbol mapped to the UL-SCH is an uplink scheduling request signal SR. This multiplication by code is carried out by the modulating unit 10 or the encoder unit 9. After performing the multiplication by the code d, the mobile terminal advances to ST1613. The mobile terminal, in ST1613, multiplies the UL-SCH by a code (a code A) for identifying the mobile terminal. This multiplication by code is carried out by the modulating unit 10. After performing the multiplication by the code, the mobile terminal carries out ST1606. The mobile terminal, in ST1606, maps an uplink scheduling request signal SR (a resource request, a preamble, a message, and so on) to a resource included in the UL-SCH, and advances to ST1607. The order in which the processes of ST1613 and ST1606 are carried out can be reverse. As the codes c and d, codes which are perpendicular to each other can be used in order to reduce occurrence of errors in the judgment by the base station.

The mobile terminal, in ST1607, transmits the UL-SCH to the base station. The base station, in ST1608, receives the UL-SCH transmitted thereto from the mobile terminal. The base station, in ST1609, performs a correlation operation by using the code c in order to judge whether or not uplink data are mapped to the UL-SCH.

When the result of the correlation operation is equal to or larger than a predetermined threshold, the base station judges that uplink data are mapped to the UL-SCH, and then advances to ST1610. The correlation operation using the code c is implemented by the demodulating unit or the decoder unit. The base station, in ST1610, carries out the processing by judging that uplink data are mapped to the UL-SCH.

Because the mobile terminal transmits the uplink data by using a predetermined radio resource for the UL-SCH which the base station has allocated and notified, the base station can distinguish the reception of the UL-SCH channel from the mobile terminal from those from other mobile terminals. In contrast, when, in ST1609, the result of the correlation operation which the base station has carried out by using the code c is smaller than the predetermined threshold, the base station advances to ST1614.

The base station, in ST1614, performs a correlation operation by using the code (the code A) which is used for multiplexing of signals from mobile terminals into the UL-SCH. When the result of the correlation operation is equal to or larger than a predetermined threshold (if Yes in ST1614), the base station judges that the base station has received the UL-SCH from the mobile terminal, and then carries out a process of ST1611. In contrast, when the result of the correlation operation which the base station, in ST1614, carried out is smaller than the predetermined threshold (if No in ST1614), the base station judges that the base station has not received the UL-SCH from the mobile terminal, and ends the processing. The correlation operation using the code A is carried out by the demodulating unit 24.

The base station, in ST1611, performs a correlation operation by using the code d in order to judge whether or not an uplink scheduling request signal SR is mapped to the UL-SCH. When the result of the correlation operation is equal to or larger than a predetermined threshold, the base station judges that an uplink scheduling request signal SR is mapped to the UL-SCH, and then advances to ST1612. The correlation operation using the code d is implemented by the demodulating unit 24 or the decoder unit 25. The base station, in ST1612, carries out the processing by judging that an uplink scheduling request signal SR is mapped to the UL-SCH.

Figure 17:
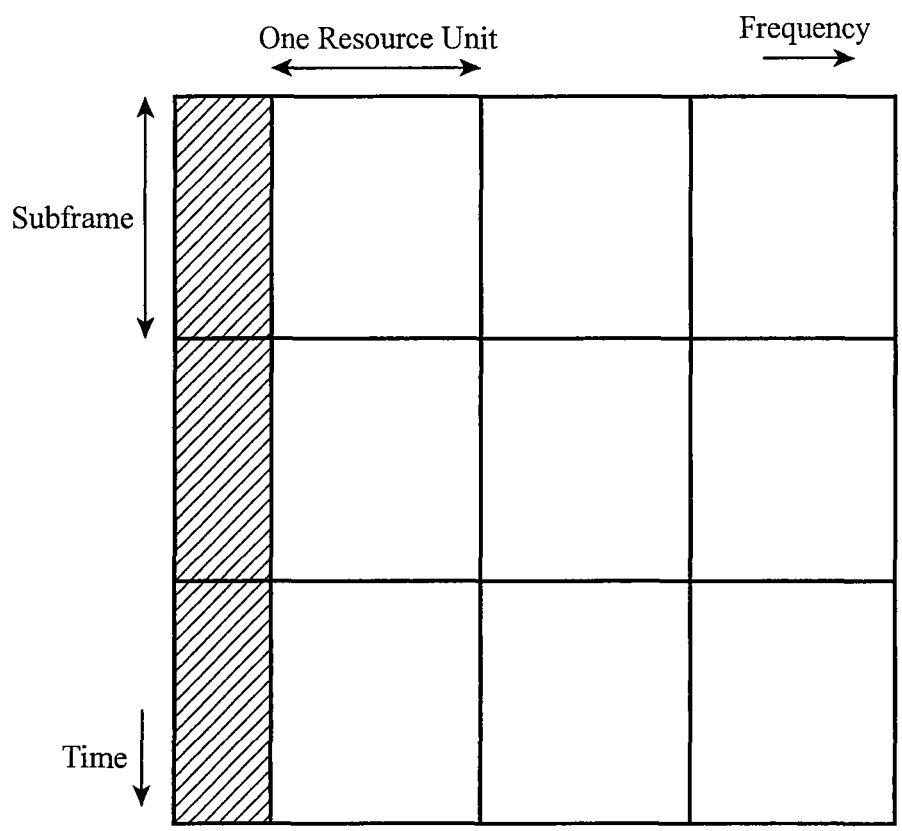
FIG. 17 is an explanatory drawing showing allocation of radio resources of a UL-SCH and an RACH.

As previously explained, because the base station can judge whether or not uplink data are mapped to the UL-SCH and whether or not an uplink scheduling request signal SR is mapped to the UL-SCH by using the codes c and d, there is provided an advantage of eliminating the necessity to reserve radio resources for the RACH (Non-S-RACH and S-RACH) transmission (FIG. 17). Therefore, there is provided an advantage of being able to use the uplink radio resources efficiently. Furthermore, when a request for transmission of an uplink scheduling request signal SR occurs in a mobile terminal, the use of a conventional method does not make it possible for the mobile terminal to transmit the SR to the base station until an uplink resource timing reserved for the RACH (Non-S-RACH and S-RACH). In contrast, according to the present invention, the mobile terminal can transmit an uplink scheduling request signal SR to the base station at all times.

Therefore, there is provided an advantage of being able to reduce the control delay in the mobile communication system. Furthermore, because in a case in which a mobile terminal maps an uplink scheduling request signal to a UL-SCH, multiplexing is carried out by using a code (a code A) for identification of the mobile terminal, also when scheduling request signals SRs are simultaneously transmitted to the base station from a plurality of mobile terminals, the base station can receive the scheduling request signals from those terminals while discriminating them from one another. Therefore, collision among the scheduling request signals from the plurality of mobile terminals which can happen in the case of using an S-RACH can be prevented.

In addition, this Embodiment 5 can also be applied to a multiplexing method of multiplexing transmission, via an uplink, of an Ack/Nack and a CQI for downlink data and uplink data (a UL-SCH) in a case in which a mobile terminal is receiving downlink data without performing any transmission of uplink data. Because the operation of the mobile communication system is the same as the processing shown in the flow chart of FIG. 16, the explanation of the operation will be omitted.

Like in the case of Embodiment 5, it can be considered that in one mobile terminal, transmission of an Ack/Nack and transmission of a CQI do not coexist in a case in which no uplink data exist in the UL-SCH and the mobile terminal is not performing any transmission of uplink data via the UL-SCH, but is receiving downlink data, and the relation of SC-FDMA is not satisfied and hence no increase is produced in the PAPR in the mobile terminal.

Therefore there is provided an advantage of, in a case in which a mobile terminal is receiving downlink data without performing any transmission of uplink data, eliminating the necessity to dispose an Ack/Nack exclusive channel (FIGS. 23 and 24) for transmission of an Ack/Nack for downlink data via an uplink. Furthermore, the radio resources which are allocated for the Ack/Nack exclusive channel can be released for the UL-SCH or the like. Therefore, there can be provided another advantage of being able to use the uplink radio resources efficiently.

Embodiment 6

In a case in which a mobile terminal is not transmitting any uplink data (Uplink data, UL data) such as user data, but is receiving downlink data (Downlink data, DL data) transmitted from a base station, the mobile terminal has to transmit an Ack/Nack, which is the result of the reception of the downlink data, and a CQI signal to the base station.

Furthermore, when a necessity for transmission of uplink data occurs in a mobile terminal, the mobile terminal has to transmit an uplink scheduling request signal SR to a base station. Hereafter, a method of making a mobile terminal which has to transmit an Ack/Nack and an uplink scheduling request signal SR simultaneously perform these transmissions simultaneously without increasing the PAPR in the mobile terminal will be explained.

The nonpatent reference 1 discloses that in a case in which a mobile terminal is receiving downlink data without performing transmission of uplink data, an Ack/Nack or/and a CQI are transmitted by suing an Ack/Nack exclusive channel having a broad band as shown in FIG. 23.

The nonpatent reference 4 discloses that in the case in which a mobile terminal is receiving downlink data without performing transmission of uplink data, an SR is transmitted by using an S-RACH.

However, the above-mentioned two nonpatent references 1 and 4 suggest nothing about the problems of the present invention. The problems of the present invention will be explained hereafter, though they are already mentioned.

There may be a case in which a mobile terminal has to simultaneously carry out a process of transmitting an uplink Ack/Nack and a CQI by using an Ack/Nack exclusive channel and a process of transmitting an SR by using an S-RACH. In this case, because those signals have no correlation among them, when transmitted simultaneously, they are not transmitted with single carrier transmission, but are transmitted with multi carrier transmission. In the case in which such signals having no correlation among them are transmitted simultaneously, the PAPR becomes high because the time waveforms of the transmission signals have a high peak. A problem is that as the PAPR becomes high, the power consumption of the mobile terminal increases and therefore the cell coverage becomes narrow. A further problem is that as the PAPR becomes high, those signals become an interference wave to other mobile terminals and the communication system.

In a case in which a mobile terminal has to transmit an uplink Ack/Nack, a CQI, and an SR simultaneously, the mobile terminal should use single carrier transmission in order to reduce the increase in the PAPR in the mobile terminal.

There can be considered a case in which, when a mobile terminal uses an Ack/Nack or/and a CQI which are transmitted by using an Ack/Nack exclusive channel having a broad band, which is disclosed by the conventional technology, and an SR which is transmitted by using an S-RACH, just as they are, a necessity for the mobile terminal to transmit those pieces of information simultaneously occurs.

Therefore, this Embodiment 6 presents multiplexing of an Ack/Nack or/and a CQI, and an SR into either one of an Ack/Nack exclusive channel to which one certain time-frequency region is allocated monopolistically, and an S-RACH.

Figure 25:
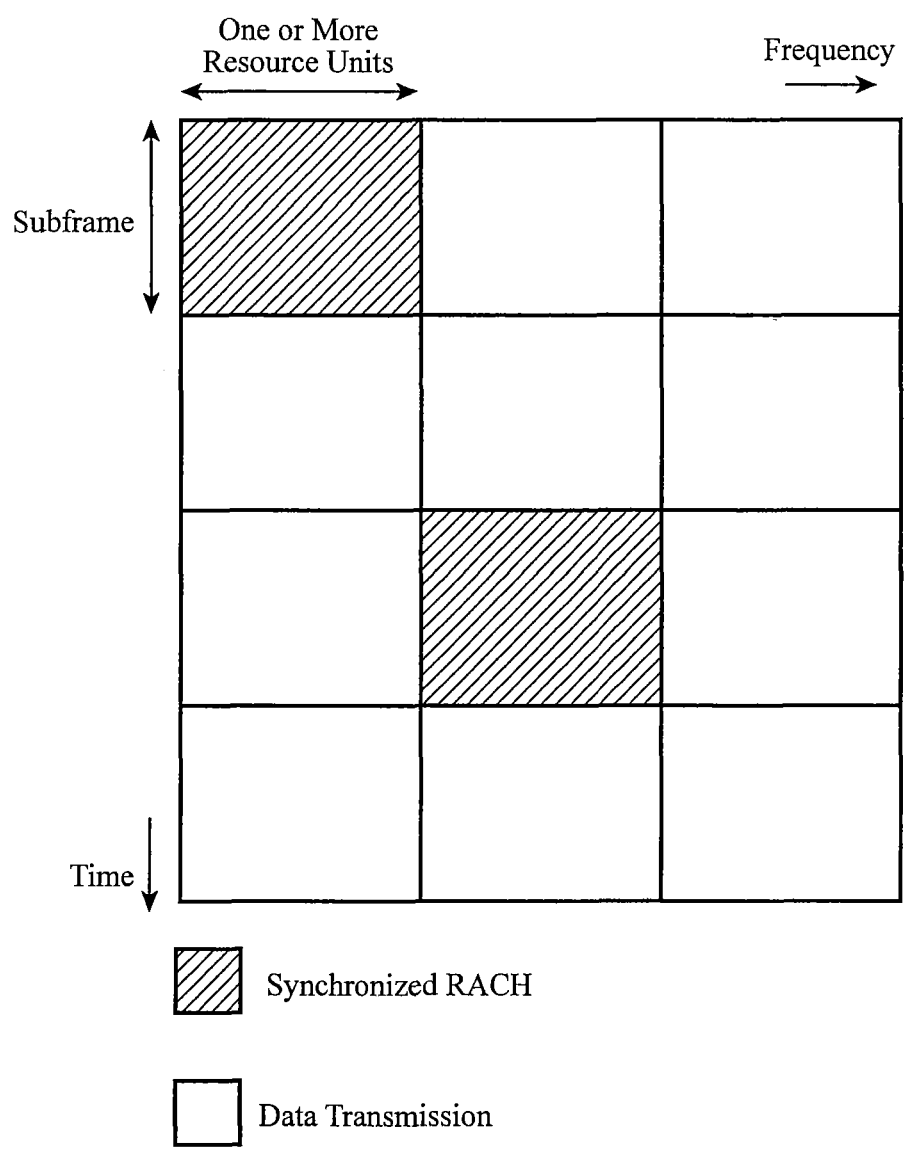
FIG. 25 is an explanatory drawing showing radio resources in which an uplink scheduling request signal is allocated to an S-RACH.
Figure 26:
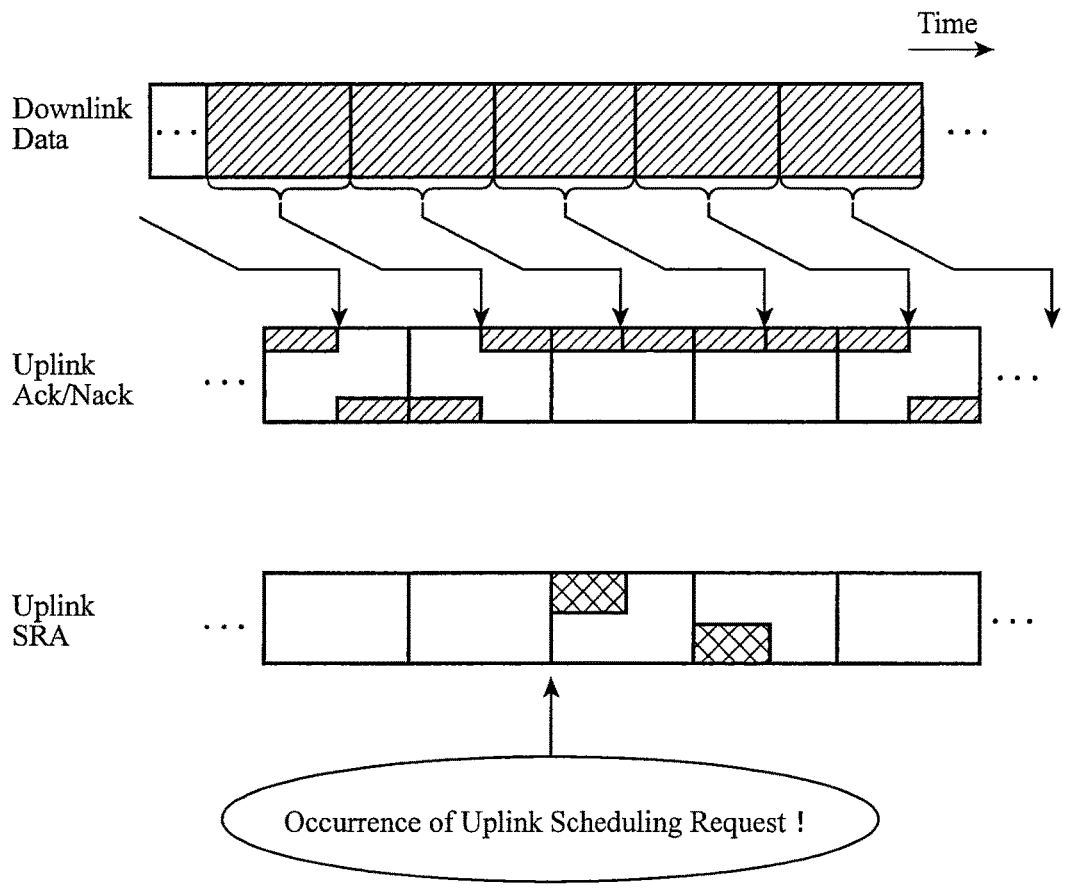
FIG. 26 is an explanatory drawing showing an example in which a mobile terminal transmits an Ack/Nack and an SRA simultaneously in a case in which the mobile terminal is not carrying out any uplink data transmission.

The multiplexing method will be explained hereafter. A method of transmitting an uplink scheduling request signal SR, an Ack/Nack, and a CQI together by using either an Ack/Nack exclusive channel to which one certain time-frequency region as shown in FIG. 23 is allocated monopolistically, or an S-RACH as shown in FIG. 25 will be explained.

Because a region in units of a subframe with respect to time and in units of one or more resource units with respect to frequency is allocated to each of the Ack/Nack exclusive channel and the S-RACH, the present invention can be applied to each of the channels.

In this Embodiment 6, a case in which when a necessity to simultaneously transmit an Ack/Nack or/and a CQI, and an uplink scheduling request signal SR occurs in a mobile terminal, the mobile terminal transmits the Ack/Nack and/or the CQI, with the uplink scheduling request signal SR together by using an S-RACH will be shown. In other words, it means that even a mobile terminal which receives downlink data and therefore has to transmit an Ack/Nack or/and a CQI does not use an Ack/Nack exclusive channel during a time interval during which the mobile terminal is performing transmission of an uplink scheduling request signal SR. Furthermore, during the time interval during which the mobile terminal is transmitting an uplink scheduling request signal SR, the mobile terminal can perform transmission of a CQI or transmission of an Ack/Nack and a CQI by using an S-RACH, and is therefore allowed not to use an Ack/Nack exclusive channel at that time.

Figure 18:
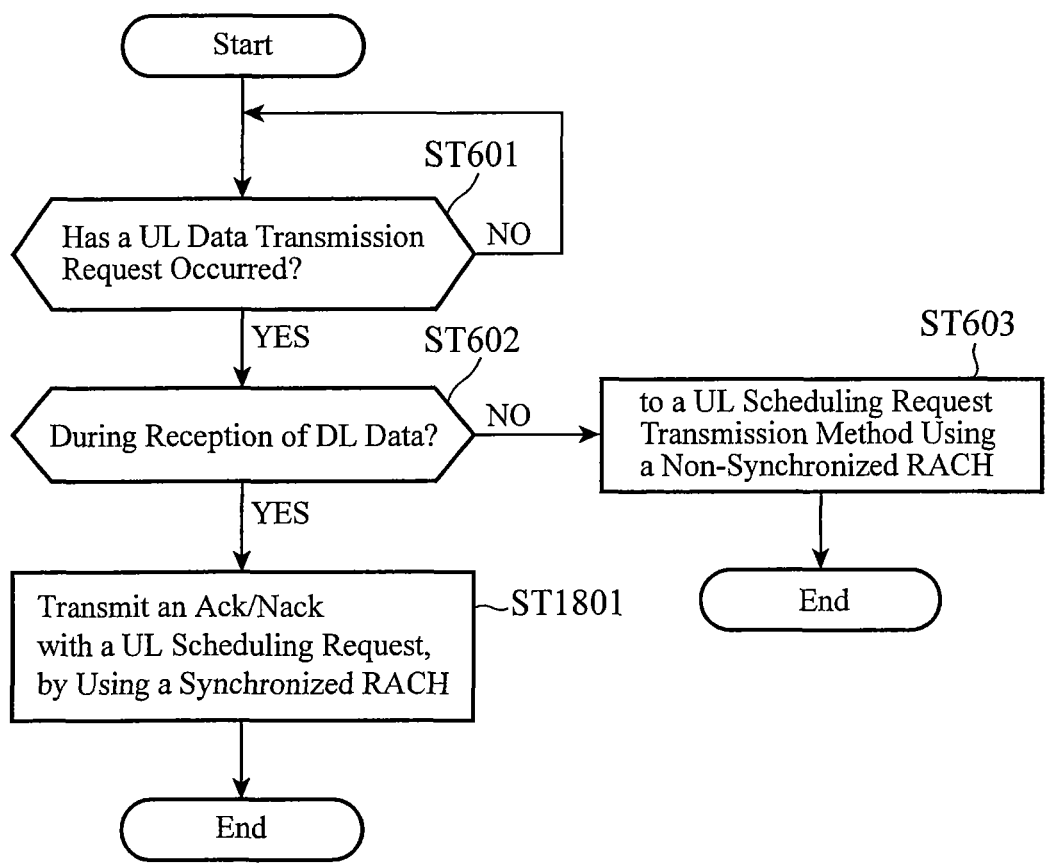
FIG. 18 is a flow chart explaining processing carried out by a mobile terminal, including up to a process of transmitting an uplink scheduling request signal.

FIG. 18 is a flow chart for explaining processing carried out by a mobile terminal, the processing including up to a process of transmitting an uplink scheduling request signal. Hereafter, the operation of the mobile terminal will be explained with reference to FIG. 18. In FIG. 18, because each of the same steps as those shown in FIG. 6 denote the same step or a like step, the explanation of the steps will be omitted hereafter.

Steps ST601 to ST603 are the same as those shown in FIG. 6. When, in ST602, is receiving downlink data, the mobile terminal carries out ST1801. In ST1801, the mobile terminal, maps an Ack/Nack, and/or a CQI with an uplink scheduling request signal SR onto an S-RACH, and transmits them to the base station. Because the processing of the mobile communication system is the same as that shown in FIG. 52, the explanation of the processing will be omitted hereafter.

Next, methods of mapping those pieces of information onto the S-RACH will be explained hereafter.

According to a first mapping method, a preamble and a message, an Ack/Nack, and a CQI are mapped onto the S-RACH. FIG. 19 is an explanatory drawing showing radio resources in which a preamble and a message, an Ack/Nack, and a CQI are mapped onto the S-RACH.

According to a second mapping method, a preamble, an Ack/Nack, and a CQI are mapped onto the S-RACH. Message information required for an uplink scheduling request signal SR is transmitted at the timing of the next S-RACH transmission or by using the uplink resources which are allocated to the mobile terminal by the base station.

Figure 20:
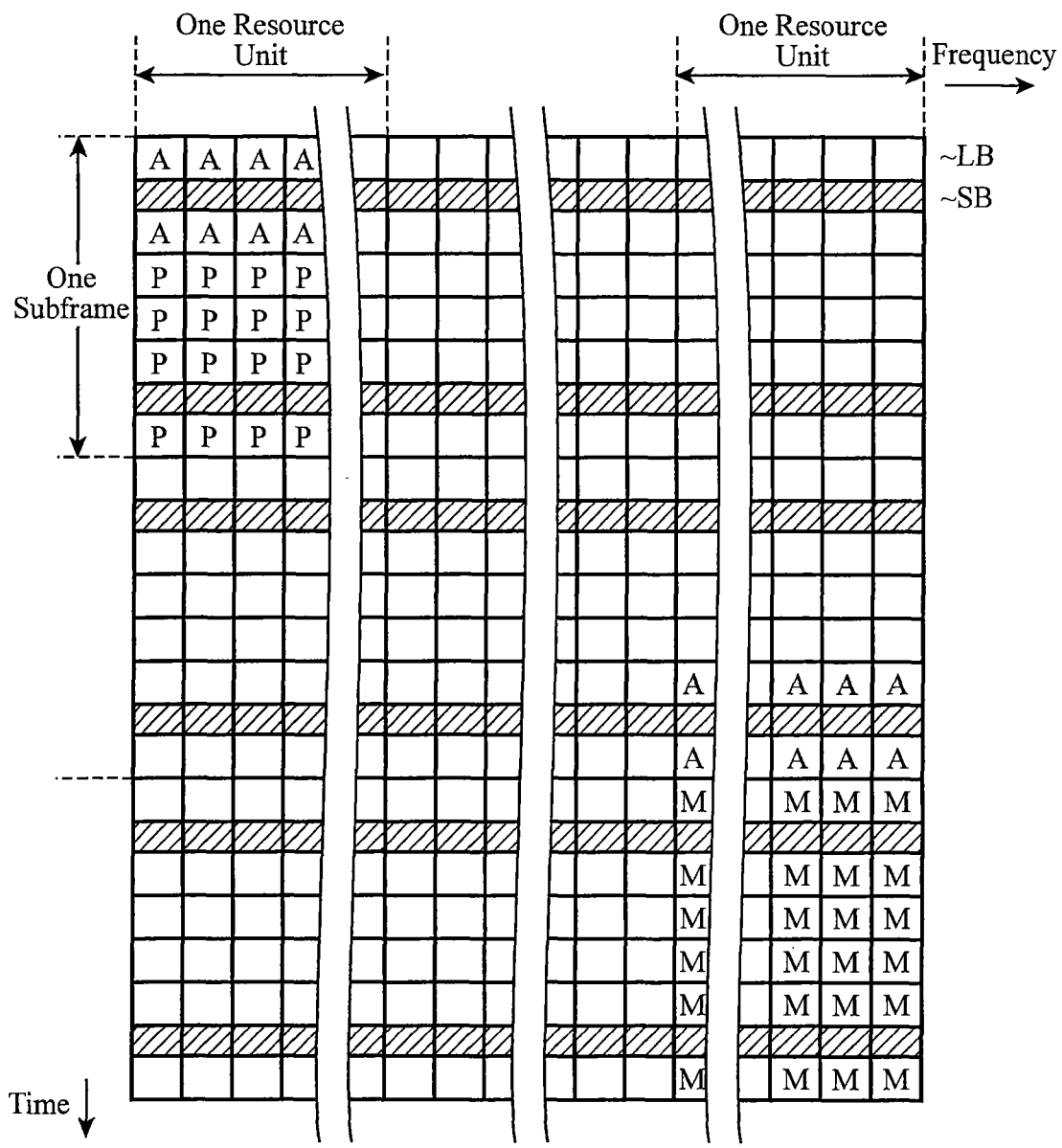
FIG. 20 is an explanatory drawing showing radio resources in which a preamble and a message, an Ack/Nack, a CQI, and an SR are mapped onto an S-RACH.

FIG. 20 is an explanatory drawing showing radio resources in which a preamble and a message, an Ack/Nack, and a CQI are mapped onto the S-RACH.

Figure 21:
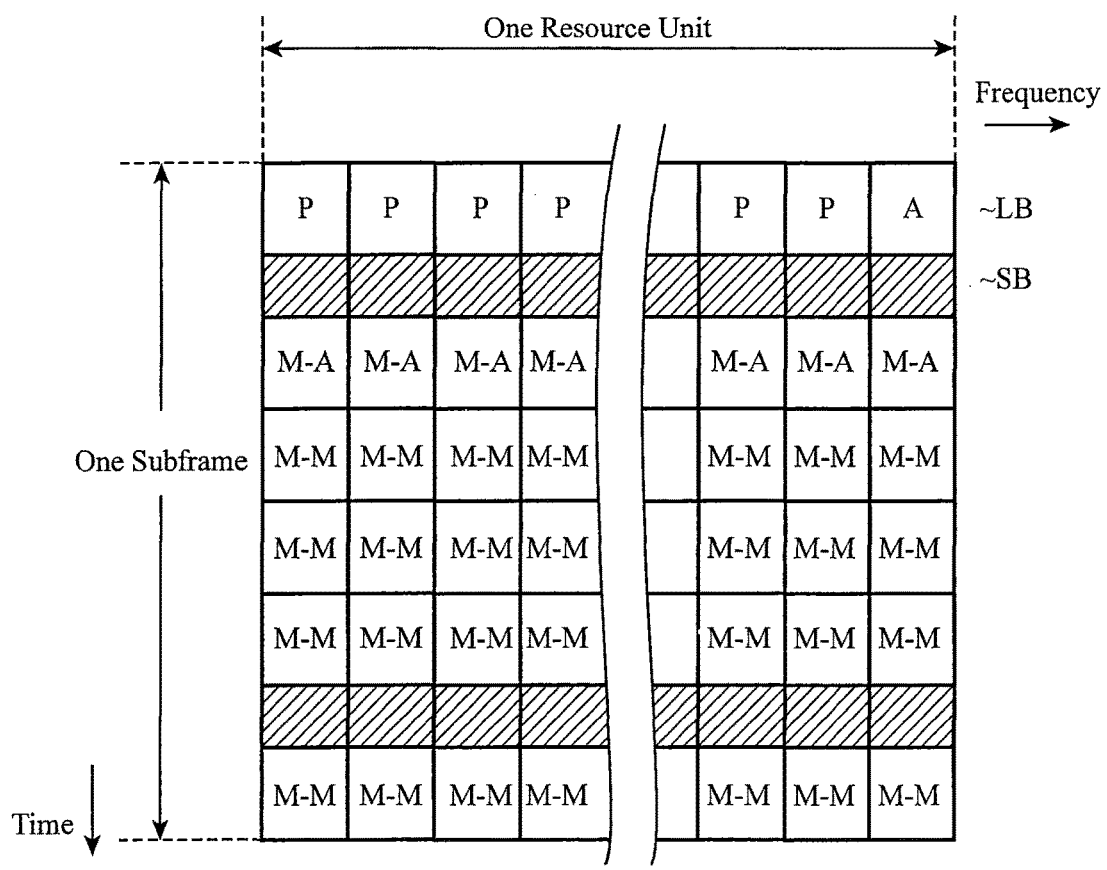
FIG. 21 is an explanatory drawing showing radio resources in which a preamble and a message, an Ack/Nack, a CQI, and an SR are mapped onto an S-RACH.
Figure 22:
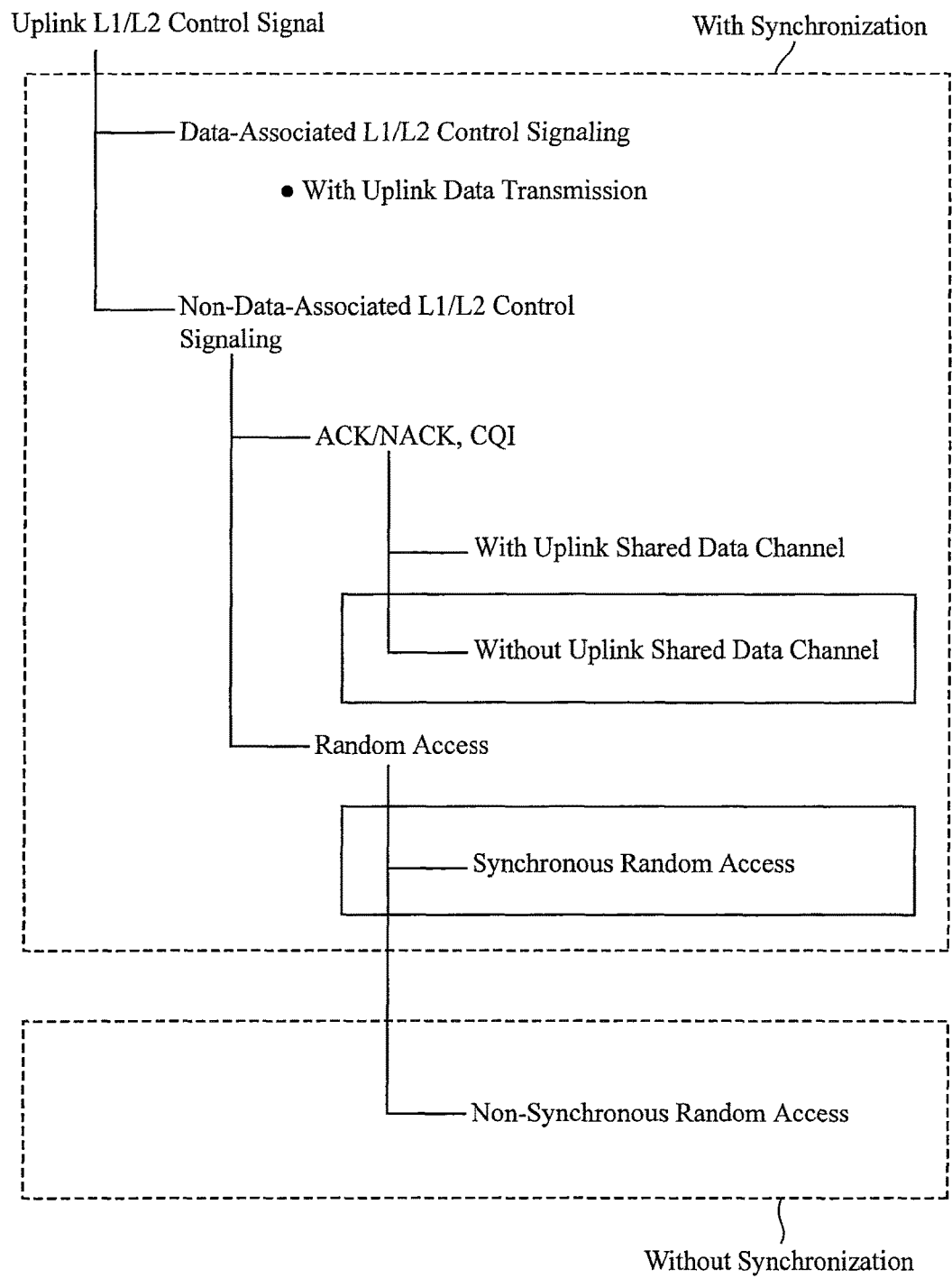
FIG. 22 is an explanatory drawing for explaining an uplink L1/L2 control signal.

According to a third mapping method, a preamble and a message are mapped onto the S-RACH as usual. An Ack/Nack and a CQI are newly added into a message on the S-RACH which is transmitted in a state in which uplink time synchronization is established. FIG. 21 is an explanatory drawing showing radio resources in which a preamble and a message, an Ack/Nack, and a CQI are mapped onto the S-RACH.

As previously explained, by mapping both an uplink scheduling request signal SR and Ack/Nack information symbols (an Ack/Nack and/or a CQI) not to an Ack/Nack exclusive channel, but to an S-RACH with the uplink scheduling request signal SR and the Ack/Nack information symbols being separated with respect to time, they are not transmitted simultaneously because they are transmitted with them being separated with respect to time. As a result, even when a plurality of "data-non-associated L1/L2 control signals" which have to be transmitted occur simultaneously in one mobile terminal, while the communication quality of these important control signals is attained, increase in the radio resources load on the communication system can be prevented, and transmission with a single carrier method which guarantees a low PAPR and high communication quality can be implemented.

Furthermore, compared with the case in which an Ack/Nack and a CQI are transmitted with a plurality of time-frequency regions having narrow bands which are separate from one another, in the case of using the method according to this embodiment of transmitting an Ack/Nack and a CQI by using either an Ack/Nack exclusive channel to which one certain time-frequency region as shown in FIG. 23 is allocated monopolistically, or an S-RACH as shown in FIG. 25, the bandwidth becomes large. Therefore, the amount of information which can be transmitted with the radio resources allocated monopolistically increases.

As a result, there can be provided an advantage of being able to change the repetition pattern of an Ack/Nack and a CQI (e.g., the number of repetitions) according to the environment of the communication path. By changing the repetition pattern under an instruction from the base station according to the environment of the communication path, the quality of reception of an Ack/Nack and a CQI can be maintained constant regardless of the environment of the communication path.

Embodiment 7

Ina case in which a mobile terminal is synchronized with a base station, and is carrying out neither transmission of uplink data (Uplink data, UL data) nor reception of downlink data (Downlink data, DL data), there exists no Ack/Nack exclusive channel because the mobile terminal does not have to transmit an Ack/Nack to downlink data via an uplink. A method of, when an uplink transmission request occurs in such a case, transmitting an uplink scheduling request signal SR by using a signal for uplink communication quality measurement, which is called "sounding reference signal" (sounding reference signal, Sounding Reference Signal (RS)) without using radio resources for an S-RACH will be disclosed.

The use of this method makes it possible to not only release the radio resources reserved for an S-RACH, but also make effective use of the resources because a radio resource region which is shared with other mobile terminals is used for transmission of a Sounding RS. Furthermore, one sounding reference signal (Sounding RS) can be made to have the two following functions: measurement of the communication quality of a channel via which transmission is started; and the functions of an uplink schedule request signal SR.

A Sounding RS is transmitted from a mobile terminal UE to a base station eNB in order to enable the base station to measure the communication quality of the uplink. In the 3GPP, the specifications of two types of reference signals: a reference signal for demodulation (a Demoduration RS); and a reference signal for uplink channel quality measurement (a Sounding RS) are currently under debate as uplink reference signals (Reference signals).

A plurality of suggestions are currently written together in the nonpatent reference 3, and the specifications have not been determined yet.

In this Embodiment 7, a case in which a sounding reference signal (a Sounding RS) is transmitted only during transmission of uplink data will be considered.

A part of allocation of radio resources for a Sounding RS during transmission of uplink data in this Embodiment 7 is shown in FIGS. 35(a) and 35(b).

First, FIG. 35(a) shows an example in which a sounding RS is allocated to two short blocks (SB) within 2 TTIs with the total bandwidth of one time-frequency region. A radio resource allocation method in a case in which two mobile terminals (UE1 and UE2) use a part of one time-frequency region is shown in FIG. 35(a).

In the figure, reference numeral 501 denotes a data symbol of the mobile terminal UE1, reference numeral 502 denotes a Sounding RS which the mobile terminals UE1 and UE2, and which all mobile terminals using this time-frequency region use in common, reference numeral 503 denotes a reference signal for demodulation (Demoduration) of the mobile terminal UE1, reference numeral 504 denotes a data symbol of the mobile terminal UE2, and reference numeral 505 denotes a reference signal for demodulation (Demoduration) of the mobile terminal UE2. Among these, two SBs with the total bandwidth of one time-frequency region is allocated within two 2 TTIs as the region of the Sounding RS 502.

Similarly, an example in which a Sounding RS is allocated to two long blocks (LB) within 2 TTIs with the total bandwidth of one time-frequency region is shown in FIG. 35(b). A radio resource allocation method in a case in which three mobile terminals (UE1, UE2, and UE3) use a part of one time-frequency region is shown in FIG. 35(b). In the figure, reference numeral 506 denotes a data symbol of the mobile terminal UE1, reference numeral 507 denotes a reference signal for demodulation of the mobile terminal UE1, reference numeral 508 denotes a data symbol of the UE2, reference numeral 509 denotes a reference signal for demodulation of the mobile terminal UE2, reference numeral 511 denotes a data symbol of the mobile terminal UE3, reference numeral 512 denotes a reference signal for demodulation of the mobile terminal UE3, and reference numeral 510 denotes a Sounding RS which the mobile terminals UE1, UE2, and UE3, and all other mobile terminals using this time-frequency region use in common.

As mentioned above, two LBs with the total bandwidth of one time-frequency region is made available for the radio resources for a Sounding RS.

In either of the cases of FIGS. 35(a) and 35(b), a Sounding RS is code-multiplexed for each UE. Because radio resources having a wide band can be shared and used for a Sounding RS by a plurality of terminals, the base station can measure the status of the frequency selective fading and can therefore carry out appropriate uplink scheduling. Furthermore, because a signal of each of the plurality of mobile terminals is code-multiplexed, the base station can carry out high-accuracy quality measurement for each of the plurality of mobile terminals.

As a case in which a mobile station is synchronized with a base station and a transmission request occurs in a state in which no transmission of uplink data is carried out, there can be considered a case in which the mobile terminal receives downlink data, and, in order for the mobile terminal to transmit an Ack/Nack and a CQI to the downlink received data via the uplink, an ACK/Nack exclusive channel is allocated to the mobile terminal, and a case in which the mobile terminal receives downlink data, but no ACK/Nack exclusive channel is allocated to the mobile terminal, as described in Embodiment 3. In a flow chart of FIG. 37, a method of transmitting an uplink scheduling request signal SR in each of the cases is shown.

First, when recognizing occurrence of an uplink data transmission request (ST5201), the mobile terminal checks to see whether or not an Ack/Nack exclusive channel via which the mobile terminal transmits an Ack/Nack to downlink received data is allocated in the uplink (ST5202). When an Ack/Nack exclusive channel is allocated in the uplink, the mobile terminal transmits an uplink scheduling request signal SR, as well as an Ack/Nack and a CQI, by using the Ack/Nack exclusive channel (ST5204). Processing in this case is the same as that explained in Embodiment 3. In contrast, when, in ST5202, no Ack/Nack exclusive channel is allocated in the uplink, the mobile terminal transmits a Sounding RS for uplink quality measurement (a Sounding Reference signal) which serves as an uplink scheduling request signal SR to the base station (ST5203).

There can be considered a case in which in the mobile communication system, even when a mobile terminal is not receiving any downlink data, an Ack/Nack exclusive channel is allocated to the mobile terminal. More specifically, there can be considered a case in which, in order to prepare for future downlink scheduling even when there exist no downlink data, or maintain synchronization between a base station and a mobile terminal, the mobile terminal notifies the result (CQI) of measurement of the quality of the downlink communication path. In such a case, it can be considered that the judgment of ST5202 is suitable as mentioned above.

In contrast, there can be considered a case in which in the mobile communication system, only when there exist downlink data destined for a mobile terminal, an Ack/Nack exclusive channel is allocated to the mobile terminal. In such a case, in the judgment of ST5202, the mobile terminal can judge whether or not the mobile terminal is receiving downlink data.

Figure 36:
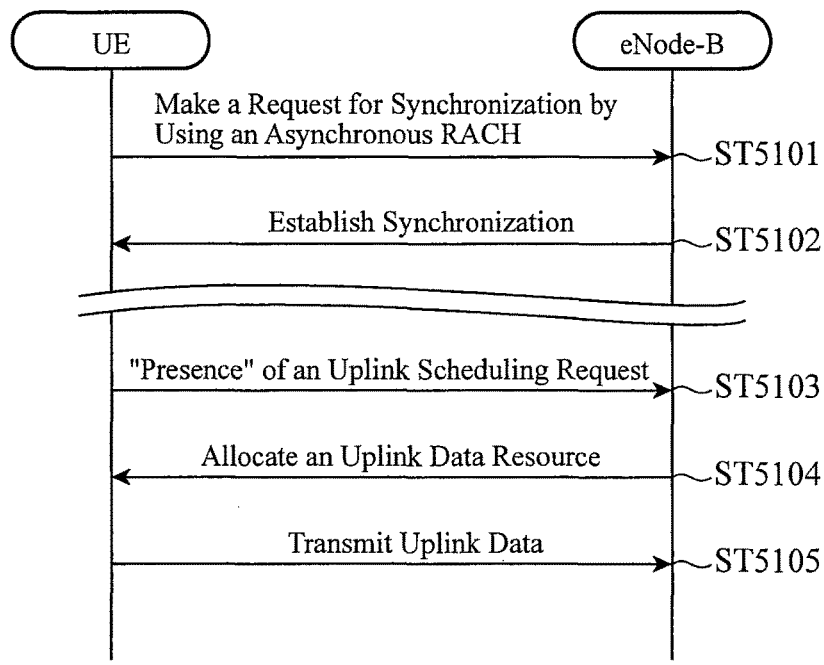
FIG. 36 is a concrete sequence diagram in a case in which an uplink transmission request occurs in a state where no data communications are carried out via both an uplink and a downlink.
Figure 37:
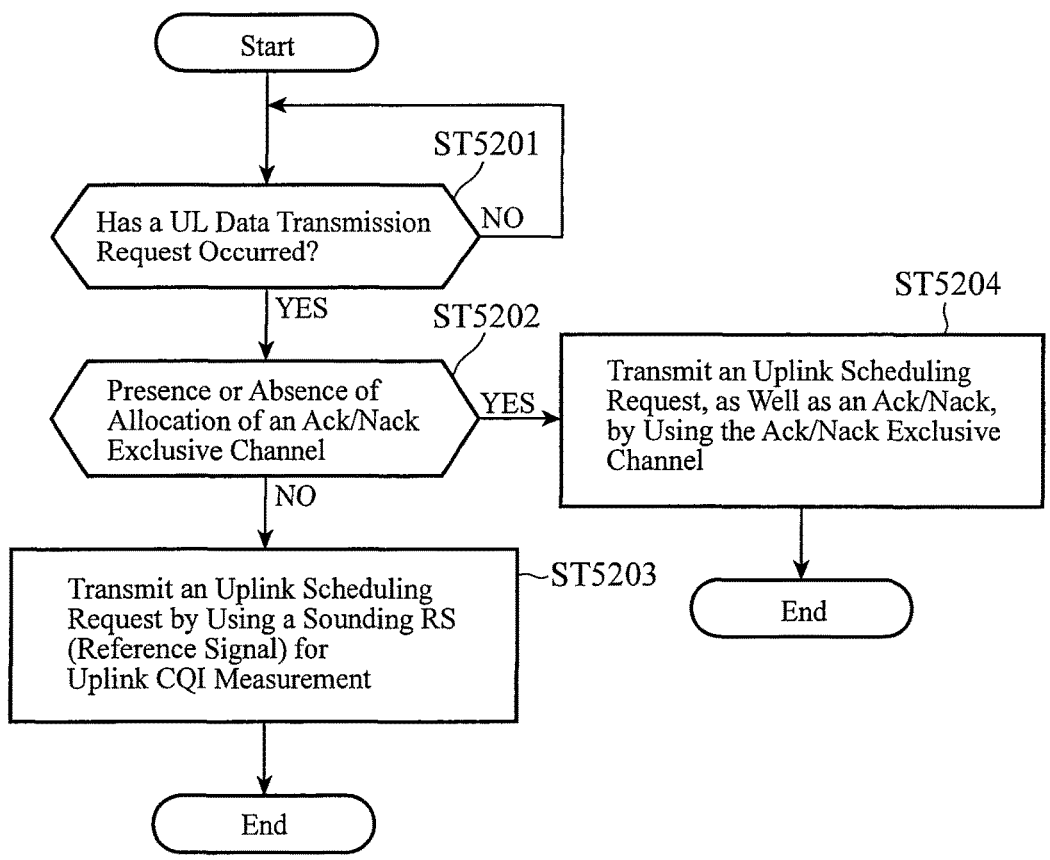
FIG. 37 is a flow chart showing a flow in a case in which a transmission request occurs in a state in which a mobile station is synchronized with a base station and is not carrying out transmission of uplink data.

A concrete example of a sequence when an uplink transmission request occurs under a condition resulting in a "No" in a branch of ST5202 of FIG. 37, i.e., in a state in which there is no allocation of an ACK/Nack exclusive channel will be explained in FIG. 36.

This embodiment is based on that synchronization is established between a mobile terminal and a base station. Therefore, synchronization has to be established between the mobile terminal and the base station by using a certain method before this embodiment is applied. As an example of the method, FIG. 36 shows a case in which a non-synchronous random access signal (Non-Synchronous Random Access) is transmitted from the mobile terminal to the base station.

The base station eNodeB, in ST5101, receives a synchronous request from the mobile terminal UE, specifies the mobile terminal which has made the request, and also establishes synchronization with this mobile terminal and then recognizes that the mobile terminal has changed to an Active state. Furthermore, the base station, in next ST5102, notifies the mobile terminal that synchronization with this mobile terminal is established, and also notifies the mobile station of L1/L2 control information which is required for settings of uplink and downlink communication paths and whose setting value is nearly fixed (semi-static) for the reason of being set to other UEs in common with the mobile terminal.

When transmitting an uplink scheduling request signal SR by using a sounding RS for measurement of the communication quality of the uplink, the base station notifies Sounding-RS-related control information as well as the notification of the synchronization establishment because the base station has to transmit a "Sounding RS which serves as an uplink scheduling request" if there is no transmission of uplink data. Because the Sounding RS for measurement of the communication quality of the uplink also uses the radio resources which the mobile terminal shares with the other UEs, the base station eNodeB, in ST5102, notifies the mobile terminal UE of mobile terminal identifying information (a sequence number or a UE-ID) which is allocated to this mobile terminal and is used for the code division multiplexing, the mobile terminal identifying information being included in the L1/L2 control information for controlling the Sounding RS, the frequency bandwidth (BW) of a radio resource which is scheduled to be allocated to the transmission of the Sounding RS, and so on, thereby enabling the transmission of the Sounding RS also when any uplink data are not transmitted.

In a case in which the Sounding RS is not used for notification of an uplink scheduling request signal SR, but is transmitted only during transmission of uplink data, what is necessary is just not to carry out the transmission along with the notification of the synchronization establishment, but to notify the Sounding RS-related control information (the sequence number, the BW, etc.) at, for example, the time (ST5104) of resource allocation for uplink data, unlike in the above case. Furthermore, the above-mentioned transmission along with the notification of the synchronization establishment means that they do not have to be carried out at the same time.

When an uplink transmission data request occurs in the mobile terminal, the mobile terminal UE transmits a Sounding RS according to the sequence number of the UE for the uplink Sounding RS, which the mobile terminal, in ST5102, received from the base station, and/or the control information, such as the frequency band which is scheduled to be allocated to the Sounding RS transmission, so as to notify the base station that the specific mobile terminal UE has an uplink scheduling request (ST5103). Such a Sounding RS is called a "Sounding RS which serves as an uplink scheduling request."

A Sounding RS of each mobile terminal is multiplexed with a CAZAC sequence code which has occurred with the sequence number for the mobile terminal UE which the mobile terminal, in ST5102, received, and is transmitted with the frequency band and at the timing which are notified from the base station.

By receiving the Sounding RS in the time-frequency region of the radio resources, which this mobile terminal uses, to correlate the reception, the base station can detect the reception of the Sounding RS of the mobile terminal. When detecting a Sounding RS from a mobile terminal which has not transmitted any uplink data through the reception detection, the base station can judge this Sounding RS to be an uplink scheduling request signal SR (ST5103). This is because this Embodiment 7 is based on that only during transmission of uplink data, a Sounding RS is transmitted.

In the above-mentioned example, the use of a CAZAC sequence code for the method of identifying a mobile terminal in a Sounding RS is shown. As an alternative, another method can be used.

When judging that the sounding RS which the base station has received from the mobile terminal is a scheduling request signal SR, the base station notifies the control information, such as radio resource allocation required for transmission of uplink data, by using an "Uplink Data Resource Allocation" message (ST5104). The mobile terminal then starts transmission of uplink data by using the radio resources received from the base station (ST5105).

Figure 39:
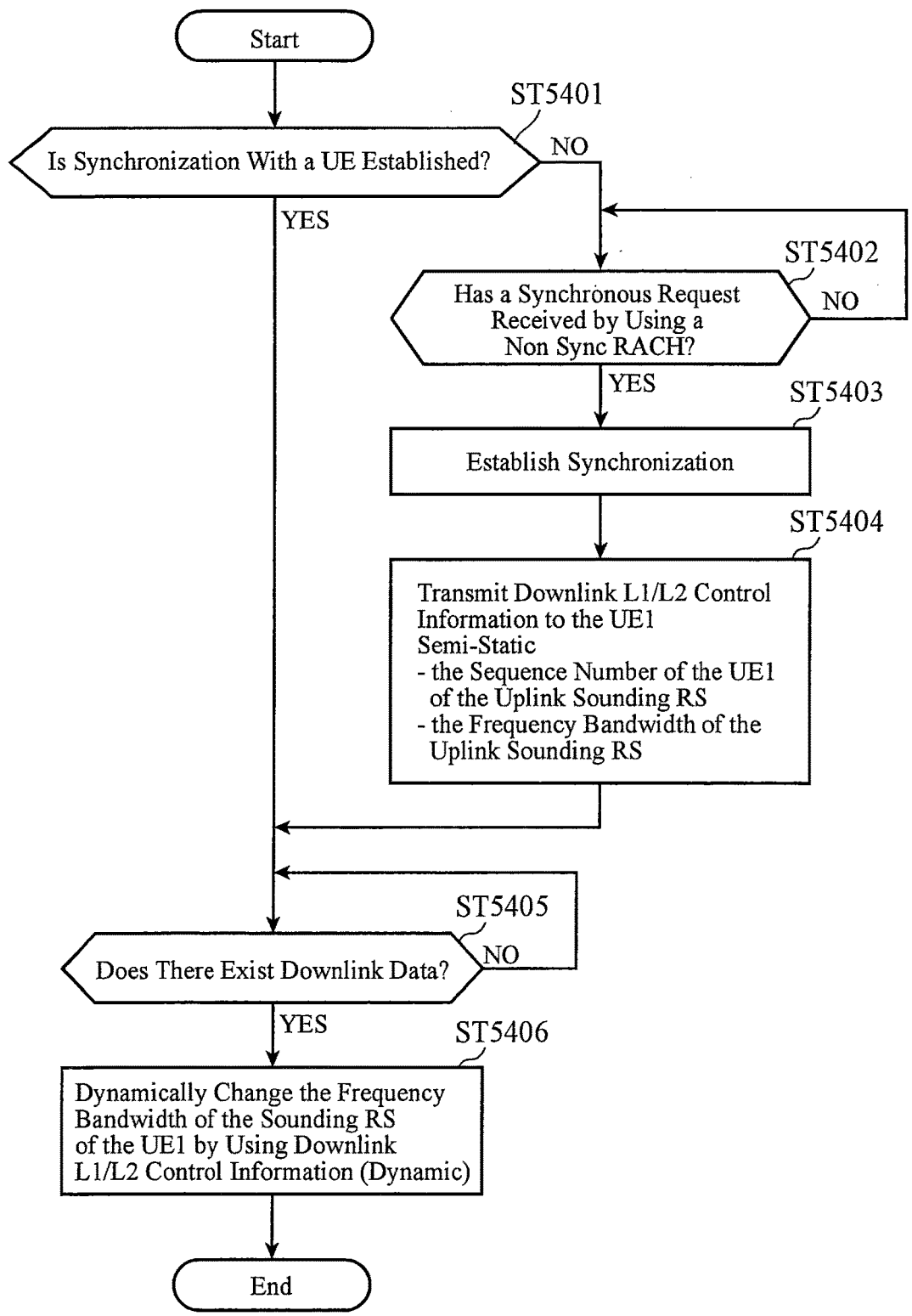
FIG. 39 is a flow chart showing a setting of the BW of a Sounding RS by a base station eNodeB.

A flow chart in the base station at the time when the base station eNodeB, in ST5102, notifies the BW is shown in FIG. 39.

First, a flow of instructions at the time when the base station eNodeB notifies the BW will be explained with reference to FIG. 39.

The base station, in ST5401, checks whether or not synchronization is established with the mobile terminal UE, and, when synchronization is not established, waits until the base station receives a synchronous request via a Non-Sync RACH (ST5402). When receiving a synchronous request, the base station establishes synchronization with the mobile terminal, as shown in the explanation of ST5102 of FIG. 36 (ST5403), and then transmits L1/L2 control information for Sounding RS to the mobile terminal UE in semi-static mode (ST5404). The identification information (the sequence number or the UE-ID) of the UE for uplink Sounding RS, and the BW of uplink Sounding RS are included in this L1/L2 control information.

When judging that synchronization is established as a result of, in ST5401, checking synchronization with the UE, the base station, in ST5405, checks to see whether or not the mobile terminal is receiving downlink data. While receiving downlink data, the base station notifies L1/L2 control information for Sounding RS to the mobile terminal UE in dynamic mode, and changes the frequency bandwidth (BW) dynamically (ST5406).

In the flow chart of FIG. 39, the base station notifies the BW of uplink Sounding RS by using both the L1/L2 control information in semi-static mode and the one in dynamic mode. In practice, the base station can notify the BW of an uplink Sounding RS by using either one of the two types of L1/L2 control information: the semi-static L1/L2 control information and the dynamic L1/L2 control information.

As a method of retransmitting an uplink Sounding RS which serves as an uplink scheduling request signal SR in a mobile terminal, in accordance with this Embodiment 7, there are provided the following two methods: a method of setting up a timer which times a predetermined time interval in the mobile terminal, and, when an "Uplink Data Resource Allocation" message cannot be received in ST5104 from the base station by the time the timer times out, retransmitting an uplink Sounding RS, and a method of continuing transmitting an uplink Sounding RS continuously until, in ST5104, receiving an "Uplink Data Resource Allocation" message. Because these methods are already explained in detail with reference to the explanatory FIGS. 28 to 30 of Embodiment 3, and FIGS. 31 to 33, the explanation of the methods will be omitted hereafter.

When, in ST5103, transmitting a Sounding RS which serves as an uplink scheduling request signal SR, the mobile terminal naturally uses an SB or LB which the mobile terminal ought to use for Sounding RS for (usually) measurement of the communication quality of the uplink, and has to make the frequency band and bandwidth (BW: BandWidth) of the SB or LB be equal to those of a general Sounding RS. This is because since for a Sounding RS, a plurality of mobile terminals to which an identical time-frequency region is allocated in such a way as to use the identical time-frequency region carries out code division multiplexing of the same SB (or LB) region to use this, if one mobile terminal changes the ends of the frequency band which the mobile terminal uses for Sounding RS in common with other mobile terminals or uses another block (LB or SB), data and reference signals of other mobile terminals are crushed. Therefore, in a case in which, for example, a Sounding RS for measurement (usually) of the communication quality of the uplink has a bandwidth equal to the entire bandwidth of the base station, a Sounding RS which serves as an uplink scheduling request SR also has the same bandwidth, and, when the base station sets up a plurality of BWs (frequency bands) for a Sounding RS for measurement (usually) of the communication quality of the uplink, the mobile terminal uses the same BW as that of another mobile terminal to which the same time-frequency region as that of the mobile terminal itself is allocated as a radio resource.

There can be a case in which the base station eNodeB judges and selects the BW for a Sounding RS which serves as an uplink scheduling request SR, the BW being used for the mobile terminal, and a case in which the mobile terminal UE can judge and select the BW by itself.

Figure 40:
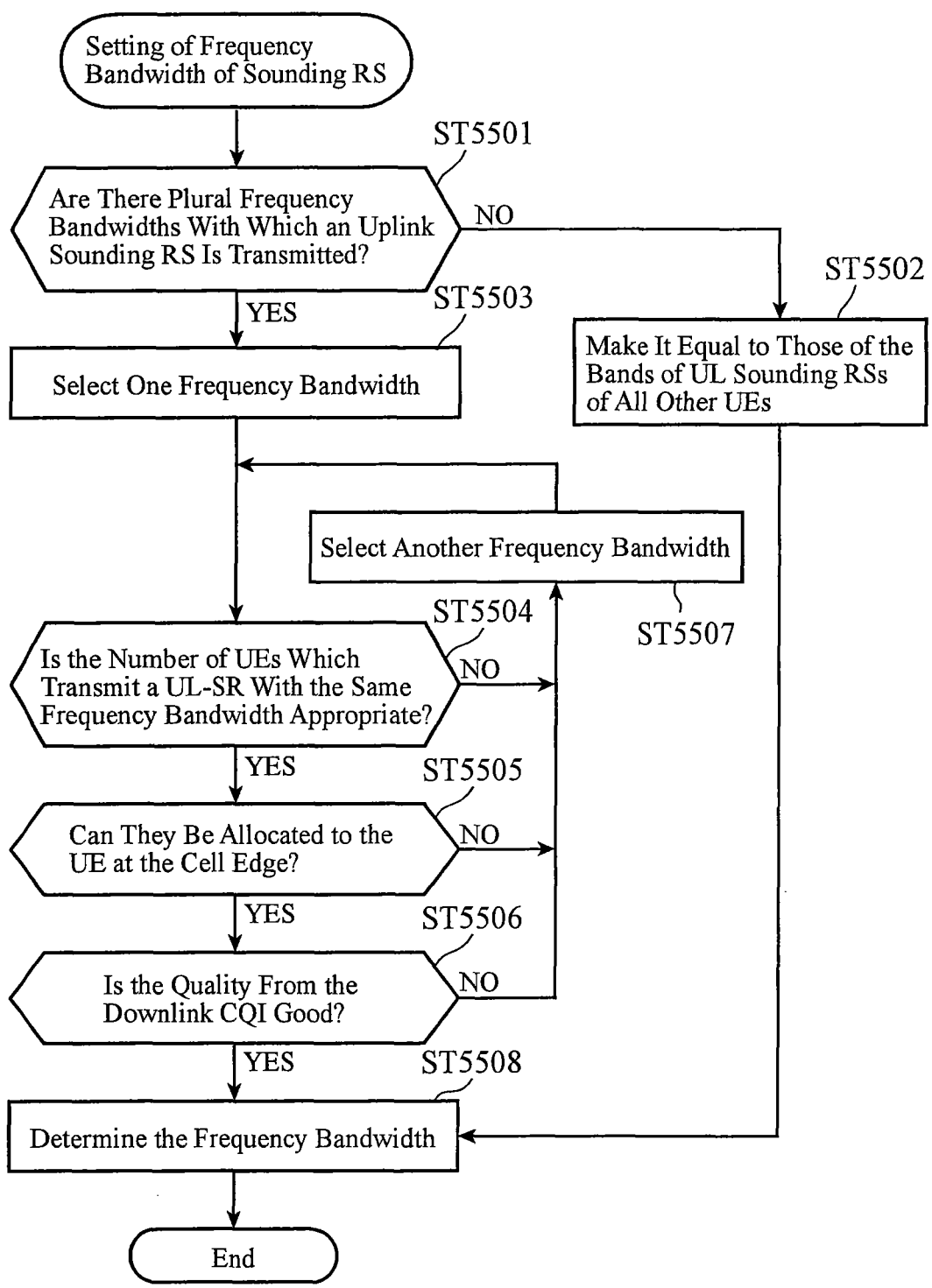
FIG. 40 is a flow chart showing a judging method in a case in which the base station eNodeB selects the BW.
Figure 41:
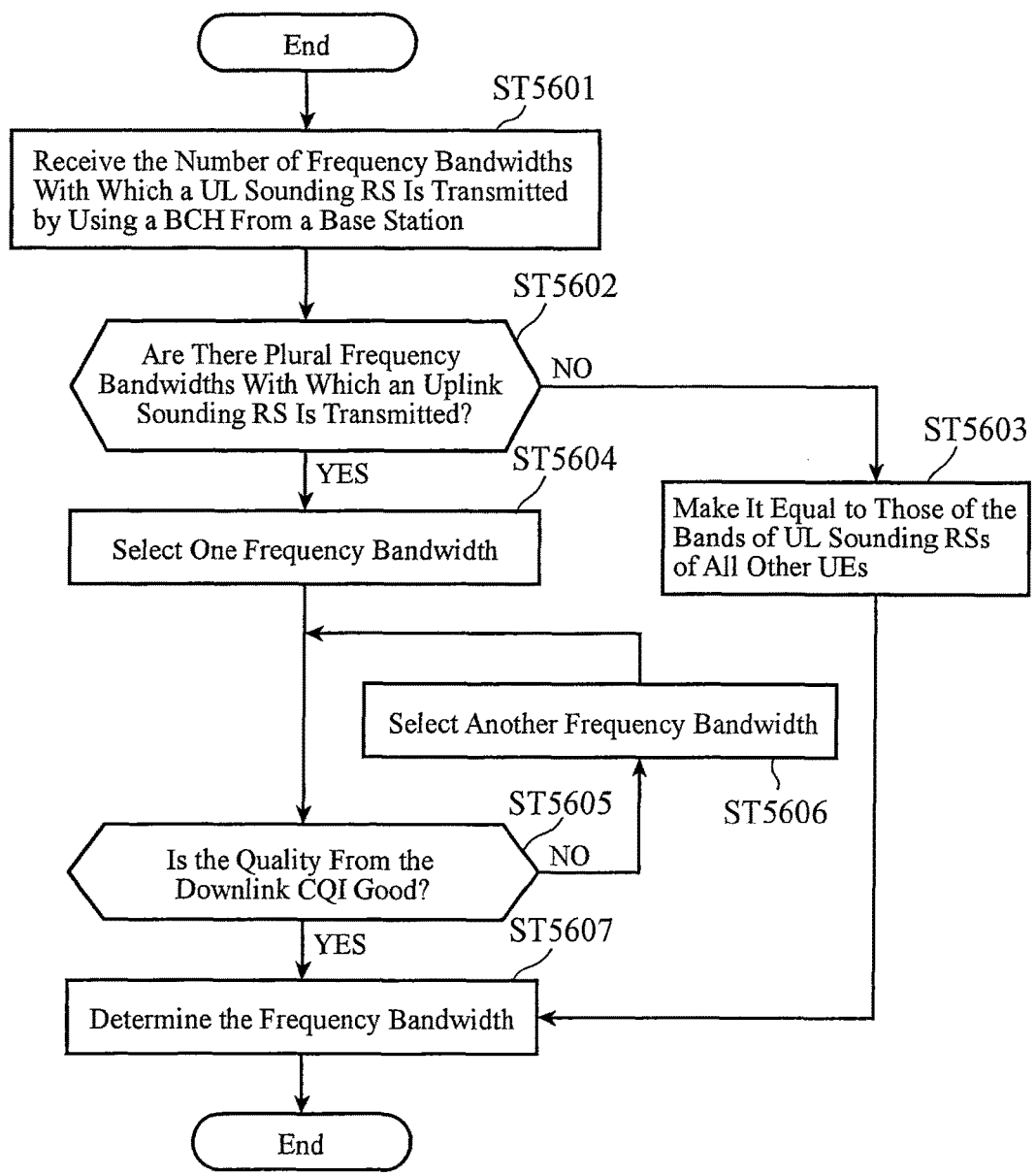
FIG. 41 is a flow chart showing a judging method in a case in which a mobile terminal selects the BW.

A flow chart showing a judging method in the case in which the base station eNodeB selects the BW is shown in FIG. 40, and a flow of a judging method in the case in which the mobile terminal selects the BW is shown in FIG. 41.

Next, a process flow in the case in which the base station eNodeB selects the BW of an uplink Sounding RS will be explained. This selection flow shows a method of determining the BW included in either the semi-static (semi-static) L1/L2 control information which is, in ST5404 of the flow chart shown in FIG. 39, notified to the UE, or the dynamic (dynamic) L1/L2 control information which is, in ST5406, notified to the UE.

FIG. 40 shows a process flow in the case in which the base station eNodeB selects the frequency bandwidth (Band Width: BW) of an uplink Sounding RS.

First, the base station, in ST5501 of the figure, checks to see whether there exist two or more BWs with which an uplink Sounding RS is transmitted, and, if there exists only one BW, the base station sets the BW to be equal to the BWs of uplink Sounding RSs of all other mobile terminals UE (ST5502). In contrast, when there exist two or more BWs with which an uplink Sounding RS is transmitted, the base station checks whether or not the number of UEs each of which transmits a Sounding RS which serves as an uplink scheduling request signal SR with the same BW is appropriate (ST5504), checks whether or not one of the two or more BWs includes frequencies which can be allocated to the UE at the cell edge (ST5505), checks whether one of the two or more BWs shows a good result of reporting the downlink CQI (the channel quality or the downlink communication path quality) (ST5506), and then searches through the two or more BWs for one BW which satisfies these conditions (ST5507). The base station then determines one BW which satisfies the conditions of ST5504 to ST5506 as the BW for uplink Sounding RS (ST5508).

A process flow in the case in which the UE carries out the above-mentioned selection of one BW is shown in FIG. 41. The result of the selection of one BW for uplink Sounding RS which is carried out by the UE is reflected, referring to the flow chart of FIG. 39, in the BW notified by using the dynamic L1/L2 down control information when the mobile terminal is, in ST5405, receiving downlink data. First, the mobile terminal receives the number of BWs for uplink Sounding RS from the base station via a channel such as a BCH (ST5601). The mobile terminal checks to see whether there exist two or more BWs for uplink Sounding RS (ST5602), and, when there exist only one BW, selects the same BW as the BWs for uplink Sounding RSs of all other UEs (ST5603). In contrast, when there exist two or more BWs, the mobile terminal selects one BW from among them in order, and searches for one BW which satisfies the conditions "the quality of the downlink CQI is good" of ST5605 to determine one BW (ST5607). The mobile terminal then notifies the result of the determination to the base station.

By using one of methods, such as the above-mentioned, the number of UEs which transmit with the same BW can be controlled, and the increase in the total receive power of the base station can be prevented. Furthermore, a frequency which a UE at the cell edge can allocate as an uplink frequency can be set up beforehand, and the uplink communication path quality at a frequency band to actually know can be acquired. Furthermore, by expecting and selecting a good BW of the uplink from the downlink CQI, the uplink communication path quality can be acquired with radio resources which are most stabilized for the mobile terminal UE.

The above-mentioned determining method of determining one BW for a Sounding RS which serves as an uplink scheduling request SR which the mobile terminal uses (the method of determining one BW for Sounding RS in the case of notifying an uplink scheduling request SR by using a Sounding RS) can also be applied to Embodiment 8, Embodiment 9, and Embodiment 10.

A concrete method of allocating radio resources for use in a base station and a mobile terminal, in ST5103 of the sequence of FIG. 36, will be explained.

FIG. 38 is a figure showing a method of allocating radio resources in a case in which the base station sets up a plurality of BWs for a Sounding RS for measurement (usually) of the communication quality of the uplink, and the circumstances of allocation of radio resources to the mobile terminal UE1 after a transmission request occurs. In FIG. 38, the radio resources which the base station manages are divided into three time-frequency regions whose bandwidths are expressed as BW#1, BW#2, and BW#3, respectively. A UE group A including a mobile terminal UE1 is allocated to the time-frequency region of BW#1, a UE group B is similarly allocated to the time-frequency region of BW#2, and a UE group C is similarly allocated to the time-frequency region of BW#3. In the figure, reference numeral 531 denotes a data region of the UE group A, reference numeral 532 denotes a sounding (Sounding RS) region of the UE group A, reference numeral 533 denotes an RS region for demodulation (Demoduration) of the UE group A, reference numeral 534 denotes a data region of the UE group B, reference numeral 535 denotes a sounding (Sounding) RS region of the UE group B, and reference numeral 536 denotes an RS region for demodulation (Demoduration) of the UE group B. In this figure, the Sounding RS region is placed in two SBs within 2 TTIs, like in the example of FIG. 35(*a*), and its bandwidth is the same as the bandwidths (BW#1, BW#2, and BW#3) of the plurality of time-frequency regions respectively set for the plurality of UE groups. Each of the data region and the RS region for Demoduration in each UE group region is divided into a plurality of parts for the respective UEs in each UE group.

A case in which, for example, the UE 1 included in the UE group A desires to transmit an uplink scheduling request signal SR in a subframe (1) of TTI #1 under the radio resources allocation conditions of FIG. 38 is shown in FIG. 38(*b*). Reference numeral 537 denotes a sounding (Sounding) RS region which serves as a scheduling request signal SR of the UE1, reference numeral 538 denotes a transmission data region after the UE1 starts data transmission, reference numeral 539 denotes an RS region for demodulation (Demoduration) of the UE1, and reference numeral 540 denotes a sounding (Sounding) RS region for measurement (usually) of the uplink communication quality of the UE1. The UE1 transmits a Sounding RS which serves as a scheduling request SR with an SB1 (537) which is allocated as a Sounding RS of the UE group A. The BW of the SB 537 which is used for a Sounding RS which serves as a scheduling request signal SR of the UE1 is the same as the BW#1 of Sounding RS of the UE group A. Because the UE1 is not performing any transmission of uplink data in the subframe (1), the region which the UE1 uses at that time is only the SB1. That is, there is no transmission from the UE1 with LBs (LB1, LB2, LB3, LB4, and LB5) and SBs (SB2) other than the SB1 of the subframe (1). After that, the base station carries out an uplink scheduling process.

In this case, while 3 TTIs elapse, allocation of radio resources for transmission of uplink data is notified from the base station to the UE1, and the UE1 starts transmission of uplink data from the subframe (7). After that, the data 538 for the UE1 are allocated to the LBs 1 to 6, the uplink Sounding RS 540 for measurement (usually) of the uplink communication quality of the UE1 is allocated to the SB1 in TTI#4 and the SB2 in TTI#5, and the RS for demodulation is allocated to the remaining SBs. As shown in the figure, the BW of the region of the uplink Sounding RS which serves as a scheduling request SR of the UE1, and the BW of the region of the uplink Sounding RS for measurement (usually) of the communication quality of the uplink are the same as the bandwidth BW#1 of the UE group A, and all mobile terminals UE of the UE group A in a data transmission state allocate the same region having the completely same timing as this region for transmission of an uplink Sounding RS. In contrast, the bandwidth of the data region of the UE1 and that of the region allocated to a Demoduration RS are smaller than BW#1, and, as these regions, regions distinguished from those of other UEs are used.

Thus, the timing of transmission of an uplink Sounding RS which serves as an uplink scheduling request signal SR has to be synchronized with that of transmission of an uplink Sounding RS of another UE (there can be two or more other UEs) under transmission to which the same BW is allocated.

FIG. 42 shows in greater detail how each of a plurality of UEs is using radio resources allocated thereto at the same timing in the time-frequency region allocated to the UE group A. Unlike in the case of FIG. 38, in the case of FIG. 42, the region for uplink Sounding RS is placed in two LBs (LB1 in a first subframe, and LB6 in a second subframe) within 2 TTIs, like in the case of FIG. 35(*b*). In the figure, reference numeral 571 denotes a Sounding RS region of the UE group A, reference numeral 572 denotes an RS region for Demoduration of the UE group A, reference numeral 573 denotes a data region of the UE group A, reference numeral 574 denotes a Sounding RS region of the UE group B, reference numeral 575 denotes an RS region for Demoduration of the UE group B, reference numeral 576 denotes a data region of the UE group B, reference numeral 577 denotes a region of a Sounding RS which serves as an scheduling request signal SR of the UE1 for a start of transmission of uplink data, and a region of a Sounding RS of the UE2 under transmission, reference numeral 578 denotes a Demoduration RS region of the UE2, reference numeral 579 denotes a data region of the UE2, reference numeral 580 denotes a general Sounding RS region of the UE1 and the UE2, reference numeral 581 denotes an RS region for Demoduration of the UE1, and reference numeral 582 denotes a data region of the UE1 under transmission.

Hereafter, it is assumed that in the two mobile terminals UE1 and UE2 in the same UE group A, at a time, the UE1 tries to start uplink transmission and the UE2 has been transmitting uplink data. The LB1 577 which is allocated to the uplink Sounding RS region which all the mobile terminals of the UE group A use at the time of uplink transmission is used, in the UE1, for transmission of an uplink Sounding RS which serves as an uplink scheduling request signal SR notified from the mobile terminal to a base station for a start of uplink transmission, and is, in the UE2, used for transmission of an uplink Sounding RS used for usual measurement of the quality in abase station. As shown in the figure, these two UEs transmit uplink Sounding RSs having different meanings with the same block (LB) of the completely same bandwidth (=BW#1) at the completely same timing.

When receiving this LB1, the base station demodulates the block with codes which are respectively generated from the sequence numbers of the UEs to receive the uplink Sounding RSs from the UE1 and the UE2. The base station then uses the Sounding RS signal from the UE1 from which the base station has not received any uplink data signal until now for measurement of the uplink quality of the UE1, and judges that this Sounding RS signal is a notification (an uplink scheduling request signal SR) of a start of transmission by the UE1. In contrast, the base station uses the Sounding RS signal from the UE2 from which the base station has so far received an uplink data signal at regular intervals for measurement of the uplink quality of the UE2.

The region for data and the region for a Demoduration RS which are allocated while each of the UE1 and the UE2 carries out transmission are allocated to regions which are separated from each other, respectively, as shown in FIG. 42, unlike that for an uplink Sounding RS.

Figure 43:
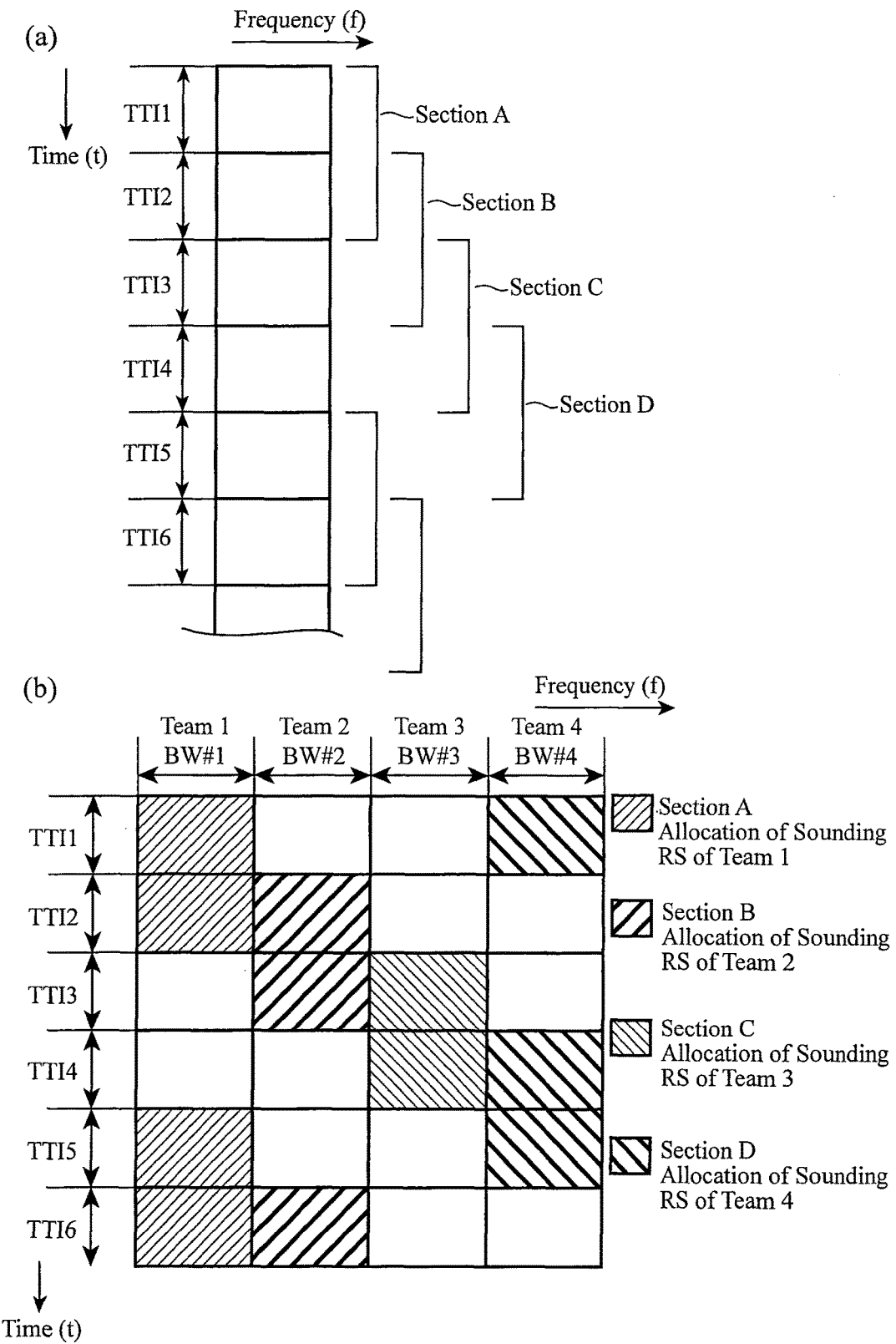
FIG. 43 is an explanatory drawing in a case of a Sounding RS region for each UE group.

Furthermore, a time-frequency region via which an uplink Sounding RS can be transmitted is not configured similarly for any UE group, as explained with reference to FIGS. 38 and 42, and therefore there is also provided a method of configuring a different time-frequency region for each UE group. FIGS. 43(a) and 43(b) show examples in each of which the region to which an uplink Sounding RS is allocated is configured for each UE group in such a way that the time and frequency of the region are shifted in units of a resource unit (RU). FIG. 43(a) shows the example in which, in a case in which the BW of a Sounding RS is equal to the entire bandwidth of the base station, the region with which an uplink Sounding RS can be transmitted is allocated in the time-frequency region in such a way that the region differs for each UE group. The figure shows an example in which time sections during each of which a Sounding RS can be transmitted are allocated to the four UE groups in such a way that each of the time sections has a length of 2 TTIs and the time sections are shifted from one another by 1 TTI. More concretely, among the four UE groups, a UE in the team 1 transmits an uplink Sounding RS during a time section A of TTIs (1) and (2), a UE in the team 2 transmits an uplink Sounding RS during a time section B of TTIs (2) and (3), a UE in the team 3 transmits an uplink Sounding RS during a time section C of TTIs (3) and (4), and a UE in the team 4 transmits an uplink Sounding RS during a time section D of TTIs (4) and (5). The allocation is not limited to this example.

Furthermore, as explained in this Embodiment 7, the allocation of an uplink Sounding RS to a region is not limited to allocation to two blocks within 2 TTIs. As an alternative, the allocation can be carried out for each TTI, or the allocation can be carried out in such a way that an uplink Sounding RS is allocated to a predetermined fixed number of blocks over three or more subframes. Furthermore, there is no necessity to configure the time sections during each of which a Sounding RS can be transmitted in such a way that they are shifted from one another by 1 TTI, and what is necessary is just to configure the time sections according to a period which is enough to reduce the network load and to maintain the accuracy of the measurement of the uplink quality. Because using this method, the time sections during which the plurality of UE teams can transmit uplink sounding RSs respectively differ from one another, the number of UEs which the base station receive simultaneously can be reduced.

Furthermore, the distribution of the total transmit power of the base station can be optimized.

FIG. 43(b) shows the example in which, in a case in which a plurality of BWs are configured an uplink Sounding RS, the time section during which an uplink Sounding RS can be transmitted is allocated in each of the time-frequency regions of the BWs in such a way that the time section differs for each UE group. Because using this method, the frequency bands with which the plurality of UE teams perform uplink transmissions respectively and the time sections during which the plurality of UE teams can transmit uplink sounding RSs respectively differ from one another, compared with FIG. 43(a), the number of UEs which the base station receive simultaneously with the same band at the time of reception can be reduced and the receiving load of the wireless communication unit of the base station can be reduced. Furthermore, the distribution of the total transmit power of the base station can be optimized.

The method of setting up the BW of an uplink Sounding RS, and allocating radio resources, which is explained in this Embodiment 7, can also be applied to a case in which when there exist no transmission of uplink data and a Sounding RS is transmitted for the purpose of transmitting a signal other than an uplink scheduling request signal SR. Furthermore, the method of configuring the BW of an uplink Sounding RS, and allocating radio resources, which is explained in this Embodiment 7, can also be applied to Embodiment 8, Embodiment 9, and Embodiment 10.

The transmit power when transmitting a Sounding RS which serves as an uplink scheduling request signal SR has to be set to be equal to or higher than that at the time of transmitting a general uplink Sounding RS in view of the importance of the signal. For example, there is also provided a method of acquiring the transmit power of a Sounding RS which serves as an uplink scheduling request signal SR by using a predetermined equation as follows:

[Equation 1]

$$P_{SR} = P_{Sounding} + \frac{E/N_{SR}}{E/N_{sounding}} \times k$$

$\begin{cases} k: \text{Constant} \\ P_{SR}: \text{Transmit Power of Sounding } RS \text{ Serving as Scheduling Request} \\ P_{Sounding}: \text{Transmit Power of Uplink Sounding } RS \\ E/N_{SR}: E_b/No \text{ of Uplink Sounding } RS \text{ Serving as Scheduling Request} \\ E/N_{Sounding}: E_b/No \text{ of Uplink Sounding } RS \end{cases}$ As mentioned above, by, for example, setting up the transmit powers of mobile terminals according to their respective desired power-to-noise ratios so as to make the transmit power of each mobile terminal at the time of transmitting a Sounding RS which serves as an uplink scheduling request signal SR be equal to or larger than that at the time of transmitting a general uplink Sounding RS, erroneous reception of uplink scheduling request signals by the base station can be reduced. As mentioned above, the method of setting up the transmit power of a Sounding RS which serves as an uplink scheduling request signal SR can also be applied to Embodiment 8, Embodiment 9, and Embodiment 10.

As mentioned above, when a transmission request occurs in a case in which a mobile station is synchronized with a base station, and no transmission of uplink data is being carried out and no allocation of an Ack/Nack exclusive channel is made, a frequency band wider than that at the time of using an S-RACH can be used by transmitting an uplink scheduling request signal SR by using a Sounding RS for measurement of the quality of the uplink. Therefore, transmission further resistant to the frequency selective fading can be implemented. Because by using a "sounding RS which serves as an uplink scheduling request signal SR", an uplink communication path quality measurement in the base station can be carried out while serving as transmission of an uplink scheduling request signal SR. Therefore, the necessity to transmit a sounding RS for measurement of the uplink quality independently from a scheduling request signal SR can be eliminated. Furthermore, because a wide frequency band is used, it is easy to incorporate the communication quality of the uplink into subsequent uplink scheduling. In addition, the radio resources of the S-RACH can be released, and the complexity in the uplink scheduling sequence between the mobile terminal and the base station can be reduced.

Embodiment 8

Figure 53:
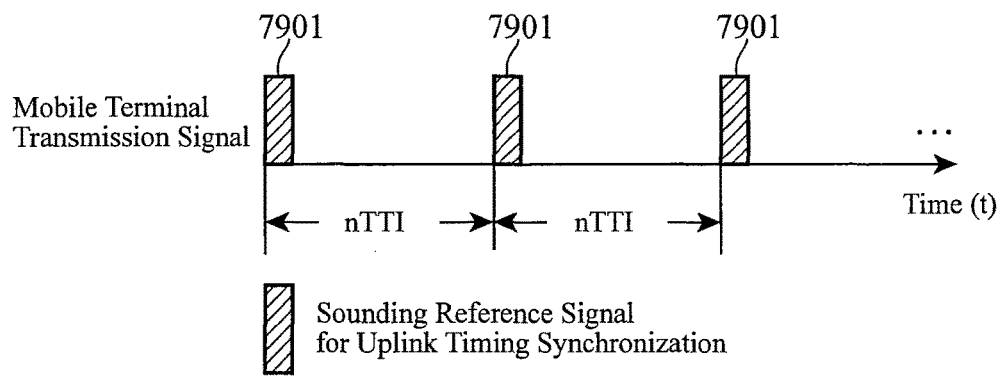
FIG. 53 is an explanatory drawing in a case in which a reference signal for sounding is transmitted at certain time intervals.
Figure 54:
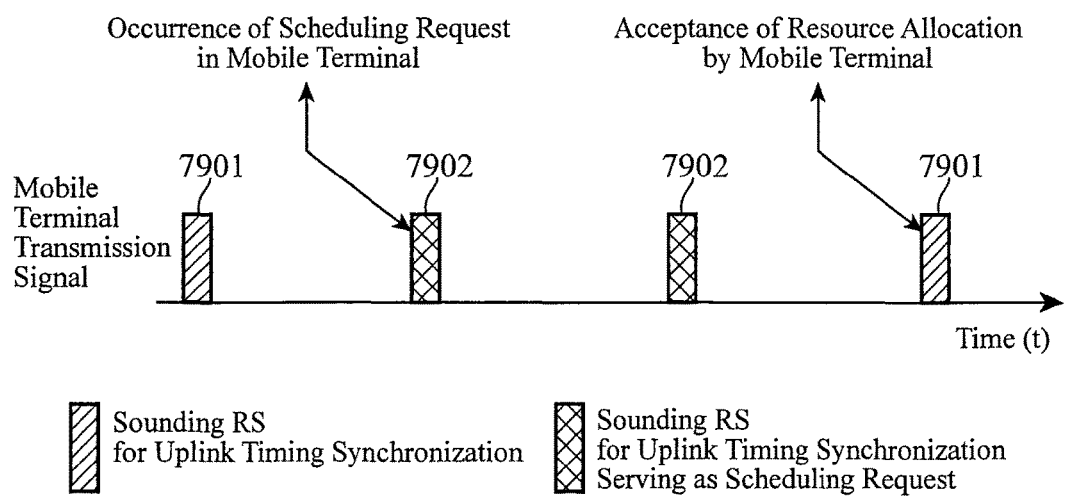
FIG. 54 is an explanatory drawing in a case in which a reference signal for sounding which is transmitted at certain time intervals serves as an uplink scheduling request signal.

Even in a case in which a mobile terminal is synchronized with a base station, and is not receiving downlink data (Downlink data, DL data) transmitted from a base station, or allocation of an Ack/Nack exclusive channel for transmitting an Ack/Nack signal or a CQI signal which is the result of reception of downlink data to the base station is not made and the mobile terminal is not carrying out any transmission of uplink data (Uplink data, UL data) such as user data, the mobile terminal may transmit a reference signal for sounding (a reference signal for measurement of the quality of an uplink communication path) to the base station at certain periodicity in order to maintain uplink synchronization with the base station. A case in which a mobile terminal transmits a reference signal 7901 for sounding at certain periodicity (n×TTI) is shown in FIG. 53. On the other hand, when a necessity to transmit uplink data occurs in the mobile terminal, the mobile terminal has to transmit an uplink scheduling request signal SR to the base station separately.

Therefore, there may be a case in which an uplink scheduling request signal SR and a reference signal for sounding are transmitted simultaneously. When transmitted simultaneously, they are not transmitted with single carrier transmission, but are transmitted with multi carrier transmission. In the case in which such signals having no correlation among them are transmitted simultaneously, the PAPR becomes high because the time waveforms of the transmission signals have a high peak. A problem is that as the PAPR becomes high, the power consumption of the mobile terminal increases and therefore the cell coverage becomes narrow. A further problem is that as the PAPR becomes high, those signals become an interference wave to other mobile terminals and the communication system. In order to avoid these problems, there can be considered a measure of shifting the transmission timing of a reference signal for sounding from that of an uplink scheduling request signal SR, or the like, though the scheduling control in the base station and/or the mobile terminal becomes complicated.

In this Embodiment 8, a method of making a reference signal for sounding serve as an uplink scheduling request signal SR in order to solve the above-mentioned problems will be explained.

In above-mentioned Embodiment 7, the transmission method of transmitting a scheduling request in a state in which a mobile terminal does not transmit a reference signal for sounding in a case in which the mobile terminal is not transmitting uplink data is disclosed. In that case, the base station judges that there is a scheduling request when receiving a reference signal for sounding. Therefore, the base station does not have to have a function of judging whether a reference signal for sounding serves as an uplink scheduling request, and/or a function of judging whether or not there occurs scheduling.

However, there arises a new problem that in a case in which a mobile terminal transmits a reference signal for sounding at certain periodicity, in order to make the reference signal for sounding serve as an uplink scheduling request signal SR, the base station has to judge whether the received signal is the one sounding or the one for uplink scheduling, and/or has to judge whether or not there occurs scheduling. In order to solve this problem, in this Embodiment 8, a method of providing two types of pilot patterns for sounding, defining correspondences between these two types of pilot patterns and the presence and absence of an uplink scheduling request, and transmitting one of the two types of pilot patterns according to the presence or absence of an uplink scheduling request is disclosed (refer to FIG. 80).

Figure 46:
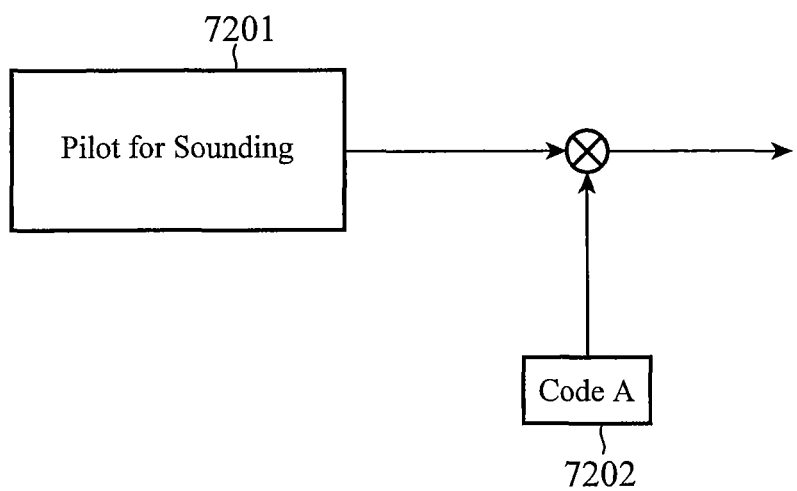
FIG. 46 is an explanatory drawing of an allocation method of allocating a pilot for sounding and a mobile-terminal-specific code in a case in which a mobile terminal transmits a reference signal for sounding.

A method of, in a case in which a mobile terminal transmits a reference signal for sounding, allocating a pilot for sounding, and allocating a code specific to each mobile terminal is shown in FIG. 46. Reference numeral 7201 denotes the pilot for sounding, and reference numeral 7202 denotes the code specific to each mobile terminal. When the mobile terminal transmits the reference signal for sounding, the encoder unit or the modulating unit of the mobile terminal multiplies the pilot for sounding by the code specific to each mobile terminal to generate the reference signal for sounding.

After the reference signal for sounding is subjected to a modulation process and is converted into a baseband signal, the reference signal for sounding is converted into a signal having a radio frequency. After that, the reference signal for sounding is transmitted to the base station by way of an antenna. The code specific to each mobile terminal is used by the base station in order for the base station to, when receiving reference signals for sounding from a plurality of mobile terminals, identify which one of the reference signals for sounding is the one from the above-mentioned mobile terminal. It is preferable that the above-mentioned code is the one having orthogonality, or this code yields multiplication of a pilot pattern thereby having orthogonality.

As an alternative, the above-mentioned code can be a spread code or a scramble code. A time-frequency region to which the reference signal for sounding is allocated is predetermined or is notified from the base station. A frequency region can have one of various bands. A time region can be provided once during each TTI or during several TTIs. A correlation operation is performed on the reference signal for sounding which the base station has received by using a code specific to each mobile terminal, and, by using a code which yields a correlation operation result which is equal to or larger than a threshold, the base station can identify the mobile terminal. The base station restarts the synchronization of an uplink channel with the mobile terminal which the base station has identified by using the reference signal for sounding. The base station can also measure the uplink communication path quality by using the above-mentioned signal.

Figure 44:
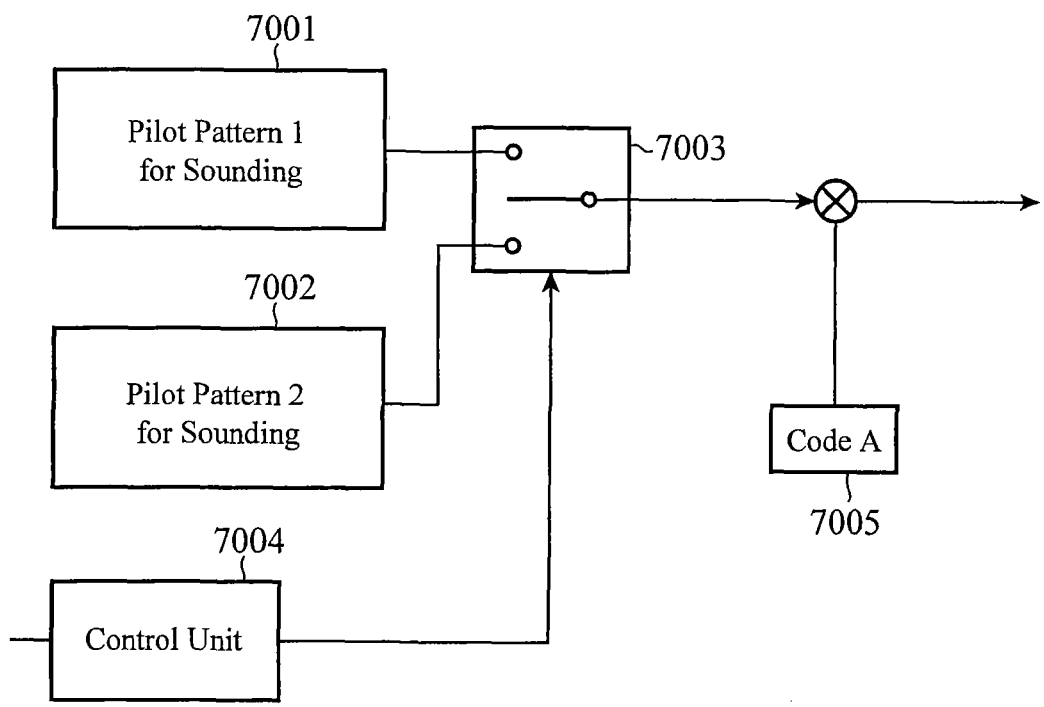
FIG. 44 is an explanatory drawing of a generation method of generating a reference signal for sounding having the functions of an uplink scheduling request signal.

One embodiment of making a reference signal for sounding have the functions of an uplink scheduling request signal SR will be disclosed hereafter. A method of generating a reference signal for sounding having the functions of an uplink scheduling request signal SR is shown in FIG. 44. Reference numeral 7001 denotes a pilot pattern 1 for sounding, reference numeral 7002 denotes a pilot pattern 2 for sounding, reference numeral 7003 denotes a switch for switching between the two types of patterns, reference numeral 7004 denotes a control unit for controlling the switch, and reference numeral 7005 denotes a code specific to each mobile terminal. Each of the above-mentioned pilots 1 and 2 for sounding can be a single symbol or can be a plurality of symbols. It is preferable that the above-mentioned code is the one having orthogonality, or this code yields multiplication of a pilot pattern thereby having orthogonality. As an alternative, the above-mentioned code can be a spread code or a scramble code. However, in a case in which the code is a scramble code, it is preferable that each of the above-mentioned pilots 1 and 2 for sounding is a plurality of symbols.

As the pilot patterns for sounding, there are provided two types of patterns according to the presence and absence of an uplink scheduling request. As shown in a table of the figure, in a case in which there is no uplink scheduling request, the pattern 1 is allocated in advance, whereas in a case in which there is an uplink scheduling request, the pattern 2 is allocated in advance.

Figure 45:
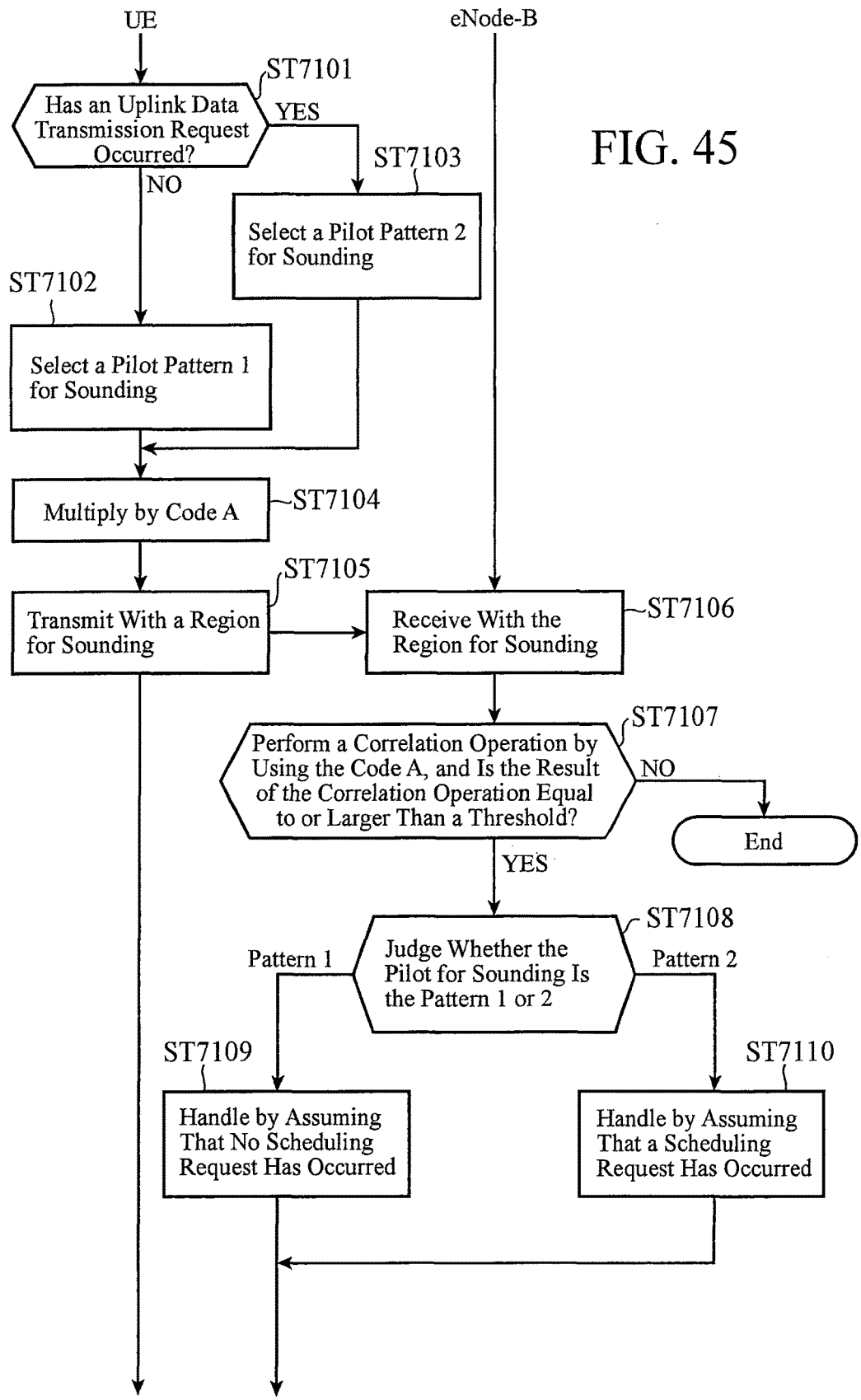
FIG. 45 is a diagram of sequences between a mobile terminal and a base station.

FIG. 45 shows a diagram of sequences between the mobile terminal and the base station. The mobile terminal transmits a reference signal for sounding at certain periodicity. A time-frequency region to which the reference signal for sounding is allocated is predetermined or is notified from the base station. The mobile terminal, in ST7101, judges whether an uplink data transmission request has occurred. When no uplink data transmission request has occurred, the mobile terminal carries out ST7102 because the mobile terminal does not transmit any scheduling request. The control unit 7004, in ST7102, changes the state of the switch 7003 in such a way as to select the pilot pattern 1 for sounding.

In contrast, when an uplink data transmission request has occurred, the mobile terminal carries out ST7103 because the mobile terminal transmits an uplink scheduling request. The control unit 7004, in ST7103, changes the state of the switch 7003 in such a way as to select the pilot pattern 2 for sounding. The mobile terminal, in ST7104, multiplies the pilot pattern for sounding selected in either of the cases by the code 7005 specific to each mobile terminal to generate a reference signal for sounding. The mobile terminal, in ST7105, performs a modulation process, baseband signal conversion, and radio frequency conversion on the reference signal for sounding, and transmits the reference signal for sounding to the base station with the time-frequency region allocated to the reference signal for sounding by way of the antenna. The base station, in ST7106, receives the reference signal for sounding. The base station, in ST7107, performs a correlation operation on this reference signal for sounding with the code specific to each mobile terminal, and identifies the mobile terminal when the result of the operation is equal to or larger than a threshold.

Next, the base station, in ST7108, judges whether the pilot for sounding has the pattern 1 or the pattern 2. When judging that the pilot for sounding has the pattern 1, the base station, in ST7109, carries out the processing by judging that there does not occur uplink scheduling. In contrast, when judging that the pilot for sounding has the pattern 2, the base station, in ST7110, carries out a process in the case in which there occurs uplink scheduling.

When, in ST7107, the result of the correlation operation is smaller than the threshold, the base station ends the processing by judging that the reference signal for sounding has been transmitted thereto from another mobile terminal other than the above-mentioned mobile terminal.

In one example of the two types of pilot patterns for sounding which enable the base station to judge whether the pilot for sounding has the pattern 1 or the pattern 2, a code and a reverse code are allocated to the pilot pattern 1 and the pilot pattern 2, respectively (when a certain symbol allocated to one of them is "1", "0" is allocated to the other one). By carrying out the allocation of codes to the two types of pilot patterns in this way, the base station, in ST7108, can judge whether the pilot for sounding is the pilot 1 or the pilot 2 by judging whether the result of the correlation operation is positive or negative.

The base station can also restart the synchronization of the uplink channel with this identified mobile terminal by using the pilot pattern 1 or 2 for sounding.

With the above-mentioned structure, the mobile terminal can suppress the increase in the PAPR which appears when transmitting an uplink scheduling request signal SR and a reference signal for sounding simultaneously.

Furthermore, because it becomes unnecessary to ensure the region of an S-RACH for a scheduling request, the waste of the time-frequency resource can be eliminated.

In addition, because the mobile terminal does not have to carry out a process of shifting the transmission timing of a reference signal for sounding and that of an uplink scheduling request signal SR from each other, and so on, the scheduling control in the base station and/or the mobile terminal can be prevented from becoming complicated.

Furthermore, by forming a reference signal for uplink sounding in such a way that the reference signal for uplink sounding serves as an uplink scheduling request signal SR, as mentioned above, the base station is enabled to, when receiving this signal, judge whether this signal has an uplink scheduling request.

In addition, because only one type of specific code has only to be allocated to each mobile terminal, many code resources can be ensured and the number of mobile terminals from which the base station can receive signals simultaneously can be increased.

Furthermore, because a frequency band wider than that at the time of using an S-RACH or an Ack/Nack exclusive channel can be used, transmission further resistant to the frequency selective fading can be implemented.

Hereafter, variants will be explained.

Figure 47:
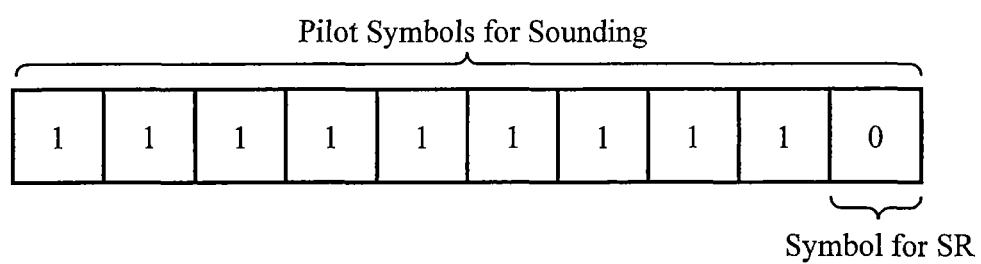
FIG. 47 is an explanatory drawing showing a pilot pattern in which a part of a sounding pilot is symbols for scheduling request.

In a first variant, a symbol or two or more symbols of the pilot for sounding are a symbol or two or more symbols for scheduling request. A pilot pattern in which a part symbols or two or more symbols of the pilot for sounding are a symbol or two or more symbols for scheduling request is shown in FIG. 47.

When there is no scheduling request, 1 is allocated to the symbol for scheduling request, whereas when there is a scheduling request, 0 is allocated to the symbol for scheduling request.

Figure 48:
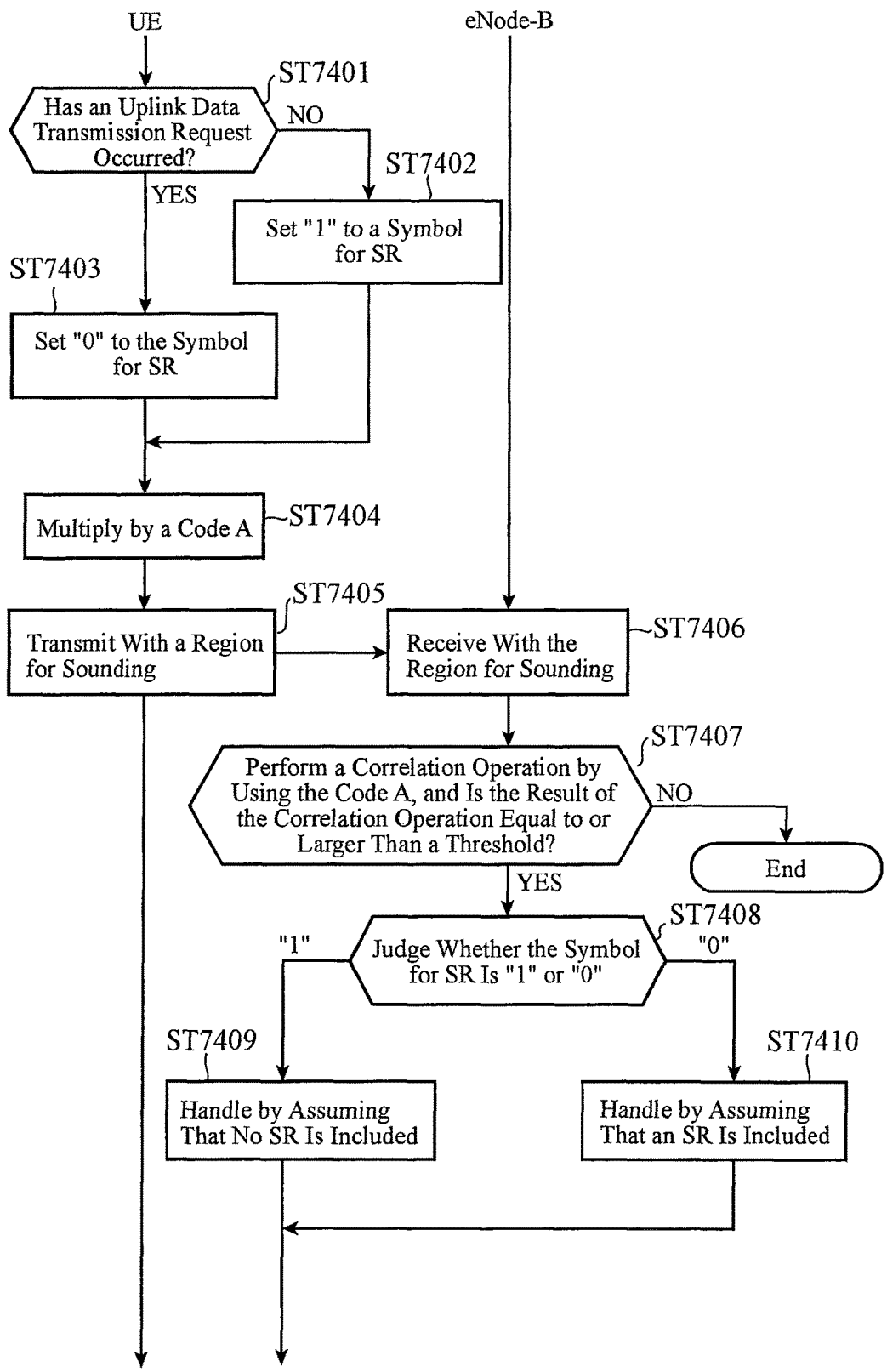
FIG. 48 is a diagram of sequences between a mobile terminal and a base station.

This variant will be explained with reference to a sequence diagram of FIG. 48. The mobile terminal, in ST7401, judges whether an uplink data transmission request has occurred. When no uplink data transmission request has occurred, the mobile terminal carries out ST7402 because the mobile terminal does not transmit any scheduling request. The mobile terminal, in ST7402, sets 1 to the symbol for scheduling request. In contrast, when an uplink data transmission request has occurred, the mobile terminal carries out ST7403 because the mobile terminal transmits a scheduling request. The mobile terminal, in ST7403, sets 0 to the symbol for scheduling request. The mobile terminal, in ST7404, multiplies the pilot pattern for sounding selected in either of the cases by a code A specific to each mobile terminal to generate a reference signal for sounding.

The mobile terminal, in ST7405, performs a modulation process, baseband signal conversion, and radio frequency conversion on the reference signal for sounding, and transmits the reference signal for sounding to the base station with the time-frequency region allocated to the reference signal for sounding by way of the antenna. The base station, in ST7406, receives the reference signal for sounding. The base station, in ST7407, performs a correlation operation on this reference signal for sounding with the code A specific to each mobile terminal, and identifies the mobile terminal when the result of the operation is equal to or larger than a threshold. Next, the base station, in ST7408, judges whether the symbol for scheduling request is 1 or 0. When judging that the symbol for scheduling request is 1, the base station, in ST7409, carries out the processing by judging that there does not occur uplink scheduling. In contrast, when judging that the symbol for scheduling request is 0, the base station, in ST7410, carries out a process in the case in which there occurs uplink scheduling.

The number of symbols which are used for a scheduling request can be one or can be two or more. By using two or more symbols for a scheduling request, there can be provided an advantage of increasing the composite electric power in the base station and therefore reducing the error rate.

Furthermore, the symbols for sounding can be multiplied by a code specific to each mobile terminal according to the number of the symbols for sounding and the one or more symbols for scheduling request can be multiplied by another code specific to the mobile terminal according to the number of the symbols for scheduling request, and the reference signal for sounding and scheduling request can be multiplexed with respect to time. Thereby, a scrambling code can be used as the code specific to each mobile terminal. Furthermore, because the base station can perform the correlation operation by using only the reference signal for sounding, there is provided an advantage of improving the synchronization accuracy and the accuracy of evaluation of channel conditions (the quality of the uplink communication path). In addition, in a case in which the number of the symbols for sounding is the same as the number of the one or more symbols for scheduling request, both of them can be multiplied by an identical code specific to each mobile terminal. Thereby, there is provided an advantage of making effective use of the code resources.

In a second variant, two codes specific to each mobile terminal are prepared, and the pilot for sounding is multiplied by one of the two codes specific to each mobile terminal which is according to the presence or absence of an uplink scheduling request.

Figure 49:
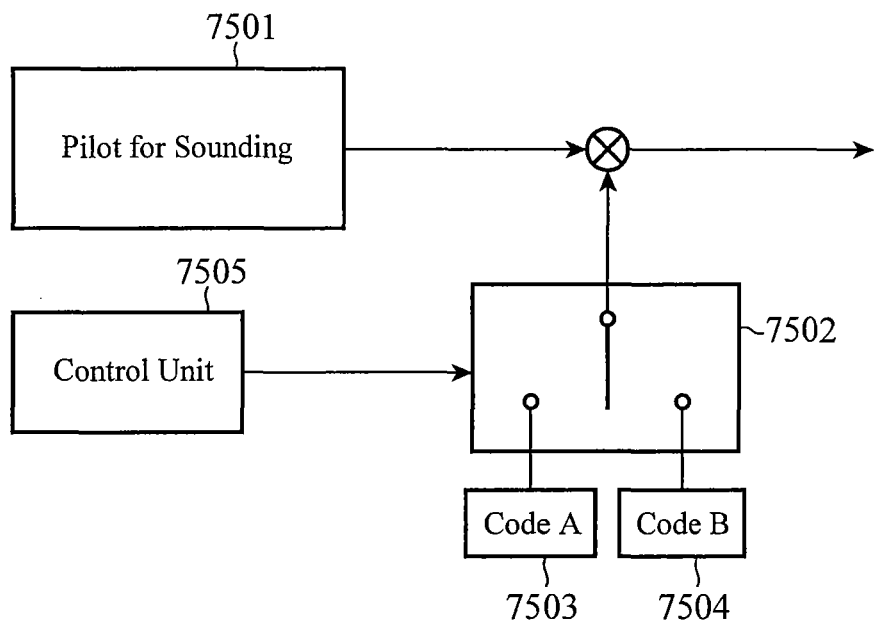
FIG. 49 is an explanatory drawing of an example of generation of a reference signal for sounding.

An example of generation of a reference signal for sounding is shown in FIG. 49. Reference numeral 7501 denotes a pilot for sounding, reference numeral 7503 denotes a code A specific to each mobile terminal, reference numeral 7504 denotes another code B specific to each mobile terminal, reference numeral 7502 denotes a switch for selecting a code by which the pilot for sounding is multiplied, and reference numeral 7505 denotes a control unit for transmitting a signal for selecting a code (7503 or 7504) according to the presence or absence of a scheduling request by using the switch 7502. As shown in a table of the figure, as the code specific to each mobile terminal, when there is no uplink scheduling request, the code A is allocated, whereas when there is an uplink scheduling request, the code B is allocated.

Figure 50:
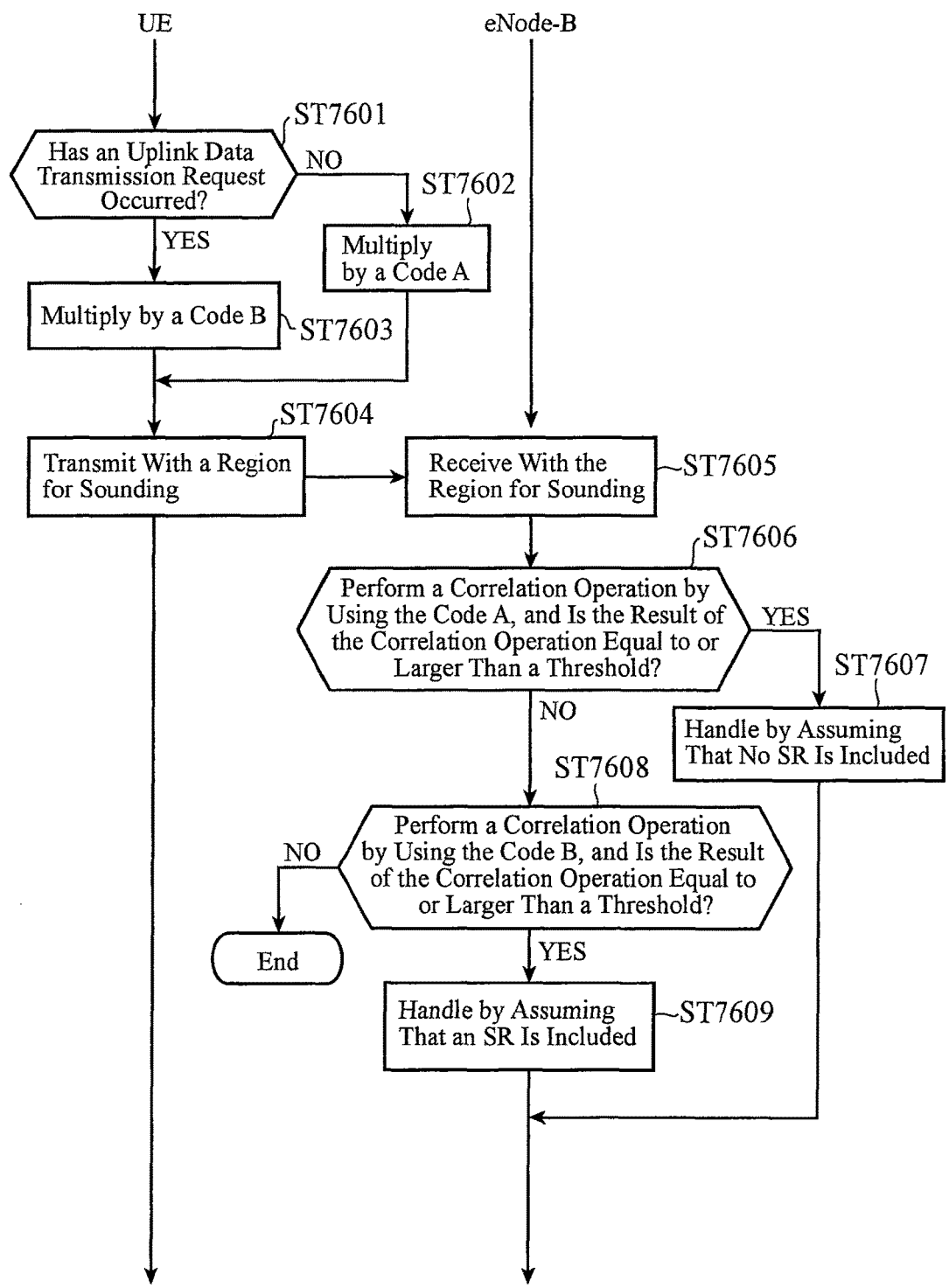
FIG. 50 is a diagram of sequences between a mobile terminal and a base station.

The operation of the variant will be explained with reference to a sequence diagram of FIG. 50. The mobile terminal, in ST7601, judges whether an uplink data transmission request has occurred. When no uplink data transmission request has occurred, the mobile terminal carries out ST7602 because the mobile terminal does not transmit any scheduling request. The mobile terminal, in ST7602, selects the code A by using the switch 7502 according to a control signal from the control unit 7505 in such a way as to carry out multiplication with the code A. As a result, the pilot for sounding is multiplied by the code A 7503. In contrast, when an uplink data transmission request has occurred, the mobile terminal carries out ST7603 because the mobile terminal transmits a scheduling request. The mobile terminal, in ST7603, selects the code B 7504 by using the switch 7502 according to the control signal from the control unit 7505 in such a way as to carry out multiplication with the code B. As a result, the pilot for sounding is multiplied by the code B.

The mobile terminal, in ST7604, performs a modulation process, baseband signal conversion, and radio frequency conversion on the reference signal for sounding, and transmits the reference signal for sounding to the base station with the time-frequency region allocated to the reference signal for sounding by way of the antenna. The base station, in ST7605, receives the reference signal for sounding. The base station, in ST7606, performs a correlation operation on this reference signal for sounding with the code A first, and identifies the mobile terminal when the result of the operation is equal to or larger than a certain threshold, though the base station handles the reference signal for sounding by judging that the reference signal does not include a scheduling request. In contrast, when the result of the operation is smaller than the certain threshold, the base station, in ST7608, performs a correlation operation on the above-mentioned reference signal for sounding with the code B. When the result of the operation is equal to or larger than a certain threshold, the base station identifies the mobile terminal and then handles the reference signal for sounding by judging that the reference signal includes a scheduling request.

When, in ST7606, the result of the correlation operation with the code A is less than the certain threshold, and when, in ST7608, the result of the correlation operation with the code B is less than the certain threshold, the base station judges that the reference signal for sounding is the one from another mobile terminal other than the mobile terminal, and ends the processing.

Because this variant is constructed as mentioned above, there is provided an advantage of eliminating the necessity to provide two types of pilot patterns for sounding, and a further advantage of eliminating the necessity to judge whether the result of each correlation operation is positive or negative because an orthogonal code is also used for judgment of the presence or absence of a scheduling request. Furthermore, because an orthogonal code is also used for judgment of the presence or absence of a scheduling request, there is provided another advantage of improving the judgment precision, the synchronization accuracy, and the accuracy of evaluation of channel conditions.

In a third variant, one type of code for judgment of the presence or absence of a scheduling request is prepared, and there is provided a method of controlling whether to carry out multiplication with this code according to the presence or absence of an uplink scheduling request.

Figure 51:
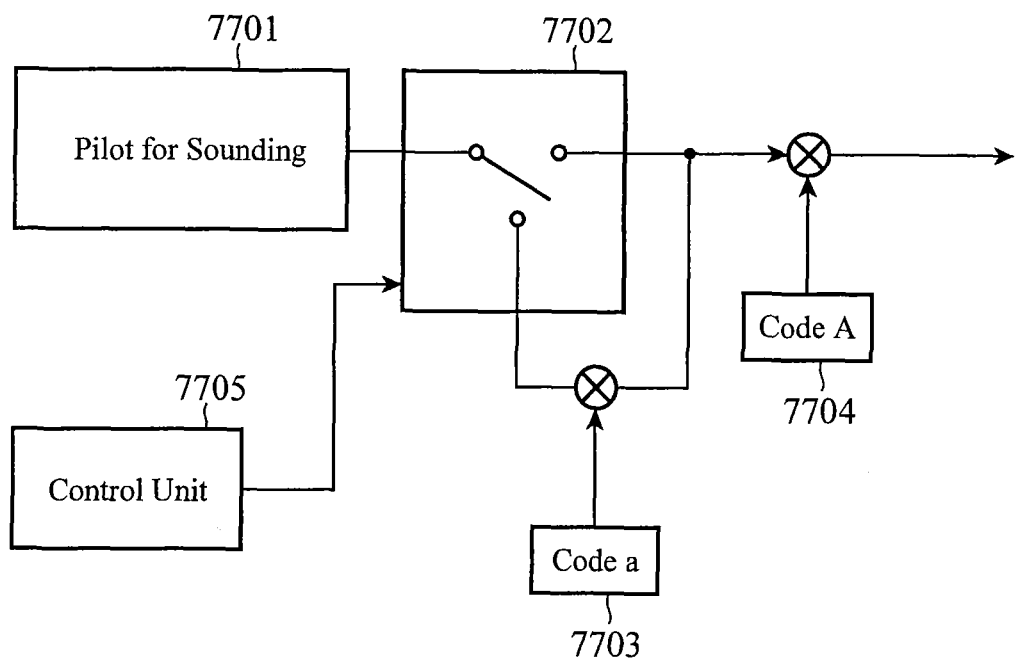
FIG. 51 is an explanatory drawing of an example of generation of a reference signal for sounding.

An example of generation of a reference signal for sounding is shown in FIG. 51. Reference numeral 7701 denotes a pilot for sounding, reference numeral 7703 denotes a code a for judgment of the presence or absence of a scheduling request, reference numeral 7702 denotes a switch for selecting whether to multiply the sounding pilot by the code a, reference numeral 7705 denotes a control unit for transmitting a signal indicating whether to multiply the sounding pilot by the code a with the switch 7702, and reference numeral 7704 denotes a code specific to each mobile terminal. As shown in a table of the figure, when there is no uplink scheduling request, the code for judgment of the presence or absence of a scheduling request is not allocated, whereas when there is an uplink scheduling request, the code a is allocated.

The operation of this variant will be explained with reference to a sequence diagram of FIG. 52. The mobile terminal, in ST7801, judges whether an uplink data transmission request has occurred. When no uplink data transmission request has occurred, the mobile terminal performs a selection so as not to carry out multiplication by the code a by using the switch 7702 according to the control signal from the control unit 7705 because the mobile terminal does not transmit any scheduling request, and then carries out ST7803. In contrast, when an uplink data transmission request has occurred, the mobile terminal carries out ST7802 because the mobile terminal transmits a scheduling request. The mobile terminal, in ST7802, selects the code a 7703 by using the switch 7702 according to the control signal from the control unit 7705 in such a way as to carryout multiplication with the code a. As a result, the pilot for sounding is multiplied by the code a for judgment of the presence or absence of a scheduling request. In ST7803, the pilot for sounding is multiplied by the code A specific to each mobile terminal.

The mobile terminal, in ST7804, performs a modulation process, baseband signal conversion, and radio frequency conversion on the reference signal for sounding, and transmits the reference signal for sounding to the base station with the time-frequency region allocated to the reference signal for sounding by way of the antenna. The base station, in ST7805, receives the reference signal for sounding. The base station, in ST7806, performs a correlation operation on this reference signal for sounding with the code A specific to each mobile terminal, and identifies the mobile terminal when the result of the operation is equal to or larger than a threshold.

The base station then, in ST7807, performs a correlation operation on the above-mentioned reference signal for sounding with the code a, and, when the result of the operation is equal to or larger than a threshold, handles the reference signal for sounding by judging that the reference signal has a scheduling request. In contrast, when the result of the operation is smaller than the threshold, the base station handles the reference signal for sounding by judging that the reference signal does not include a scheduling request.

The scheduling request presence or absence identification code a and the code A specific to each mobile terminal can be scramble codes or spread codes.

Because this variant is constructed as mentioned above, there is provided an advantage of eliminating the necessity to judge whether the result of each correlation operation is positive or negative because an orthogonal code can also be used for judgment of the presence or absence of a scheduling request. Furthermore, because an orthogonal code is also used for judgment of the presence or absence of a scheduling request, there is provided another advantage of improving the judgment precision. In addition, there is provided a further advantage of eliminating the necessity to double the amount of codes specific to each mobile terminal, unlike the second variant.

As mentioned above, with the structure as mentioned in this Embodiment 8, the mobile terminal can suppress the increase in the PAPR which appears when transmitting an uplink scheduling request signal SR and a reference signal for sounding simultaneously.

Furthermore, because it becomes unnecessary to ensure the region of an S-RACH for a scheduling request, the waste of the time-frequency resource can be eliminated.

In addition, because the mobile terminal does not have to carry out a process of shifting the transmission timing of a reference signal for sounding and that of an uplink scheduling request signal SR from each other, and so on, the scheduling control in the base station and/or the mobile terminal can be prevented from becoming complicated.

Furthermore, by forming a reference signal for uplink sounding in such a way that the reference signal for uplink sounding serves as an uplink scheduling request signal SR, as mentioned above, the base station is enabled to, when receiving this signal, judge whether this signal has an uplink scheduling request.

In addition, because a frequency band wider than that at the time of using an S-RACH or an Ack/Nack exclusive channel can be used, transmission further resistant to the frequency selective fading can be implemented.

Embodiment 9

When a necessity for transmission of uplink data occurs in a mobile terminal in a state in which the mobile terminal is receiving downlink data (Downlink data, DL data) transmitted from a base station or in a state in which allocation of an Ack/Nack exclusive channel for transmitting an Ack/Nack signal, which is the result of reception of downlink data, and/or a CQI signal to the base station is made, the mobile terminal has to transmit an uplink scheduling request signal SR to the base station. In this case, the mobile terminal may transmit the Ack/Nack signal and/or the CQI signal, and the uplink scheduling request signal SR simultaneously. When transmitted simultaneously, they are not transmitted with single carrier transmission, but are transmitted with multi carrier transmission. In the case in which such signals having no correlation among them are transmitted simultaneously, the PAPR becomes high because the time waveforms of the transmission signals have a high peak. A problem is that as the PAPR becomes high, the power consumption of the mobile terminal increases and therefore the cell coverage becomes narrow.

A further problem is that as the PAPR becomes high, those signals become an interference wave to other mobile terminals and the communication system.

In order to avoid these problems, in Embodiments 1 and 2, the method of transmitting an uplink scheduling request signal by using an S-RACH, and DTXing an Ack/Nack and/or a CQI signal at the same timing is disclosed. In Embodiments 3 and 4, the method of incorporating an uplink scheduling request signal into an Ack/Nack exclusive channel to transmit the uplink scheduling request signal is disclosed.

In this Embodiment 9, a method of transmitting an uplink scheduling request signal by using a region for sounding RS will be disclosed. In this Embodiment 9, a case in which there is no sounding RS which is transmitted for uplink timing synchronization at certain periodicity will be disclosed.

The region for sounding RS is already explained in Embodiment 7. In Embodiment 7, the case in which no allocation of an Ack/Nack exclusive channel is made is disclosed. In contrast, in this embodiment, a case in which allocation of an Ack/Nack exclusive channel is made will be disclosed.

Figure 55:
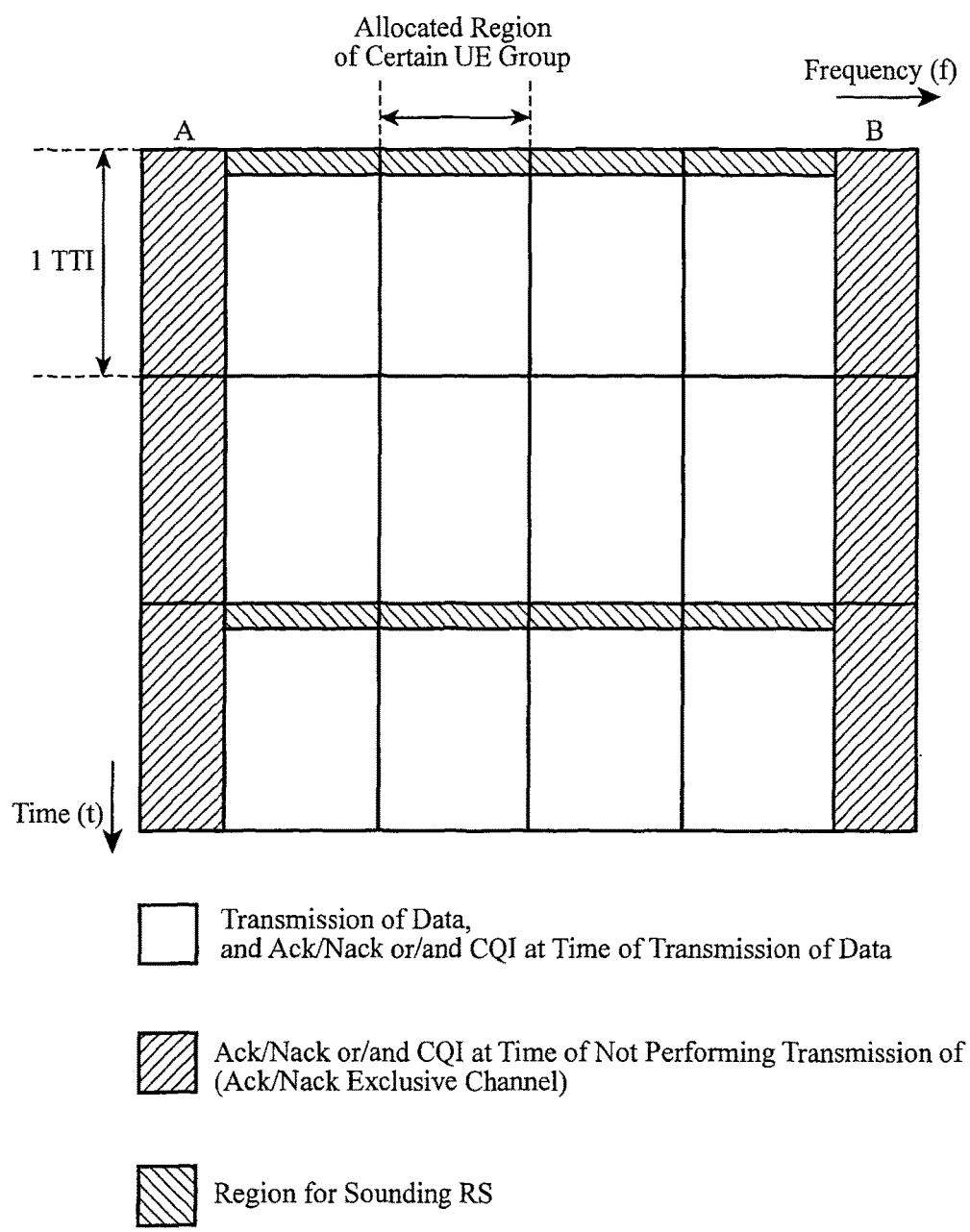
FIG. 55 is an explanatory drawing of a time-frequency resource in a case in which there is an Ack/Nack exclusive channel region.

FIG. 55 shows a figure of a time-frequency resource in a case in which there are regions for an Ack/Nack exclusive channel. Regions A and B are regions for an Ack/Nack exclusive channel. The region for sounding RS is allocated to a region other than channel for Ack/Nack, in this example, the allocation to the first LB is carried out once within 2 TTIs.

Each of a plurality of mobile terminals under the control of the base station transmits a reference signal for sounding using this region for sounding RS. The plurality of mobile terminals can be divided into one or more groups. Furthermore, the region for sounding reference symbols can also be divided into one or more regions. Transmission of an RS for sounding by a mobile terminal included in a certain mobile terminal group can be carried out by using a certain divided region.

Figure 60:
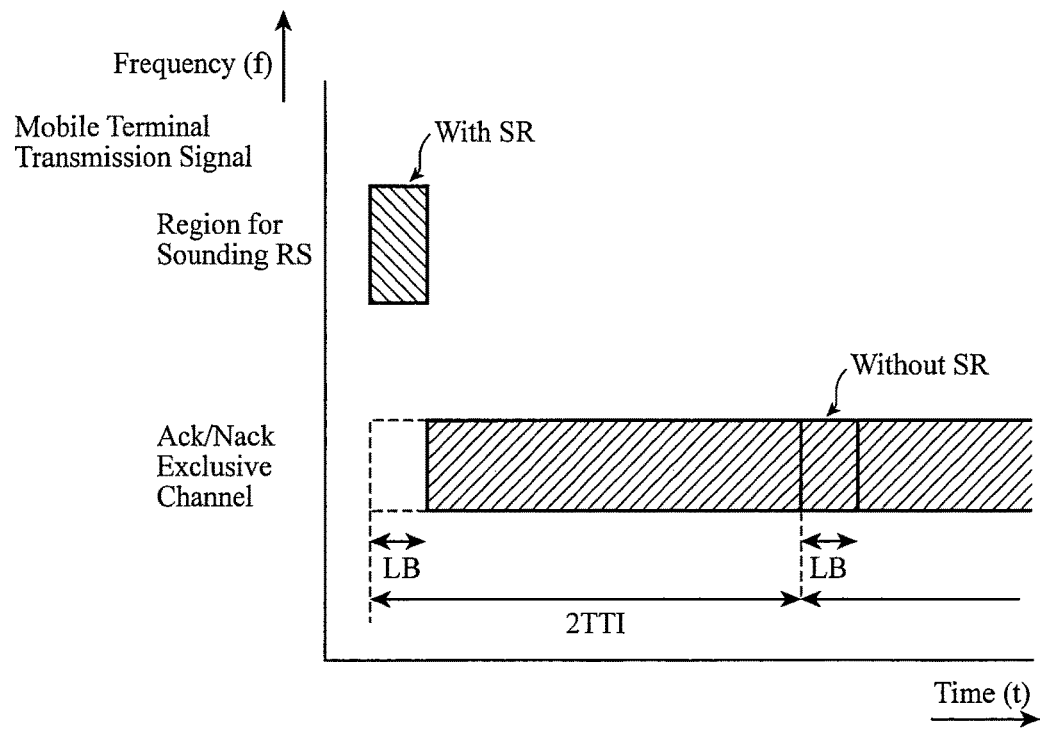
FIG. 60 is an explanatory drawing of a transmission signal of a mobile terminal when a scheduling request occurs.

A transmission signal of a mobile terminal in a case in which a scheduling request occurs is shown in FIG. 60. When a necessity for transmission of uplink data occurs in a mobile terminal in a state in which the mobile terminal is receiving downlink data (Downlink data, DL data) transmitted from a base station, or in a state in which allocation of an Ack/Nack exclusive channel for transmitting an Ack/Nack signal, which is the result of reception of downlink data, and/or a CQI signal to the base station is made, and the mobile terminal then transmits an uplink scheduling request signal SR to the base station, the mobile terminal transmits the uplink scheduling request signal by using a region for sounding RS allocated to this mobile terminal, and transmits an Ack/Nack signal, a CQI signal, or a reference signal for demodulation with other LBs or SBs by using the Ack/Nack exclusive channel. In contrast, when there is no uplink scheduling request, the mobile terminal does not transmit an uplink scheduling request signal, but transmits an Ack/Nack signal and/or a CQI signal by using the Ack/Nack exclusive channel.

Figure 59:
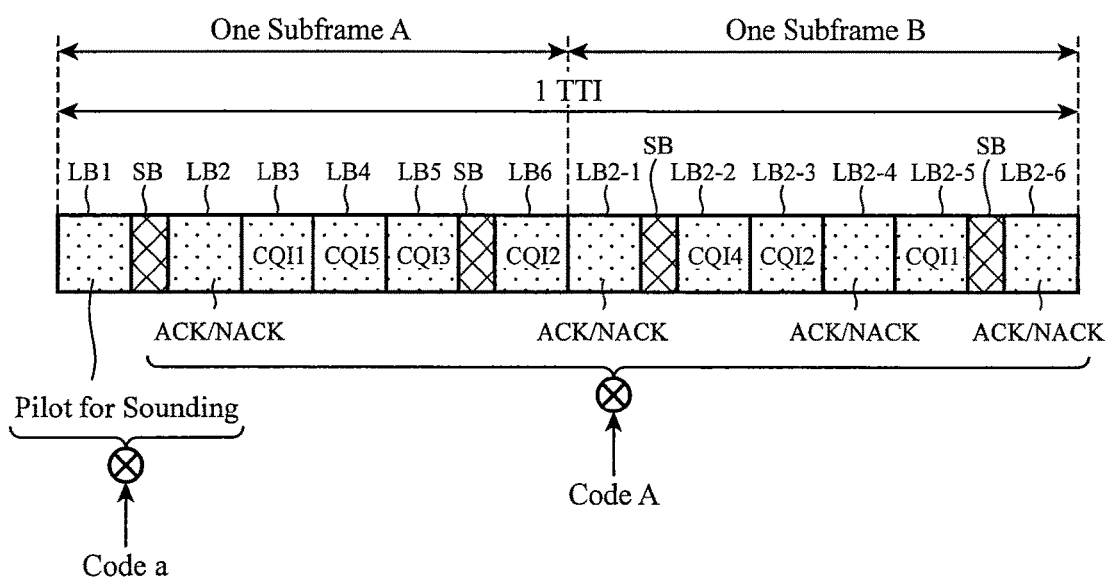
FIG. 59 is an explanatory drawing of transmission symbol mapping in a mobile terminal in a case of transmitting an uplink scheduling request signal with a region for sounding RS.

FIG. 59 shows mapping of transmission symbols in a mobile terminal in the case in which the mobile terminal transmits an uplink scheduling request signal with the region for sounding RS. A pilot symbol for sounding is inserted into a leading LB within 2 TTIs. An Ack/Nack or a CQI symbol is inserted into other LBs. The pilot for sounding is multiplied by a code a specific to each mobile terminal which is used in the region for sounding. This code a is used in order for the base station to identify from which mobile terminal the base station has received the transmission because the region for sounding is shared by a plurality of mobile terminals. The symbol for sounding which is multiplied by the code a specific to each mobile terminal, which is used in the region for sounding, is mapped to the region for sounding RS.

An Ack/Nack or a CQI symbol is multiplied by a code A specific to each mobile terminal, and is mapped to the resource for Ack/Nack exclusive channel. This code A is used to identify the mobile terminal in the Ack/Nack exclusive channel, as mentioned in Embodiment 3. These two types of codes specific to each mobile terminal are predetermined, or are notified from the base station.

Figure 62:
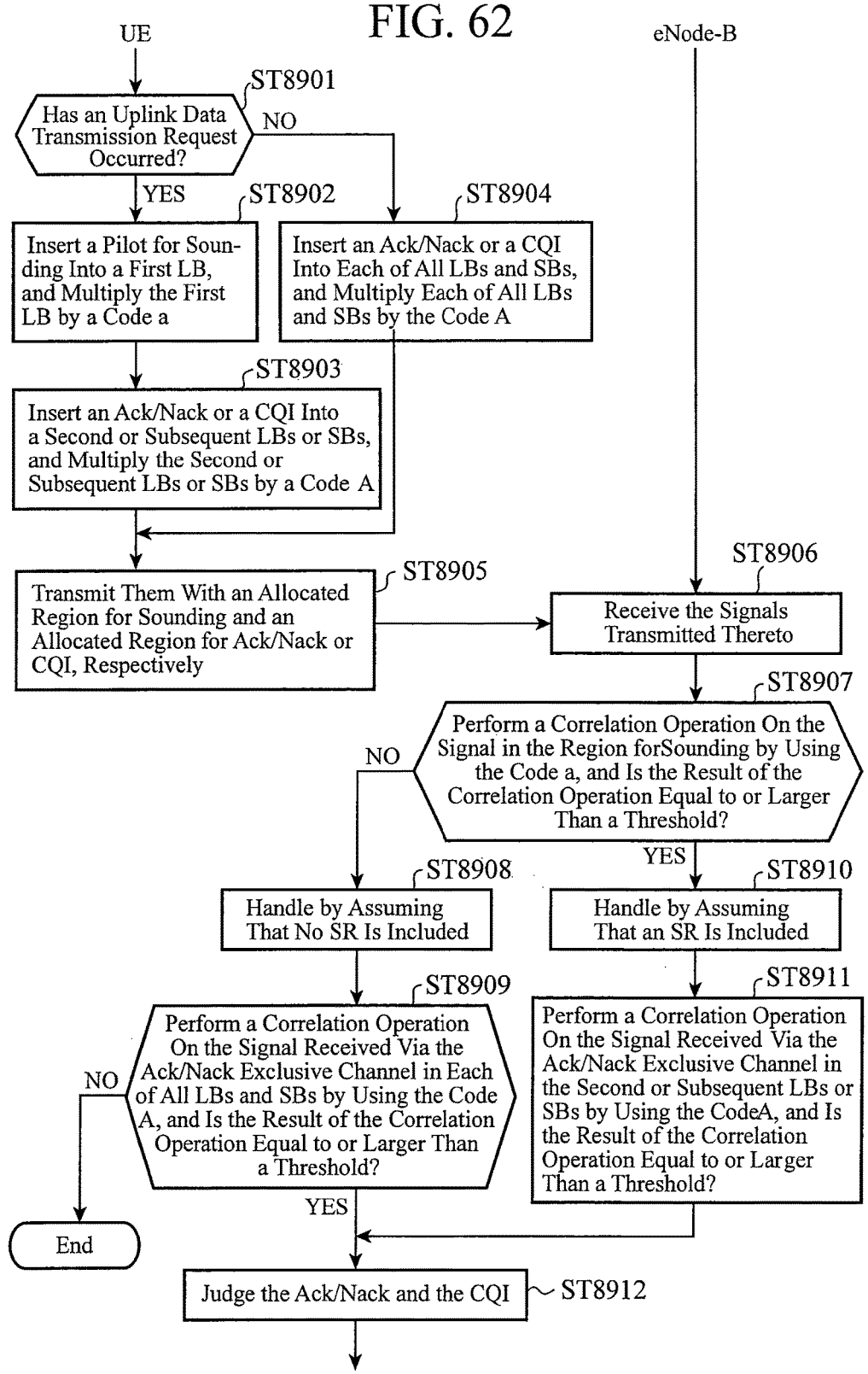
FIG. 62 is a diagram of sequences between a mobile terminal and a base station.

FIG. 62 is a sequence diagram. The mobile terminal, in ST8901, judges whether an uplink data transmission request has occurred. When no uplink data transmission request has occurred, the mobile terminal carries out ST8904 because the mobile terminal does not transmit any scheduling request. The mobile terminal, in ST8904, inserts an Ack/Nack or a CQI symbol into each of all LBs within 2 TTIs, and multiplies each of them by the code A. In contrast, when an uplink data transmission request has occurred, the mobile terminal carries out ST8902 and ST8903 because the mobile terminal transmits a scheduling request.

The mobile terminal, in ST8902, inserts the pilot for sounding into the first LB within 2 TTIs, and multiplies this LB by the code a. The mobile terminal, in ST8903, inserts an Ack/Nack and/or a CQI into a second or subsequent LBs, and multiplies these LBs by the code A. The mobile terminal, in ST8905, carries out allocation of the pilot for sounding which is multiplied by the code a to the region for sounding RS, and carries out allocation of the Ack/Nack or the CQI which is multiplied by the code A to the resource for Ack/Nack exclusive channel, and then transmits them to the base station. The base station which, in ST8906, received the signals, in ST8907, performs a correlation operation on the signal in the region for sounding by using the code a, and, when the result of the correlation operation is equal to or larger than a certain threshold, can identify the mobile terminal and judge that the base station has received an uplink scheduling request from this identified mobile terminal.

The base station which has judged that the base station has received an uplink scheduling request, in ST8910, handles the uplink scheduling request. The base station then, in ST8911, performs a correlation operation on the signal in the second or subsequent LBs or SBs, which is transmitted via the Ack/Nack exclusive channel, by using the code A, and, in ST8912, performs judgment of the Ack/Nack or the CQI. When, in ST8907, the result of the correlation operation with the code a is smaller than the certain threshold, the base station still cannot identify the mobile terminal and handles the signal by judging that the signal does not have an uplink scheduling request. In that case, the base station, in ST8909, performs a correlation operation on signals in all the LBs and SBs, which are transmitted via the Ack/Nack exclusive channel, by using the code A, and, when the result of the correlation operation is equal to or larger than a certain threshold, identifies the mobile terminal. After identifying the mobile terminal, the base station, in ST8912, performs judgment of the Ack/Nack or the CQI.

With the structure as mentioned above, the mobile terminal can suppress the increase in the PAPR which appears when transmitting both an Ack/Nack signal or a CQI signal, and an uplink scheduling request signal SR simultaneously.

Furthermore, because it becomes unnecessary to ensure the region of an S-RACH for a scheduling request in advance, the waste of the time-frequency resource can be eliminated.

In addition, by transmitting an uplink scheduling request signal SR by using a reference signal for sounding, the base station is enabled to, when receiving this signal, judge whether this signal has an uplink scheduling request.

Furthermore, because the mobile terminal transmits an uplink scheduling request signal SR by using a reference signal for sounding, the base station can evaluate the status of the uplink channel used for carrying out uplink scheduling.

In addition, because a frequency band wider than that at the time of using an S-RACH or an Ack/Nack exclusive channel can be used, transmission further resistant to the frequency selective fading can be implemented.

Furthermore, the base station can measure the status of the frequency selective fading, and can carry out appropriate uplink scheduling.

In the above-mentioned embodiments, when a mobile terminal does not have an uplink scheduling request, the mobile terminal inserts an Ack/Nack or a CQI symbol into the first LB. As the mapping method, the method disclosed in Embodiment 2 can be applied. By doing in this way, there is provided an advantage of improving the quality of reception of an Ack/Nack or a CQI.

As shown in above-mentioned Embodiment 1, also in the case in which a mobile terminal has an uplink scheduling request, the mobile terminal can insert an Ack/Nack or a CQI symbol into each of all the LBs and SBs, like in the case in which there is no uplink scheduling request, and, only when the mobile terminal has an uplink scheduling request, can DTX only the first LB and transmit a sounding pilot in this LB by using the RS region for sounding. As a result, the complexity of the process of multiplexing symbols can be reduced.

In the above-mentioned embodiments, the case in which an Ack/Nack and/or a CQI signal is transmitted by using an Ack/Nack exclusive channel is disclosed. In contrast, the method of this embodiment can also be applied to a case in which an Ack/Nack or a CQI signal is not transmitted by using an Ack/Nack exclusive channel. For example, when a scheduling request occurs in a mobile terminal, the mobile terminal has only to transmit an RS for sounding by using the first LB in a region for sounding and not to transmit any other signals.

In the above-mentioned embodiments, when a scheduling request occurs in a mobile terminal, the mobile terminal inserts a pilot symbol for sounding into the first LB. The same advantage is acquired even if the mobile terminal changes an LB or SB into which the mobile terminal inserts the pilot symbol according to the region allocated to an RS for sounding.

Hereafter, variants will be explained. In a first variant, the region for sounding RS is allocated to all the bands. FIG. 56 is a figure showing a time-frequency resource at the time of allocating the region for sounding RS to all the bands of the system. Regions A and B are regions for an Ack/Nack exclusive channel. In this example, the first LB is allocated, as the region for sounding RS, once within 2 TTIs. Each of a plurality of mobile terminals under the control of the base station transmits a reference signal for sounding by using this region for sounding RS. The plurality of mobile terminals can be divided into one or more groups. Furthermore, the region for a sounding reference signal can also be divided into one or more regions. Transmission of an RS for sounding by a mobile terminal included in a certain mobile terminal group can be carried out by using a certain divided region.

Figure 61:
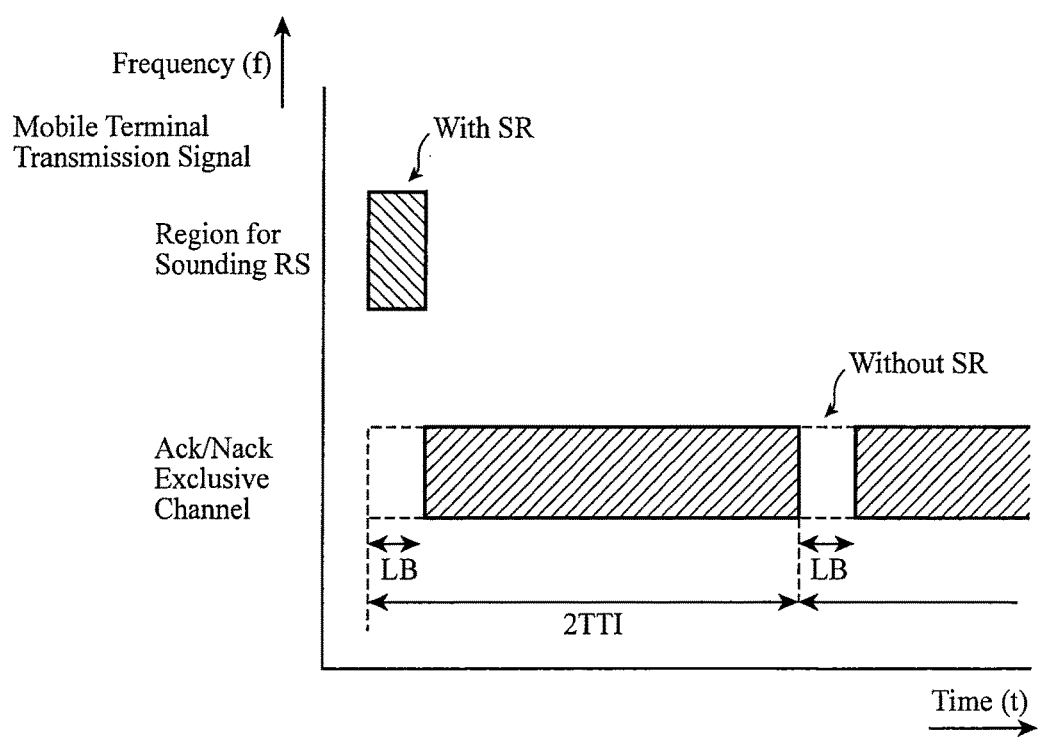
FIG. 61 is an explanatory drawing of a transmission signal of a mobile terminal when a scheduling request occurs.

A transmission signal of a mobile terminal in a case in which a scheduling request occurs is shown in FIG. 61. When a necessity for transmission of uplink data occurs in a mobile terminal in a state in which the mobile terminal is receiving downlink data (Downlink data, DL data) transmitted from a base station, or in a state in which allocation of an Ack/Nack exclusive channel for transmitting an Ack/Nack signal, which is the result of reception of downlink data, and/or a CQI signal to the base station is made, and the mobile terminal then transmits an uplink scheduling request signal SR to the base station, the mobile terminal transmits the uplink scheduling request signal by using a region for sounding RS allocated to this mobile terminal, and transmits an Ack/Nack signal, a CQI signal, or a reference signal for demodulation in other LBs or SBs by using the Ack/Nack exclusive channel. In contrast, when there is no uplink scheduling request, the mobile terminal does not transmit any uplink scheduling request signal, and, furthermore, does not transmit any Ack/Nack signal or any CQI signal once with the first LB by using the Ack/Nack exclusive channel within 2 TTIs. This is because since all the bands of the system are allocated to the region for sounding RS and some other mobile terminals under the control of the base station transmit sounding RSs with this LB of the Ack/Nack exclusive channel, if the mobile transmits an Ack/Nack signal or a CQI signal with this LB, the base station cannot discriminate this Ack/Nack or CQI signal from any other signals.

In the mapping of transmission symbols in the mobile terminal, a pilot for sounding is inserted when there is an uplink scheduling request, like in the mapping shown in FIG. 59, whereas when there is no uplink scheduling request, it is preferable to insert either nothing or dummy data into the first LB and not to carry out any transmission with this LB.

With the above-mentioned structure, this embodiment offers the same advantages as those provided by Embodiment 9. Furthermore, the base station can make an evaluation of uplink channel conditions with a wider band.

In addition, because the base station can make an evaluation of the channel conditions of an Ack/Nack exclusive channel, there is provided an advantage of performing scheduling of an Ack/Nack signal or a CQI signal of a mobile terminal to an Ack/Nack exclusive channel with a high degree of precision.

Furthermore, by dividing the plurality of mobile terminals into one or more groups, and/or by dividing the region for sounding reference signals into one or more regions, there is provided an advantage of bringing greater efficiency to the use of the code resources allocated to each mobile terminal.

In a second variant, the region for sounding RS is divided into parts having the same frequency bandwidth as the Ack/Nack exclusive channel, and a divided part is allocated to a certain mobile terminal group.

Figure 57:
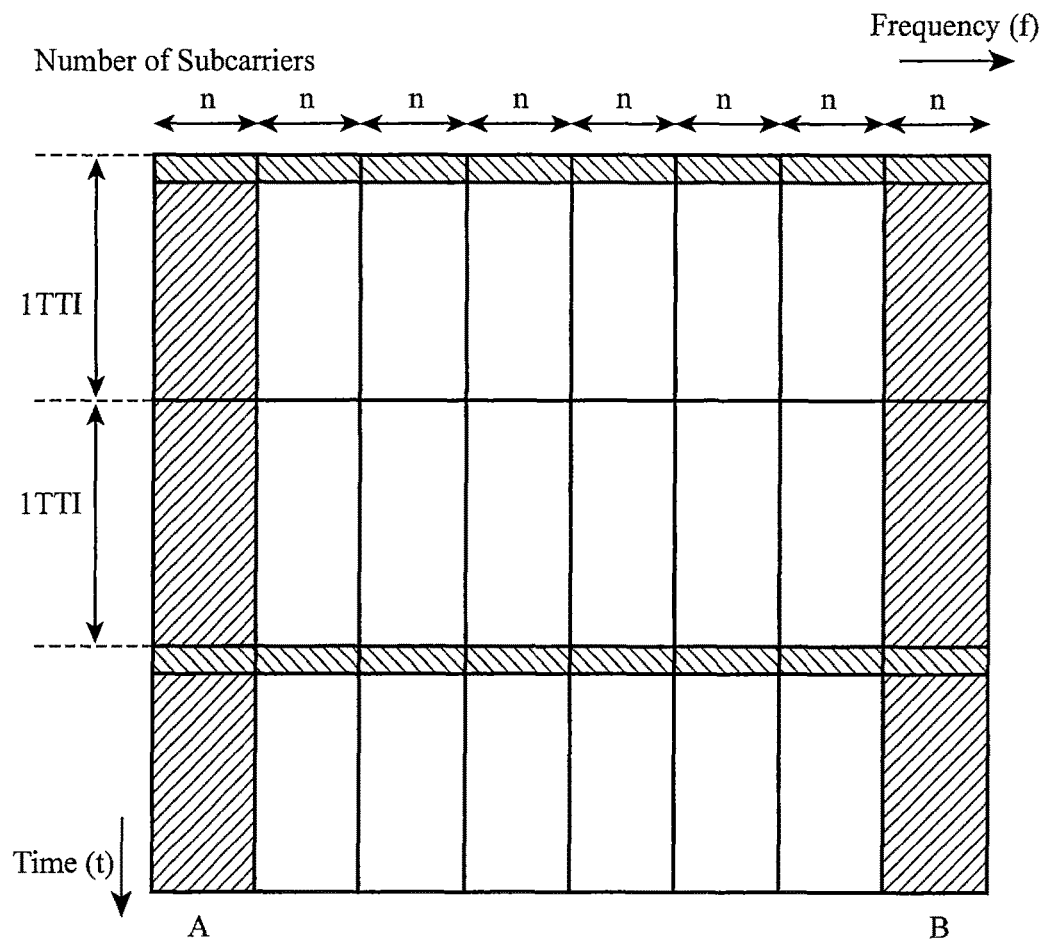
FIG. 57 is an explanatory drawing of a time-frequency resource.

FIG. 57 shows a figure of a time-frequency resource. Regions A and B are regions for an Ack/Nack exclusive channel. In this example, the first LB is allocated, as the region for sounding RS, once within 2 TTIs. The region for sounding RS is divided into parts having the same frequency bandwidth as the Ack/Nack exclusive channel, and a divided part is allocated to a certain mobile terminal group. Each of a plurality of mobile terminals in the certain mobile terminal group transmits a reference signal for sounding by using this divided part of the region for sounding RS.

Because the region with which a certain mobile terminal transmits a sounding RS has the same frequency bandwidth as the Ack/Nack exclusive channel, the length of a code for sounding pilot symbols can be made to be equal to that of a code for an Ack/Nack and/or CQI symbols. Therefore, the necessity to separately provide two codes specific to each mobile terminal for sounding pilot symbols and for an Ack/Nack or CQI symbols can be eliminated. In other words, the required number of types of spread codes can be reduced to one.

Therefore, with this structure, there is provided an advantage of being able to reduce the amount of codes specific to each mobile terminal, and hence to increase the number of mobile terminals allocated from the base station.

In a third variant, a region for sounding RS is disposed also in an Ack/Nack exclusive channel.

Figure 58:
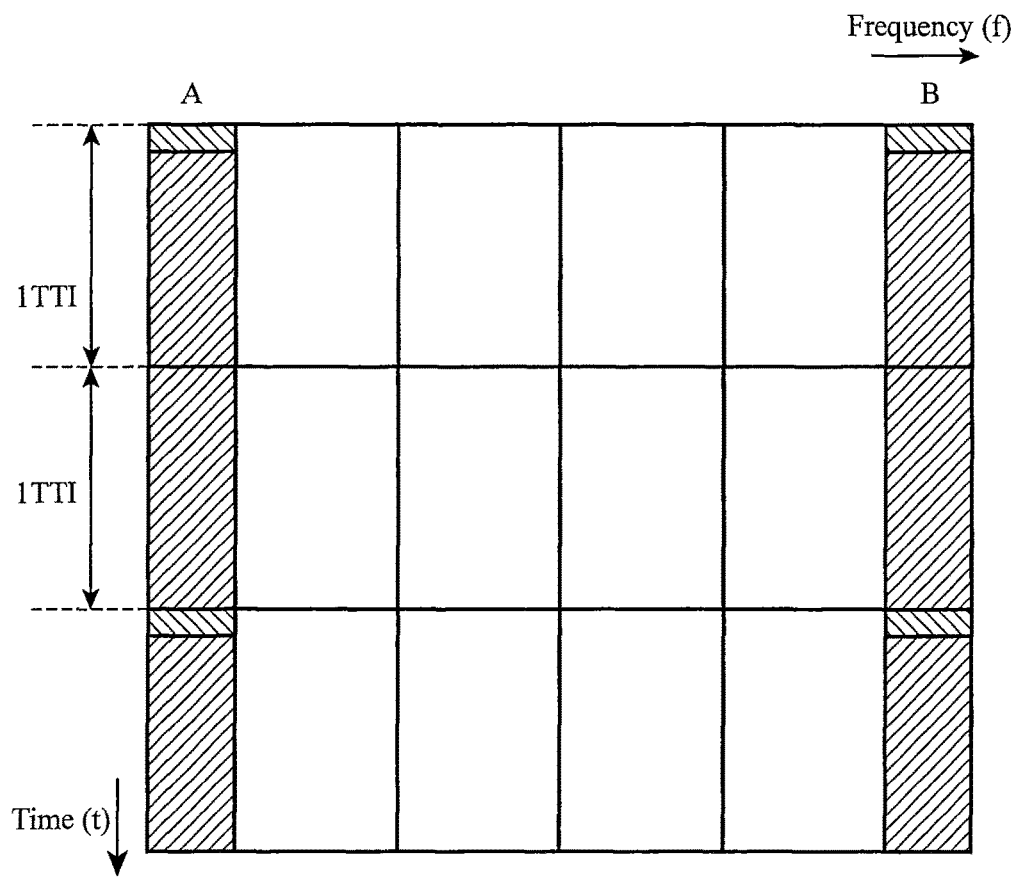
FIG. 58 is an explanatory drawing of a time-frequency resource.

FIG. 58 shows a figure of a time-frequency resource. Regions A and B are regions for the Ack/Nack exclusive channel. In this example, also in the Ack/Nack exclusive channel region, the first LB is allocated, as the region for sounding RS, once within 2 TTIs.

Because the region for sounding RS is disposed in the Ack/Nack exclusive channel, the necessity to separately provide two codes specific to each mobile terminal for sounding pilot symbols and for an Ack/Nack or CQI symbols can be eliminated. That is, the frequency band which is multiplied by the spread code becomes equal. Therefore, with this structure, there is provided an advantage of being able to reduce the amount of codes specific to each mobile terminal, and hence to increase the number of mobile terminals allocated from the base station.

Furthermore, there is provided an advantage of eliminating the necessity to separately carry out allocation to the time-frequency resources for sounding pilot symbols and for an Ack/Nack and/or CQI symbols at the time of transmission of a signal, thereby being able to simplify the control of each mobile terminal.

Since Embodiment 9 uses a sounding reference signal for transmitting a scheduling request signal, when combined with above-mentioned Embodiment 7, Embodiment 9 can be applied to a mobile terminal regardless of whether or not an Ack/Nack exclusive channel is allocated to the mobile terminal. More specifically, what is necessary is just to apply Embodiment 7 in a case in which any Ack/Nack exclusive channel is not allocated to the mobile terminal, and to apply Embodiment 9 in a case in which an Ack/Nack exclusive channel is allocated to the mobile terminal.

This Embodiment 9 discloses the case in which a mobile terminal does not transmit any sounding RS for uplink timing synchronization at certain periodicity. Furthermore, when combined with Embodiment 8, Embodiment 9 can also be applied to a case in which a mobile terminal transmits a sounding RS for uplink timing synchronization at certain periodicity. That is, in Embodiment 9, when receiving transmission of a sounding RS from a mobile terminal, the base station can recognize that the mobile terminal has made a scheduling request, though when the mobile terminal has originally transmitted a sounding RS for uplink timing synchronization, the base station cannot discriminate the sounding RS for uplink timing synchronization which the mobile terminal has originally transmitted from any scheduling request. In order to solve this problem, what is necessary is just to use the method disclosed in Embodiment 8.

Furthermore, also in the case in which a mobile terminal transmits a sounding RS for uplink timing synchronization at certain periodicity, Embodiment 9 can be applied to the mobile terminal regardless of whether or not an Ack/Nack exclusive channel is allocated to the mobile terminal, when combined with the method disclosed in Embodiment 7.

Embodiment 10

A method of enabling a mobile terminal to transmit an uplink scheduling request by using a sounding RS regardless of whether the mobile terminal transmits a sounding RS for uplink timing synchronization at certain periodicity will be disclosed.

A time-frequency region for sounding RS is allocated as shown in FIG. 42 or 55. FIG. 42 shows a case in which no allocation of resources of an Ack/Nack exclusive channel is made, and FIG. 55 shows a case in which allocation of resources of an Ack/Nack exclusive channel is made. In either of the cases, a sounding RS from a mobile terminal is transmitted with an allocated region for sounding RS. It is assumed that the length of time intervals at which a sounding RS for uplink timing synchronization is transmitted is n×TTI (n>=2).

Figure 63:
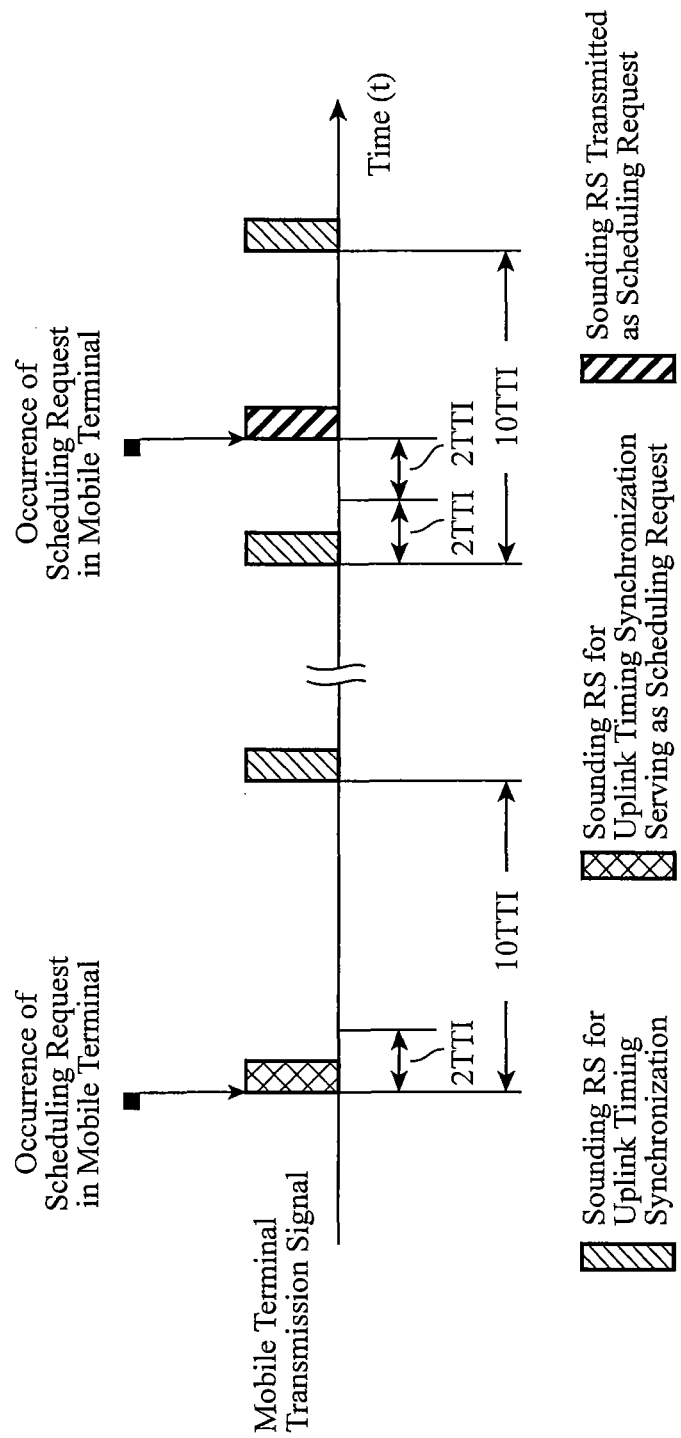
FIG. 63 is an explanatory drawing of a transmission signal of a mobile terminal when an uplink scheduling request occurs.

FIG. 63 shows a transmission signal of a mobile terminal when an uplink scheduling request has occurred. Hereafter, it is assumed that the length of time intervals at which a sounding RS for uplink timing synchronization is transmitted is 10TTI. In a case in which a necessity for transmission of uplink data occurs in a mobile terminal, when the timing at which the mobile terminal transmits an uplink scheduling request is the same as that at which the mobile terminal transmits a sounding RS for uplink timing synchronization, the mobile terminal transmits this sounding RS for synchronization while forming the sounding RS in such a way that the sounding RS have the functions of the scheduling request.

As a method of forming a sounding RS for synchronization in such a way that the sounding RS have the functions of a scheduling request, the method disclosed in above-mentioned Embodiment 8 can be used. For example, a method of providing two types of sounding pilot patterns corresponding to the presence and absence of an uplink scheduling request can be used. In a case in which a necessity for transmission of uplink data occurs in a mobile terminal, when the timing at which the mobile terminal transmits an uplink scheduling request differs from that at which the mobile terminal transmits a sounding RS for uplink timing synchronization, the mobile terminal transmits the sounding RS as an uplink scheduling request.

Figure 64:
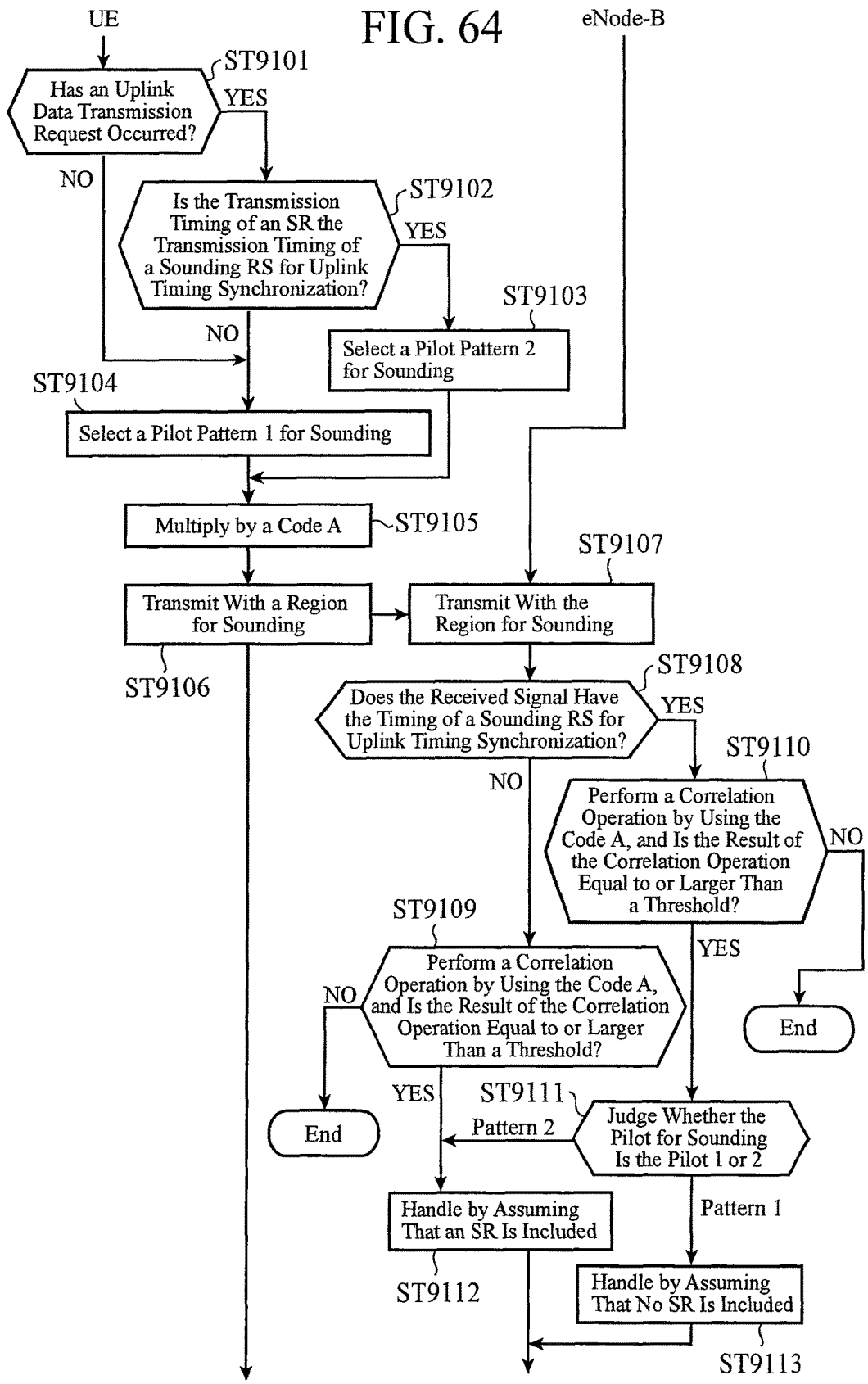
FIG. 64 is a diagram of sequences between a mobile terminal and a base station.

FIG. 64 shows a diagram of sequences between the mobile terminal and the base station. The mobile terminal, in ST9101, judges whether an uplink data transmission request has occurred. When no uplink data transmission request has occurred, the mobile terminal carries out ST9104. In contrast, when an uplink data transmission request has occurred, the mobile terminal, in ST9102, judges whether the transmission timing of an uplink scheduling request is the same as that of a sounding RS for uplink timing synchronization. If those transmission timings are the same as each other, the mobile terminal carries out ST9103. The mobile terminal, in ST9103, selects a pattern 2 as a pilot for sounding. The mobile terminal then carries out ST9105. When, in ST9102, judging that the transmission timing of the uplink scheduling request differs from that of a sounding RS for uplink timing synchronization, the mobile terminal carries out ST9104. The mobile terminal, in ST9104, selects a pattern 1 as a pilot for sounding. The mobile terminal then carries out ST9105. The mobile terminal, in ST9105, multiplies the transmission signal by a code A specific to each mobile terminal. The mobile terminal, in ST9106, transmits the transmission signal to the base station with the region for sounding (RB). The base station which, in ST9107, has received the transmission signal with the region for sounding (RB), in ST9108, judges whether or not the received signal has the timing of a sounding RS for uplink timing synchronization.

Because the base station carries out scheduling of the timing of a sounding RS for uplink timing synchronization and notifies the timing to the mobile terminal in advance, or the timing is predetermined, the base station can make the judgment. When, in ST9108, judging that the received signal has the same timing, the base station carries out ST9110. The base station, in ST9110, performs a correlation operation on the received signal by using the code A. When the result of the correlation operation is equal to or larger than a certain threshold, the base station identifies the mobile terminal. The base station then carries out ST9111. The base station, in ST9111, judges whether the pilot for sounding is the pattern 1 or the pattern 2. As a method of judging whether the pilot for sounding is the pattern 1 or the pattern 2, a method disclosed in Embodiment 8 can be used. When judging that the pilot for sounding is the pattern 1, the base station handles the signal by judging that the signal does not include an uplink scheduling request. When, in ST9111, judging that the pilot for sounding is the pattern 2, the base station carries out ST9112. When, in ST9108, judging that the received signal has a timing different from that of a sounding RS for uplink timing synchronization, the base station carries out ST9109. The base station, in ST9109, performs a correlation operation on the received signal by using the code A, and, when the result of the correlation operation is equal to or larger than a certain threshold, the base station identifies the mobile terminal, and, in ST9112, handles the signal by judging that the signal includes an uplink scheduling request.

With the above-mentioned structure, the same advantages as those provided by Embodiment 8 can be offered. Furthermore, there is provided an advantage of enabling a mobile terminal to transmit an uplink scheduling request regardless of whether the mobile terminal transmits a sounding RS for uplink timing synchronization at certain periodicity.

Hereafter, variants will be explained.

In a first variant, when the transmission timing of an uplink scheduling request coincides with that of a sounding RS for uplink timing synchronization, the timing at which an uplink scheduling request is transmitted is delayed by 2 TTIs.

Figure 65:
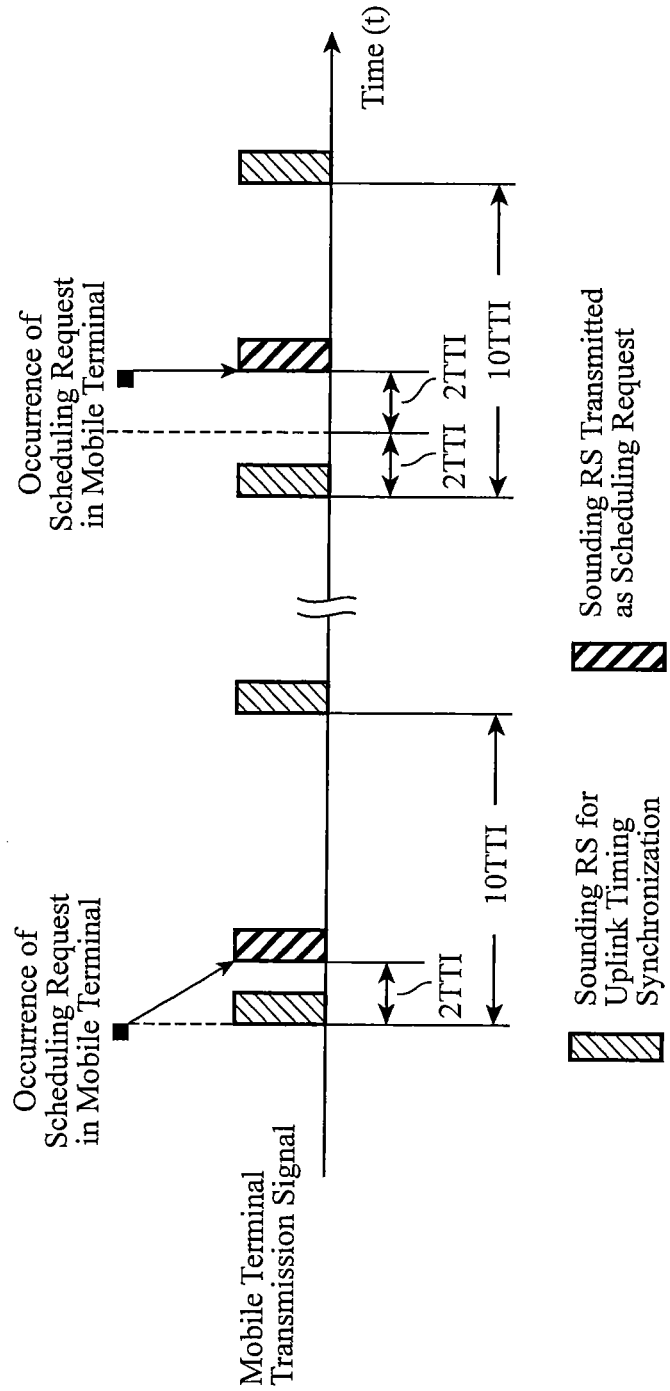
FIG. 65 is an explanatory drawing of a transmission signal of a mobile terminal when an uplink scheduling request occurs.

FIG. 65 shows a transmission signal of a mobile terminal when an uplink scheduling request occurs in the mobile terminal. In this case, the transmission time during which a sounding RS for uplink timing synchronization is transmitted is 10TTI. In a case in which a request for transmission of uplink data occurs in a mobile terminal, when the timing at which the mobile terminal transmits an uplink scheduling request is the same as that at which the mobile terminal transmits a sounding RS for uplink timing synchronization, the mobile terminal transmits the scheduling request by delaying its transmission timing by 2TTI. In contrast, when the timing at which the mobile terminal transmits an uplink scheduling request differs from that at which the mobile terminal transmits a sounding RS for uplink timing synchronization, the mobile terminal transmits the scheduling request without delaying its transmission timing by 2TTI.

Figure 66:
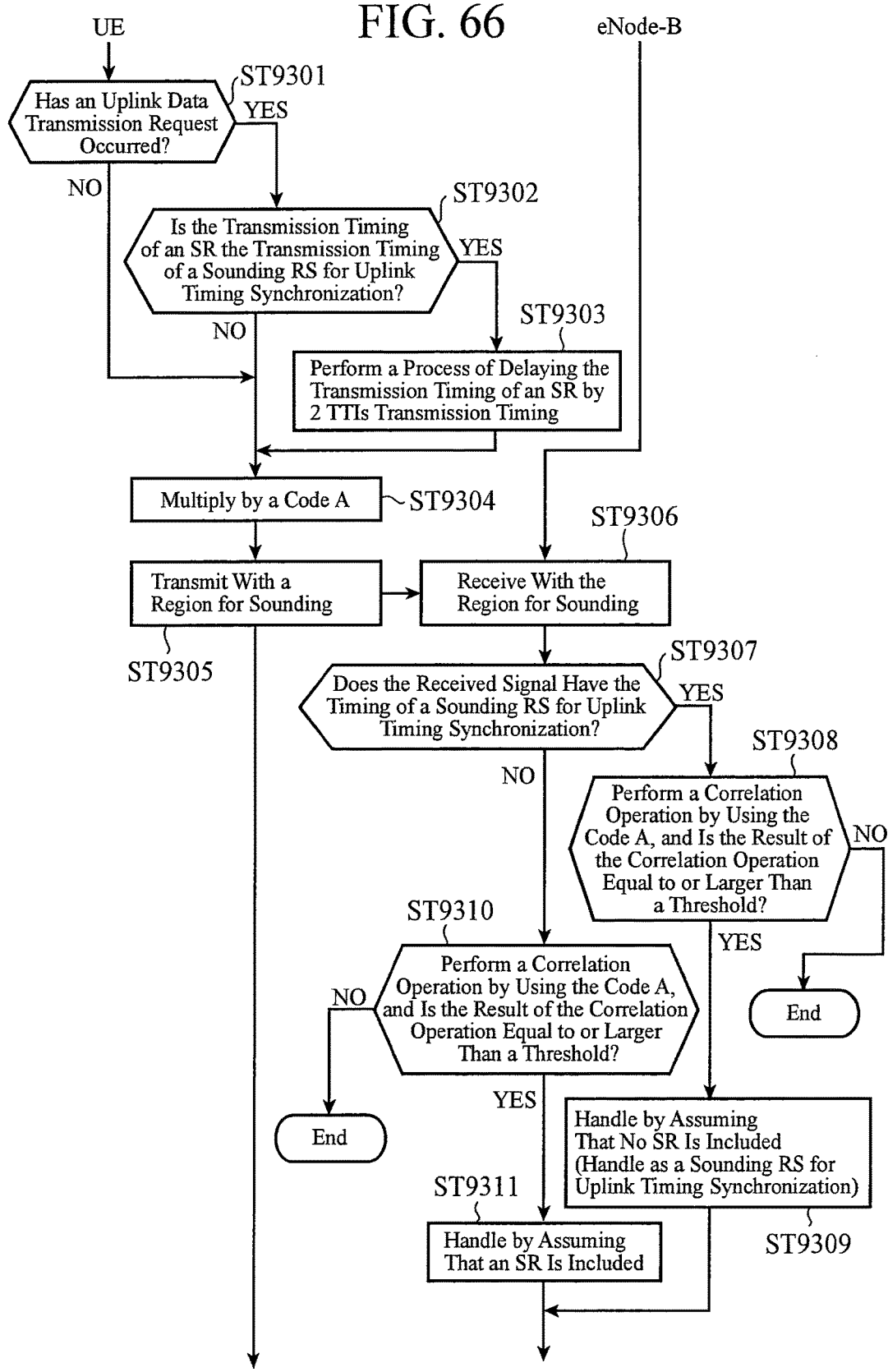
FIG. 66 is a diagram of sequences between a mobile terminal and a base station.

FIG. 66 shows a diagram of sequences between the mobile terminal and the base station. The mobile terminal, in ST9301, judges whether an uplink data transmission request has occurred. When no uplink data transmission request has occurred, the mobile terminal carries out ST9304. In contrast, when an uplink data transmission request has occurred, the mobile terminal, in ST9302, judges whether the transmission timing of an uplink scheduling request is the same as that of a sounding RS for uplink timing synchronization. If those transmission timings are the same as each other, the mobile terminal carries out ST9303. The mobile terminal, in ST9303, carries out a process of delaying the transmission timing of the scheduling request by 2TTI. In this case, about the sounding RS signal for uplink timing synchronization, the mobile terminal carries out a process of transmitting the sounding RS signal without delaying its transmission timing. The mobile terminal, in ST9304, multiplies the transmission signal by a code A specific to each mobile terminal. The mobile terminal, in ST9305, transmits the transmission signal to the base station with the region for sounding (RB). The base station which, in ST9306, has received the signal with the RB for sounding carries out ST9307.

The base station, in ST9307, judges whether or not the received signal has the timing of a sounding RS for uplink timing synchronization. When judging that the received signal has the timing of a sounding RS for uplink timing synchronization, the base station, in ST9308, performs a correlation operation on the received signal by using the code A, and, when the result of the correlation operation is equal to or larger than a certain threshold, identifies the mobile terminal and then carries out ST9309. The base station, in ST9309, handles the signal by judging that the signal does not include an uplink scheduling request. More specifically, in this case, the base station handles the signal as a normal sounding RS for uplink timing synchronization. When, in ST9307, judging that the received signal has a timing different from that of a sounding RS for uplink timing synchronization, the base station, in ST9310, performs a correlation operation on the received signal by using the code A, and, when the result of the correlation operation is equal to or larger than a certain threshold, the base station identifies the mobile terminal and carries out ST9311. The base station, in ST9311, handles the signal by judging that the signal includes an uplink scheduling request.

With the above-mentioned structure, the same advantages as those provided by Embodiment 10 can be offered. Furthermore, there is provided an advantage of reducing the number of types of sounding pilot patterns to only one. Thereby, there is provided another advantage of reducing the processing carried out by the base station and the processing carried out by the mobile terminal. Compared with a case in which in, for example, Embodiment 10, the method of using the two types of codes (the codes A and B), as disclosed in Embodiment 8, is used in order to discriminate a sounding RS for uplink timing synchronization and an uplink scheduling request from each other, there is provided an advantage of reducing the number of codes to one-half that in the above-mentioned case, and increasing the number of mobile terminals to each of which a mobile-terminal-specific code can be allocated.

In the above-mentioned variant, an uplink scheduling request is transmitted with its transmission timing being delayed by 2TTI. As an alternative, an uplink scheduling request can be transmitted at any timing at which no sounding RS for uplink timing synchronization is transmitted. In this case, a mobile terminal is allowed to transmit a scheduling request with a time delay depending on its processing capability.

A combination of Embodiment 10 or the first variant with Embodiment 9 can be applied regardless of whether or not resource allocation of an Ack/Nack exclusive channel is made.

INDUSTRIAL APPLICABILITY

As mentioned above, the present invention is suitable for a communication system which needs to prevent the increase in the radio resource load due to temporary increase in the physical channels.

The invention claimed is:

1. A data communication method which is implemented by a communication system, the method comprising:
    transmitting data by a base station using an OFDM (Orthogonal Frequency Division Multiplexing) method as a downlink access method;
    transmitting, by a mobile terminal, a quality notification signal for notifying downlink communication quality to said base station;
    transmitting, by said mobile terminal, a scheduling request signal to said base station requesting allocation of radio resources from said base station before transmitting transmission data to said base station; and
    performing, by said mobile terminal:
    a quality notification process that includes transmitting said quality notification signal to said base station;
    a scheduling request signal transmission process that includes transmitting said scheduling request signal to said base station;
    a first control process that includes, when the mobile terminal has not been allocated a radio resource for transmitting said transmission data, transmitting said scheduling request signal to said base station; and
    a second control process that includes, when said quality notification process coincides with said scheduling request signal transmission process, stopping said quality notification process during a time interval during which said mobile terminal transmits said scheduling request signal.

2. A communications system comprising:
    a base station configured to transmit data by using an OFDM (Orthogonal Frequency Division Multiplexing) method as a downlink access method; and
    a mobile terminal configured to transmit a quality notification signal for notifying downlink communication quality to said base station, and to transmit a scheduling request signal with which to make a request for allocation of radio resources to said base station before transmitting transmission data to said base station,
wherein said mobile terminal includes:
    a transmitter configured to transmit said quality notification signal to said base station, and to transmit said scheduling request signal to said base station; and
    a controller configured to perform a first control process that includes, when the mobile terminal has not been allocated a radio resource for transmitting said transmission data, transmitting said scheduling request signal to said base station, and a second control process that includes, when a transmission of said quality notification signal coincides with that of said scheduling request signal in said transmitter, stopping transmitting said quality notification signal during a time interval during which said transmitter transmits said scheduling request signal.

3. A mobile terminal configured to:
    transmit a quality notification signal for notifying downlink communication quality to a base station, and
    transmit a scheduling request signal with which to make a request for allocation of radio resources to said base station before transmitting transmission data to said base station, wherein said mobile terminal includes:
    a transmitter configured to transmit said quality notification signal to said base station, and to transmit said scheduling request signal to said base station; and
    a controller configured to perform a first control process that includes, when the mobile terminal has not been allocated a radio resource for transmitting said transmission data, transmitting said scheduling request signal to said base station, and a second control process that includes, when a transmission of said quality notification signal coincides with that of said scheduling request signal in said transmitter, stopping transmitting said quality notification signal during a time interval during which said transmitter transmits said scheduling request signal.

* * * * *